US012782215B2

(12) United States Patent
Okui

(10) Patent No.: US 12,782,215 B2
(45) Date of Patent: Nov. 3, 2026

(54) TORQUE DETECTION DEVICE

(71) Applicant: DENSO CORPORATION, Kariya-city (JP)

(72) Inventor: Yoichi Okui, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 349 days.

(21) Appl. No.: 18/410,224

(22) Filed: Jan. 11, 2024

(65) Prior Publication Data

US 2024/0142326 A1 May 2, 2024

Related U.S. Application Data

(63) Continuation of application No. PCT/JP2022/036688, filed on Sep. 30, 2022.

(30) Foreign Application Priority Data

Oct. 5, 2021 (JP) ................................ 2021-164348

(51) Int. Cl.

*G01L 5/22* (2006.01)
*B62D 6/10* (2006.01)
*G01L 3/10* (2006.01)

(52) U.S. Cl.

CPC ................ *G01L 5/221* (2013.01); *B62D 6/10* (2013.01); *G01L 3/101* (2013.01)

(58) Field of Classification Search

None

See application file for complete search history.

(56) References Cited

U.S. PATENT DOCUMENTS

| | | | |
|---|---|---|---|
| 2015/0090051 A1 | 4/2015 | Lee | |
| 2021/0109166 A1 | 4/2021 | Tanaka et al. | |
| 2021/0380161 A1 | 12/2021 | Tanaka et al. | |
| 2022/0291297 A1 | 9/2022 | Tanaka et al. | |

FOREIGN PATENT DOCUMENTS

| | | |
|---|---|---|
| DE | 10 2016 124 370 A1 | 6/2018 |
| JP | 2016-121882 A | 7/2016 |
| JP | 2021-012077 A | 2/2021 |

OTHER PUBLICATIONS

U.S. Appl. No. 18/410,071, filed Jan. 11, 2024, Uchida et al.
U.S. Appl. No. 18/410,036, filed Jan. 11, 2024, Suzuki et al.

*Primary Examiner* — Daniel S Larkin
(74) *Attorney, Agent, or Firm* — Posz Law Group, PLC

(57) ABSTRACT

A torque detection device includes: a sensor case that receives a magnetic detector; and a cover that has a sensor cover portion and a rotor cover portion. The sensor cover portion is coupled to a surface of the sensor case which faces in an axial direction. The rotor cover portion is joined to the sensor cover portion and receives a rotor inserted in the rotor cover portion in the axial direction. Furthermore, the rotor cover portion limits movement of the rotor relative to the sensor case in a direction perpendicular to the axial direction.

6 Claims, 67 Drawing Sheets

TORQUE DETECTION DEVICE

CROSS REFERENCE TO RELATED APPLICATIONS

This application is a continuation application of International Patent Application No. PCT/JP2022/036688 filed on Sep. 30, 2022, which designated the U.S. and claims the benefit of priority from Japanese Patent Application No. 2021-164348 filed on Oct. 5, 2021. The entire disclosures of all of the above applications are incorporated herein by reference.

TECHNICAL FIELD

The present disclosure relates to a torque detection device.

BACKGROUND

Previously, there has been proposed a sensor device that detects a torque applied to a steering shaft connected to a steering wheel of a vehicle. This sensor device includes a magnet, magnetic yokes, a sensor module, a sensor housing and a steering gear housing. The magnetic yokes are configured to change a magnetic field generated by the magnet. The sensor module is configured to detect a strength of the magnetic field, which is changed by the magnetic yokes, to detect the torque applied to the steering wheel. The sensor housing receives the sensor module.

SUMMARY

This section provides a general summary of the disclosure, and is not a comprehensive disclosure of its full scope or all of its features.

According to one aspect of the present disclosure, there is provided a torque detection device configured to detect a torque generated at a detection subject. The torque detection device includes a magnet, a rotor, a yoke, a magnetic detector and a sensor case. The magnet is configured to generate a magnetic field and is configured to be rotated together with the detection subject. The rotor is shaped in a ring form and is configured to be rotated about an axis, which extends in an axial direction, together with the detection subject. The yoke has a ring and a plurality of claws. The ring is shaped in a ring form and is configured to be rotated together with the rotor. The plurality of claws project from the ring in the axial direction and are thereby opposed to the magnet in a direction perpendicular to the axial direction. The plurality of claws are configured to be rotated together with the ring and thereby change the magnetic field generated by the magnet. The magnetic detector is configured to detect a strength of the magnetic field which corresponds to the torque and changes in response to rotation of the plurality of claws. The sensor case receives the magnetic detector.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
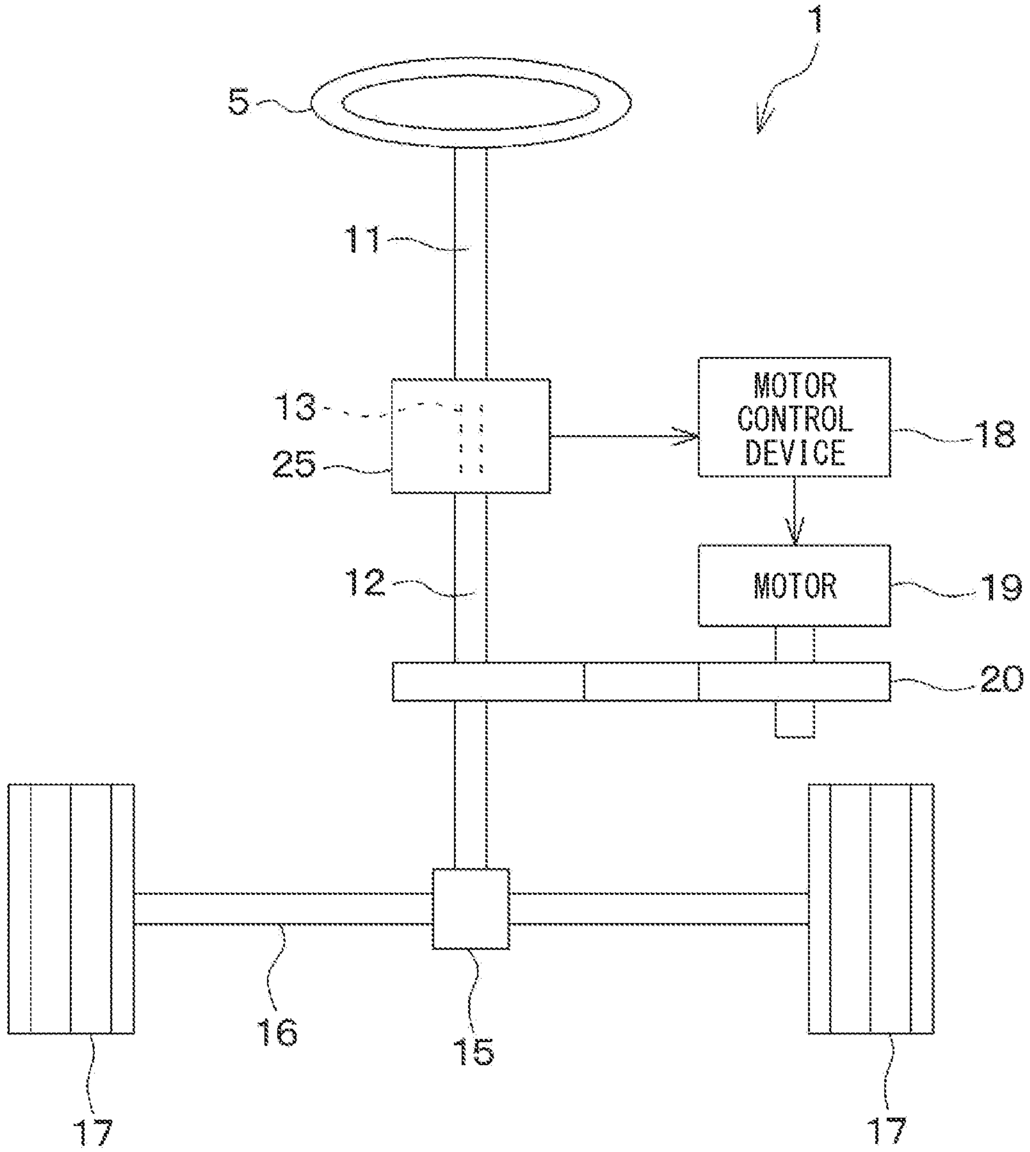
FIG. 1 is a diagram of a steering system in which a torque detection device of a first embodiment is applied.

Previously, there has been proposed a sensor device that detects a torque applied to a steering shaft connected to a steering wheel of a vehicle. This sensor device includes a magnet, magnetic yokes, a sensor module, a sensor housing and a steering gear housing. The magnetic yokes are configured to change a magnetic field generated by the magnet. The sensor module is configured to detect a strength of the magnetic field, which is changed by the magnetic yokes, to detect the torque applied to the steering wheel. The sensor housing receives the sensor module.

According to the study of the inventor of the present application, in the previously proposed sensor device described above, the sensor housing, which receives the sensor module, is inserted into the steering gear housing in a direction that is perpendicular to an axis of the steering shaft. Thereafter, the magnetic yokes are inserted into the steering gear housing in the axial direction of the steering shaft, and thereby the sensor housing and the magnetic yokes are received in the steering gear housing. Therefore, at the time of manufacturing this sensor device, these components are respectively inserted in the two directions, i.e., the direction perpendicular to the axis of the steering shaft and the axial direction of the steering shaft, so that the manufacturing process is complicated.

According to one aspect of the present disclosure, there is provided a torque detection device configured to detect a torque generated at a detection subject, including:

- a magnet that is configured to generate a magnetic field and is configured to be rotated together with the detection subject;
- a rotor that is shaped in a ring form and is configured to be rotated about an axis, which extends in an axial direction, together with the detection subject;
- a yoke that has:
  - a ring which is shaped in a ring form and is configured to be rotated together with the rotor; and
  - a plurality of claws which project from the ring in the axial direction and are thereby opposed to the magnet in a direction perpendicular to the axial direction, wherein the plurality of claws are configured to be rotated together with the ring and thereby change the magnetic field generated by the magnet;
- a magnetic detector that is configured to detect a strength of the magnetic field which corresponds to the torque and changes in response to rotation of the plurality of claws;
- a sensor case that receives the magnetic detector; and
- a cover that has:
  - a sensor cover portion that is coupled to a surface of the sensor case which faces in the axial direction; and
  - a rotor cover portion that is joined to the sensor cover portion and receives the rotor which is inserted into the rotor cover portion in the axial direction, wherein:
- the rotor cover portion limits movement of the rotor relative to the sensor case in the direction perpendicular to the axial direction.

Furthermore, according to another aspect of the present disclosure, there is provided a torque detection device configured to detect a torque generated at a detection subject, including:

a magnet that is configured to generate a magnetic field and is configured to be rotated together with the detection subject;

a rotor that is shaped in a ring form and is configured to be rotated about an axis, which extends in an axial direction, together with the detection subject;

a yoke that has:

a ring which is shaped in a ring form and is configured to be rotated together with the rotor; and a plurality of claws which project from the ring in the axial direction and are thereby opposed to the magnet in a direction perpendicular to the axial direction, wherein the plurality of claws are configured to be rotated together with the ring and thereby change the magnetic field generated by the magnet;

a magnetic detector that is configured to detect a strength of the magnetic field which corresponds to the torque and changes in response to rotation of the plurality of claws;

a sensor case that receives the magnetic detector; and a holder member that cooperates with the sensor case in the direction perpendicular to the axial direction to surround the rotor and thereby limits movement of the rotor relative to the sensor case in the direction perpendicular to the axial direction.

According to a further aspect of the present disclosure, there is provided a torque detection device configured to detect a torque generated at a detection subject, including:

a magnet that is configured to generate a magnetic field and is configured to be rotated together with the detection subject;

a rotor that is shaped in a ring form and is configured to be rotated about an axis, which extends in an axial direction, together with the detection subject;

a yoke that has:

a ring which is shaped in a ring form and is configured to be rotated together with the rotor; and a plurality of claws which project from the ring in the axial direction and are thereby opposed to the magnet in a direction perpendicular to the axial direction, wherein the plurality of claws are configured to be rotated together with the ring and thereby change the magnetic field generated by the magnet;

a magnetic detector that is configured to detect a strength of the magnetic field which corresponds to the torque and changes in response to rotation of the plurality of claws; and a sensor case that has:

a limiting portion that is shaped in a ring form and thereby receives the rotor which is inserted into the limiting portion in the axial direction; and a receiving portion that is joined to the limiting portion and receives the magnetic detector, wherein:

the limiting portion is configured to limit movement of the rotor relative to the sensor case in the direction perpendicular to the axial direction.

Therefore, the movement of the rotor relative to the sensor case in the direction perpendicular to the axial direction is limited. Thus, the torque detection device is assembled by inserting the components in the axial direction only, and thereby this simplifies the manufacturing process in comparison to the case where the torque sensor is assembled by inserting the components in the two directions, i.e., the axial direction and the direction perpendicular to the axial direction.

Embodiments of the present disclosure will be described with reference to the drawings. In each of the following embodiments, portions, which are the same or equivalent to each other, will be indicated by the same reference signs.

First Embodiment

A torque detection device of the present embodiment is used in, for example, a steering system 1 installed in a vehicle. First of all, this steering system 1 will be described.

Figure 2:
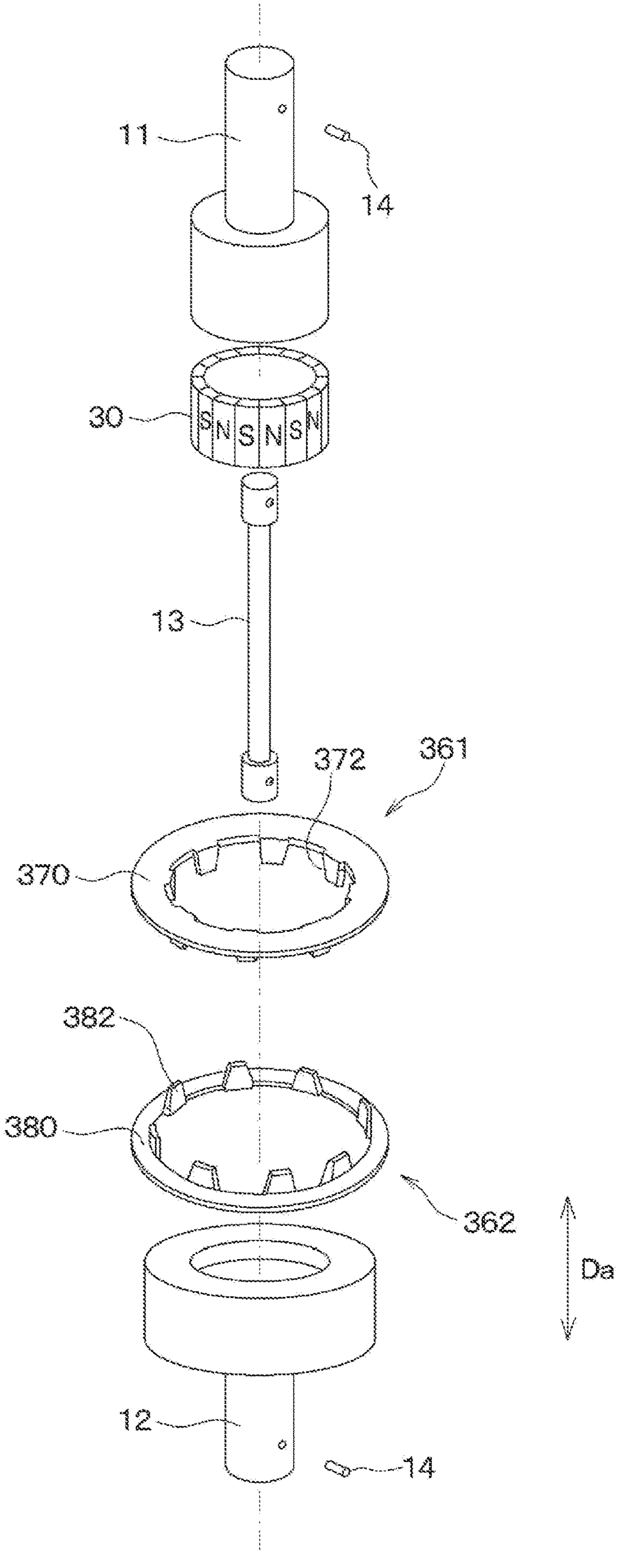
FIG. 2 is an exploded perspective view of a portion of the steering system.

The steering system 1 assists a steering operation for changing the orientation of wheels 17 of the vehicle. Specifically, as shown in FIGS. 1 and 2, the steering system 1 includes a steering wheel 5, a first steering shaft 11, a torsion bar 13 and a second steering shaft 12. Furthermore, the steering system 1 includes shaft pins 14, a pinion gear 15, a rack shaft 16, the wheels 17, a torque sensor 25, a motor control device 18, an electric motor 19 and reduction gears 20.

As shown in FIG. 1, the steering wheel 5 is rotated through the steering operation of the steering wheel 5 by a driver of the vehicle or an automated driving of the vehicle.

The first steering shaft 11 is coupled to the steering wheel 5. Therefore, the first steering shaft 11 is rotated together with the steering wheel 5.

The torsion bar 13 is coupled to the first steering shaft 11. Therefore, the torsion bar 13 is rotated together with the steering wheel 5 and the first steering shaft 11.

The second steering shaft 12 is coupled to the torsion bar 13. Therefore, the torsion bar 13 is rotated together with the steering wheel 5 and the first steering shaft 11.

As shown in FIG. 2, one of the shaft pins 14 is inserted into a hole of the first steering shaft 11 and a hole of the torsion bar 13 which correspond with each other. Thereby, the first steering shaft 11 and the torsion bar 13 are fixed together. Furthermore, another one of the shaft pins 14 is inserted into a hole of the second steering shaft 12 and another hole of the torsion bar 13 which correspond with each other. Thereby, the second steering shaft 12 and the torsion bar 13 are fixed together.

As shown in FIG. 1, the pinion gear 15 is coupled to the second steering shaft 12. Furthermore, the pinion gear 15 is meshed with the rack shaft 16 described later. In addition, the pinion gear 15 converts the rotational motion of the second steering shaft 12 into linear motion of the rack shaft 16.

The rack shaft 16 is coupled to the wheels 17 through tie rods (not shown). The rack shaft 16 changes the orientation of the wheels 17 through the linear motion.

A portion of the torsion bar 13 is inserted into the torque sensor 25. Furthermore, the torque sensor 25 serves as a torque detection device and detects a signal that corresponds to the torsional torque generated at the torsion bar 13 through the rotation of the steering wheel 5. Thereby, the torque sensor 25 detects the steering torque. Furthermore, the torque sensor 25 outputs the signal, which corresponds to the detected steering torque, to the motor control device 18. The torque sensor 25 will be described in detail later. The steering torque is the torque that is exerted when the steering wheel 5 is rotated.

The motor control device 18 includes a microcomputer as its main component and includes a CPU, a ROM, a flash memory, a RAM, an I/O device, a drive circuit, and bus lines connecting these components. The motor control device 18 executes a program(s) stored in the ROM. Thereby, the motor control device 18 calculates a rotational angle of the electric motor 19 described later. Furthermore, the motor control device 18 calculates the steering torque based on the signal, which corresponds to the steering torque and is outputted from the torque sensor 25. The motor control device 18 controls the rotation of the electric motor 19 based on the calculated rotational angle of the electric motor 19 and the calculated steering torque.

The electric motor 19 is rotated based on the output from the motor control device 18. Thereby, the electric motor 19 generates the torque.

The reduction gears 20 are coupled to the electric motor 19 and the second steering shaft 12. Furthermore, the reduction gears 20 reduce the rotational speed of the rotation outputted from the electric motor 19 and transmit the torque of the rotation generated by the electric motor 19 to the second steering shaft 12. Therefore, the steering operation, which changes the orientation of the wheels 17, is assisted.

The steering system 1 is configured as described above. Next, the structure of the torque sensor 25 will be described.

As shown in FIGS. 2 to 6, the torque sensor 25 includes a magnet 30, a rotor 35, a first yoke 361, a second yoke 362 and a fixation collar 354. The torque sensor 25 further includes a circuit board 60, a magnetic detector 600, a first magnetic guide member 71, a second magnetic guide member 72, a sensor case 75, a plurality of terminals 80 and a cover 85.

As shown in FIG. 2, the magnet 30 is shaped in a circular ring form. Furthermore, the magnet 30 is coupled to an end portion of the first steering shaft 11. A portion of the torsion bar 13 is inserted into a hole of the magnet 30. An axis of the magnet 30 is coaxial with an axis of the torsion bar 13. Therefore, the magnet 30 is rotated together with the first steering shaft 11 about the axis of the torsion bar 13. Furthermore, the magnet 30 is magnetized such that magnetic poles are arranged in the rotational direction of the magnet 30 such that polarities of the magnetic poles are alternately reversed in the rotational direction of the magnet 30.

As shown in FIGS. 3 to 6, the rotor 35 is shaped in a cylindrical tubular form. An axis of the rotor 35 is coaxial with the axis of the magnet 30. Therefore, the axis of the rotor 35, the axis of the magnet 30 and the axis of the torsion bar 13 are coaxial to each other.

Hereafter, for the sake of convenience, a radial direction of the rotor 35 will be simply referred to as a radial direction. Furthermore, an axial direction Da of the rotor 35 will be simply referred to as an axial direction Da. Also, a circumferential direction about the axis of the rotor 35 will be simply referred to as a circumferential direction.

Figure 3:
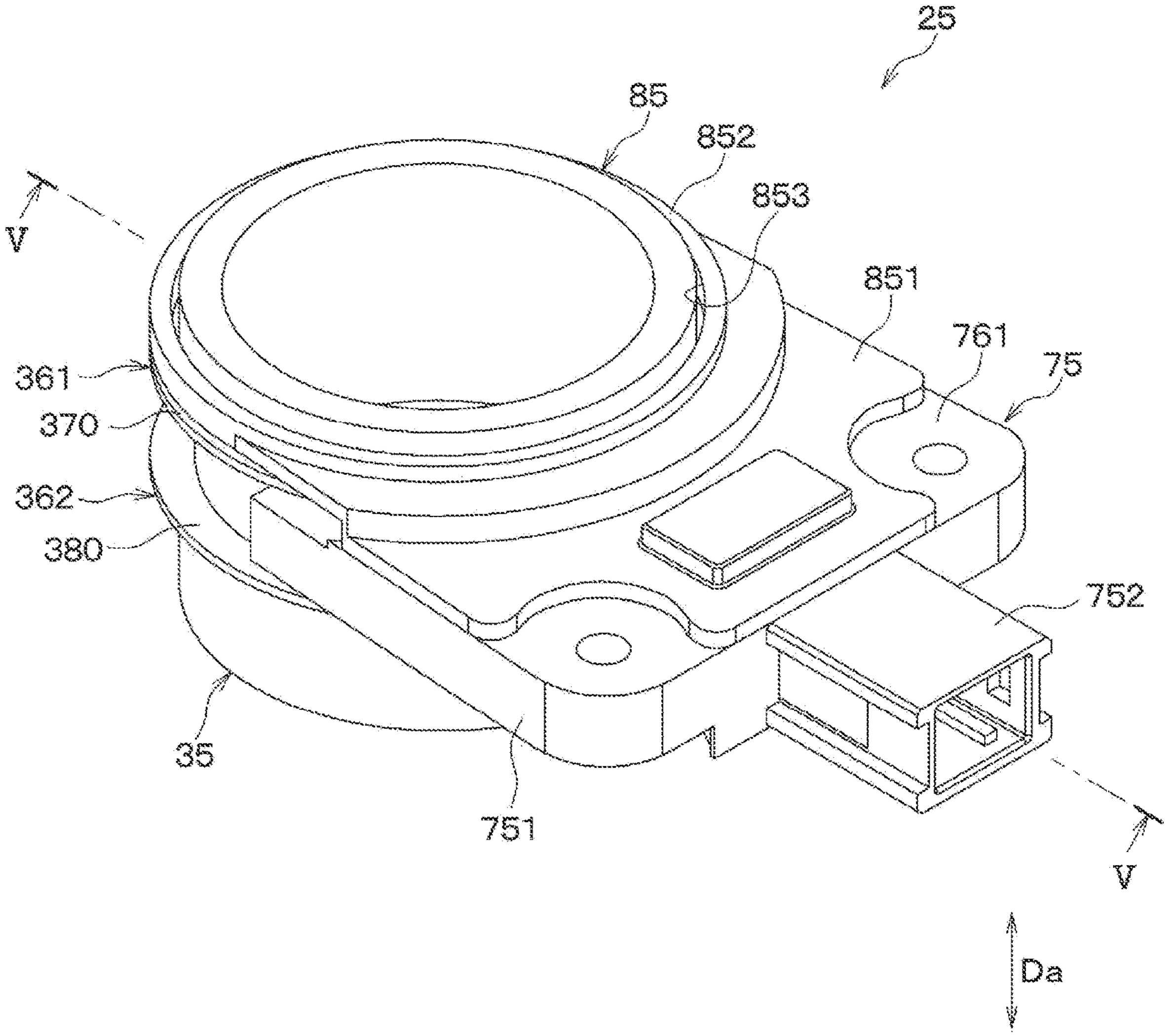
FIG. 3 is a perspective view of the torque detection device.
Figure 4:
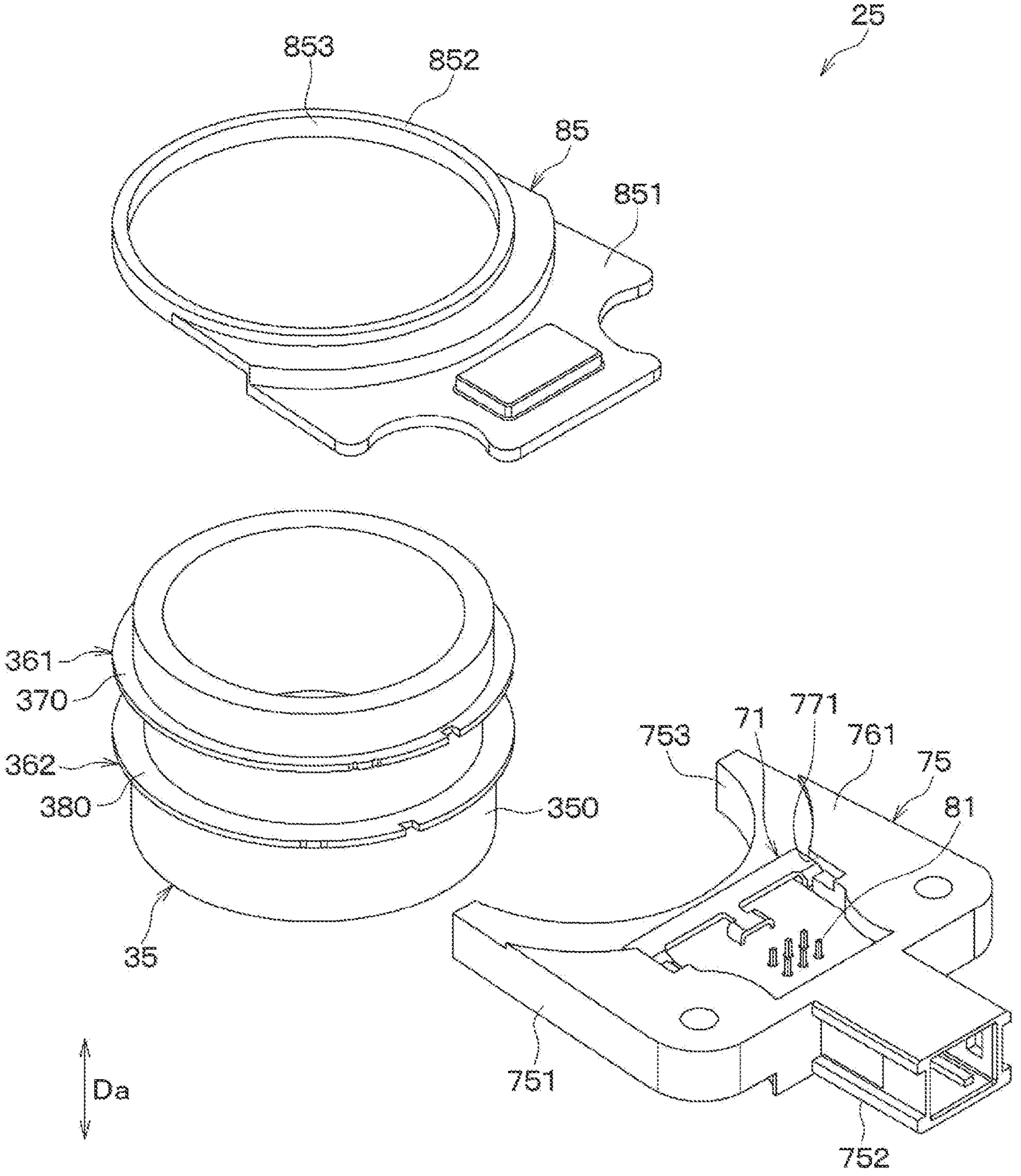
FIG. 4 is an exploded perspective view of the torque detection device.
Figure 5:
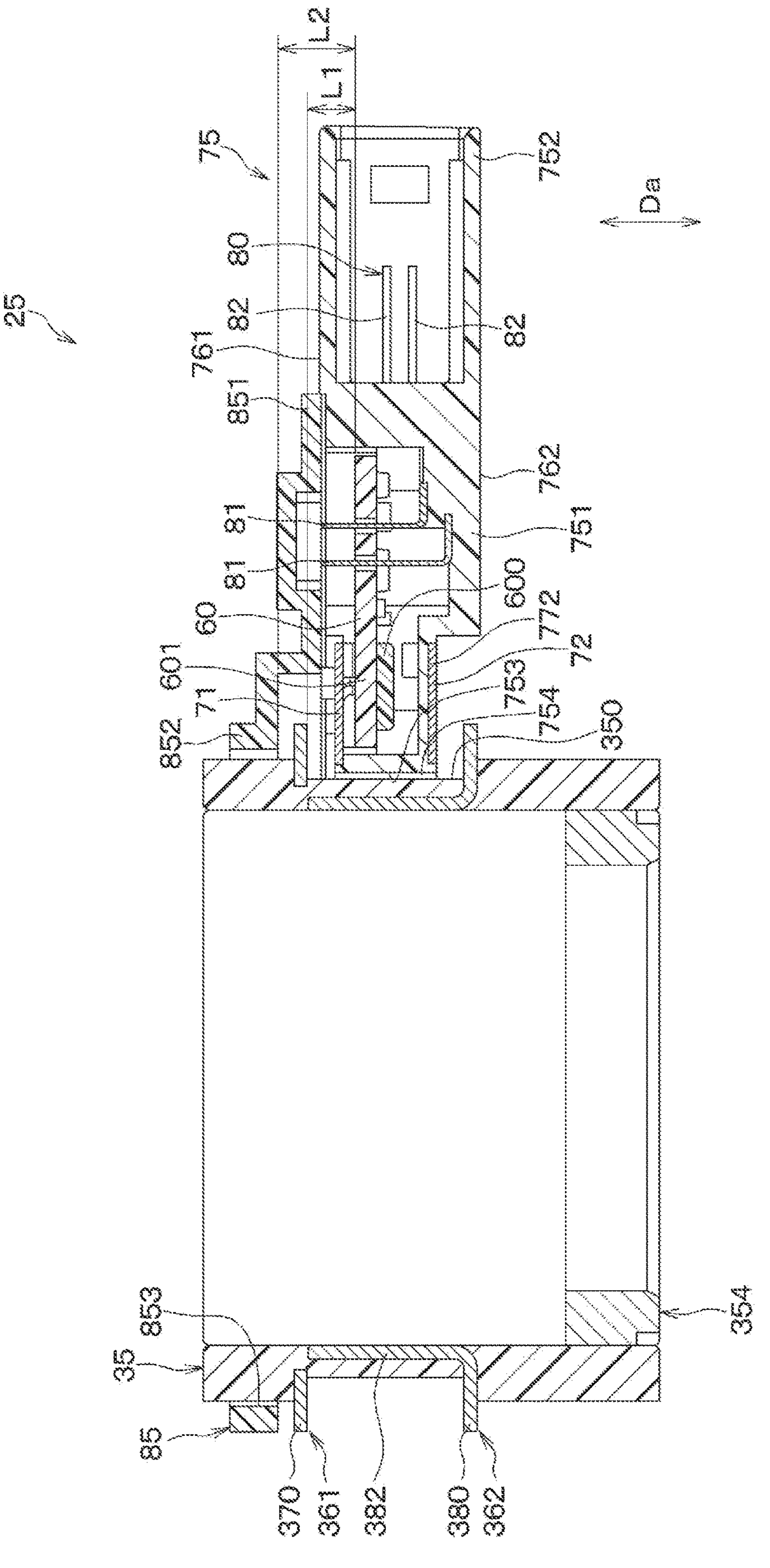
FIG. 5 is a cross-sectional view taken along line V-V in FIG. 3.
Figure 6:
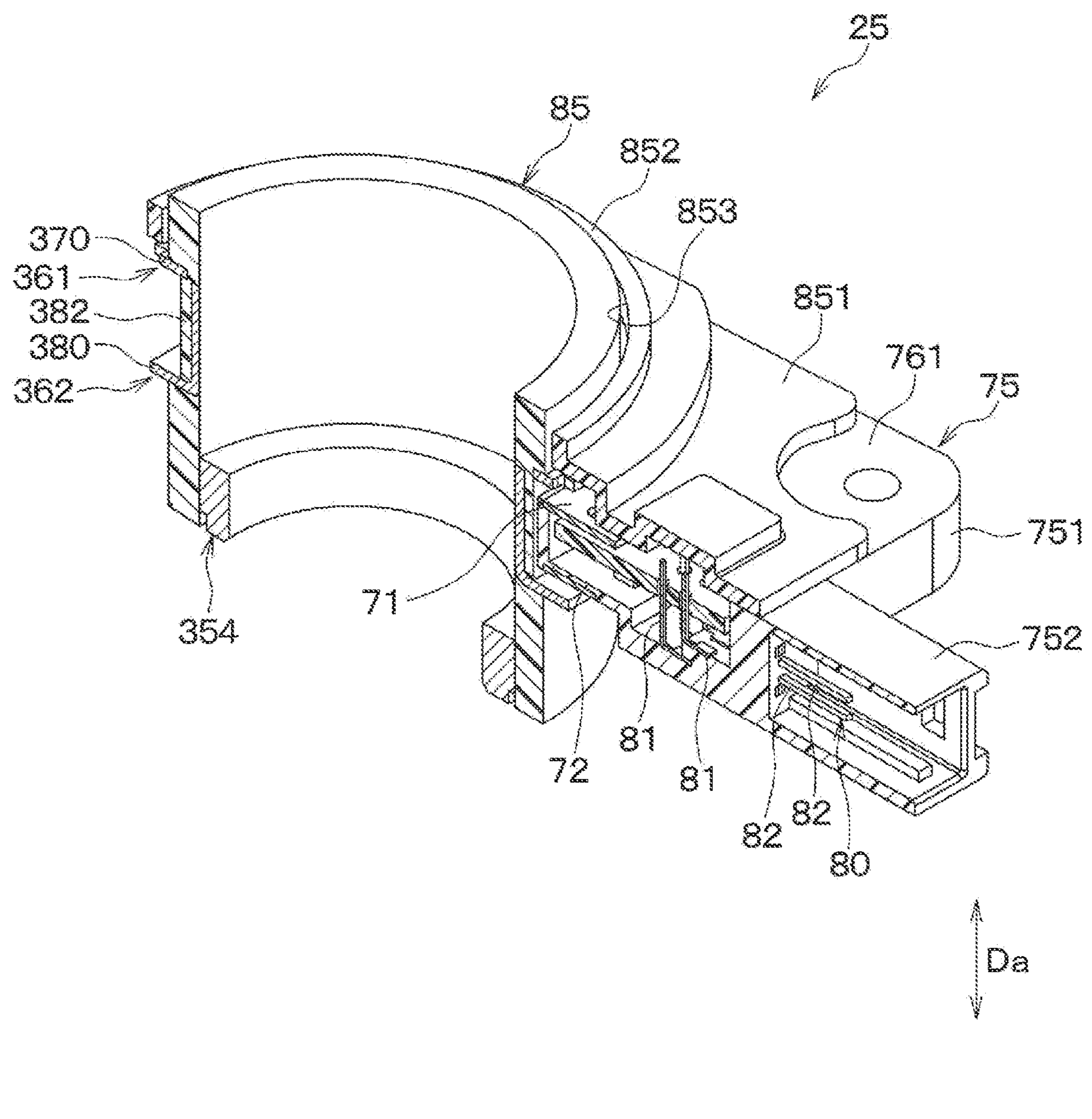
FIG. 6 is a perspective cross-sectional view of the torque detection device.

As shown in FIGS. 2 and 3, the first yoke 361 is shaped in a tubular form and is made of a soft magnetic material. The first yoke 361 has a first-yoke ring 370 and a plurality of first-yoke claws 372.

The first-yoke ring 370 is shaped in a circular ring form. Furthermore, a plurality of portions of the first-yoke ring 370 are inserted into a plurality of corresponding holes of the rotor 35 each of which extends in the radial direction.

The first-yoke claws 372 project from an inner periphery of the first-yoke ring 370 in the axial direction Da. Furthermore, each of the first-yoke claws 372 is shaped in a tapered form that is tapered from the inner periphery of the first-yoke ring 370 toward a distal end side of the first-yoke claw 372. Furthermore, each of the first-yoke claws 372 is in contact with and is connected to an inner peripheral surface of the rotor 35. Also, the first-yoke claws 372 are opposed to an outer peripheral surface of the magnet 30 in the radial direction. Furthermore, the plurality of corresponding holes of the rotor 35 are arranged at equal intervals in the circumferential direction, so that the first-yoke claws 372 are also arranged at predetermined intervals in the circumferential direction.

Like the first yoke 361, the second yoke 362 is shaped in a ring form and is made of a soft magnetic material. Furthermore, the second yoke 362 is, for example, integrally molded together with the rotor 35 and the first yoke 361. Furthermore, the second yoke 362 has a second-yoke ring 380 and a plurality of second-yoke claws 382.

The second-yoke ring 380 is shaped in a circular ring form. Furthermore, a plurality of portions of the second-yoke ring 380 are inserted into a plurality of corresponding holes of the rotor 35 each of which extends in the radial direction.

The second-yoke claws 382 project from an inner periphery of the second-yoke ring 380 in the axial direction Da. Furthermore, each of the second-yoke claws 382 is shaped in a tapered form that is tapered from the inner periphery of the second-yoke ring 380 toward a distal end side of the second-yoke claw 382. Furthermore, each of the second-yoke claws 382 is in contact with and is connected to the inner peripheral surface of the rotor 35. Also, the second-yoke claws 382 are opposed to the outer peripheral surface of the magnet 30 in the radial direction. Furthermore, the plurality of corresponding holes of the rotor 35 are arranged at equal intervals in the circumferential direction, so that the second-yoke claws 382 are also arranged at predetermined intervals in the circumferential direction. Furthermore, each of the second-yoke claws 382 is placed between corresponding adjacent two of the first-yoke claws 372. Therefore, the first-yoke claws 372 and the second-yoke claws 382 are alternately arranged in the circumferential direction. In FIGS. 3 to 6, the first-yoke claws 372 and the second-yoke claws 382 are partially omitted to avoid complication.

The fixation collar 354 is shaped in a tubular form. The fixation collar 354 is coupled to the inner peripheral surface of the rotor 35. Furthermore, the fixation collar 354 is coupled to the second steering shaft 12. Therefore, the rotor 35 is rotated together with the second steering shaft 12.

The circuit board 60 is a printed circuit board. Furthermore, the circuit board 60 has a connecting portion 601. This connecting portion 601 is coupled to the magnetic detector 600 described later and is exposed from the sensor case 75 described later.

The magnetic detector 600 is installed to the circuit board 60 at a location that is adjacent to the second magnetic guide member 72 described later. The magnetic detector 600 includes, for example, a Hall element or an MR element (not shown). By using the Hall element or the MR element, the magnetic detector 600 detects a strength of the magnetic field exerted to the magnetic detector 600 in the axial direction Da. Furthermore, the magnetic detector 600 outputs a signal, which corresponds to the detected strength of the magnetic field, to the motor control device 18. Here, MR stands for Magneto Resistive.

The first magnetic guide member 71 is made of a soft magnetic material and is shaped in a plate form that extends in the radial direction. Furthermore, the first magnetic guide member 71 overlaps with the first-yoke ring 370 when the first-yoke ring 370 is projected onto the first magnetic guide member 71 in the axial direction Da. Furthermore, the first magnetic guide member 71 overlaps with the magnetic detector 600 when the first-yoke ring 370 is projected onto the magnetic detector 600 in the axial direction Da.

The second magnetic guide member 72 is made of a soft magnetic material and is shaped in a plate form that extends in the radial direction. Furthermore, the second magnetic guide member 72 overlaps with the second-yoke ring 380 when the second-yoke ring 380 is projected onto the second magnetic guide member 72 in the axial direction Da. Furthermore, the second magnetic guide member 72 overlaps with the magnetic detector 600 when the second magnetic guide member 72 is projected onto the magnetic detector 600 in the axial direction Da.

The sensor case 75 is made of, for example, resin and is shaped in a plate form that extends in the radial direction. The sensor case 75 has a first receiving portion 751 and a second receiving portion 752.

The first receiving portion 751 has a distal end surface 753. The distal end surface 753 of the first receiving portion 751 is shaped in an arcuate form. Furthermore, the distal end surface 753 is opposed to a rotor peripheral surface (outer peripheral surface) 350 of the rotor 35 in the radial direction. A space 754 is formed between the distal end surface 753 and the rotor peripheral surface 350. The first receiving portion 751 is shaped in a bottomed tubular form and thereby receives the magnetic detector 600 and first terminals 81 of the terminals 80 described later. Furthermore, the first receiving portion 751 receives the circuit board 60 such that a portion of the circuit board 60 is exposed from the first receiving portion 751. Furthermore, the first receiving portion 751 has a first base surface 761, a first recess 771, a second base surface 762 and a second recess 772.

The first base surface 761 is a surface of the first receiving portion 751 which faces one side in the axial direction Da. The first recess 771 is a portion that is recessed from the first base surface 761 in the axial direction Da. A portion of the first magnetic guide member 71 is fitted into the first recess 771, and thereby the first magnetic guide member 71 is installed to the sensor case 75.

The second base surface 762 is a surface of the first receiving portion 751 which faces the other side in the axial direction Da which is opposite to the one side. The second recess 772 is a portion that is recessed from the second base surface 762 in the axial direction Da. A portion of the second magnetic guide member 72 is fitted into the second recess 772, and thereby the second magnetic guide member 72 is installed to the sensor case 75.

The second receiving portion 752 is shaped in a bottomed tubular form. Furthermore, the second receiving portion 752 is joined to the first receiving portion 751 in the radial direction. The second receiving portion 752 receives second terminals 82 of the terminals 80 described later.

Each of the terminals 80 has the first terminal 81 and the second terminal 82. The first terminal 81 extends in the axial direction Da. A portion of the first terminal 81 is inserted into a corresponding one of holes of the circuit board 60. Furthermore, the first terminal 81 is soldered to the circuit board 60 and is thereby connected to the circuit board 60. The second terminal 82 is joined to the first terminal 81 and extends in the radial direction. Furthermore, the second terminal 82 is connected to the motor control device 18. Thus, the signal from the magnetic detector 600 is outputted to the motor control device 18 through the corresponding terminal 80.

The cover 85 is made of, for example, resin. Furthermore, the cover 85 has a sensor cover portion 851 and a rotor cover portion 852.

The sensor cover portion 851 is joined to a portion of the first base surface 761 by, for example, welding or bonding. Furthermore, the sensor cover portion 851 covers exposed portions of the first magnetic guide member 71, the circuit board 60 and the first terminals 81 which are exposed from the sensor case 75.

The rotor cover portion 852 is joined to the sensor cover portion 851. Furthermore, the rotor cover portion 852 covers the first-yoke ring 370 in cooperation with the first receiving portion 751 of the sensor case 75. Also, the rotor cover portion 852 is shaped in a circular ring form and has a cover hole 853. A portion of the rotor 35 is inserted into the cover hole 853 in the axial direction Da. Therefore, movement of the rotor 35 in the radial direction is limited. The rotor cover portion 852 is opposed to the first-yoke ring 370 in the axial direction Da. Therefore, movement of the first-yoke ring 370 in the axial direction Da is limited, and movement of the rotor 35 in the axial direction Da is limited.

Here, a distance, which is measured from a part of the connecting portion 601 where the first-yoke ring 370 and the cover 85 overlap each other in the axial direction Da to a part of the first-yoke ring 370 where the cover 85 and the connecting portion 601 overlap each other in the axial direction Da, is defined as a first distance L1. Furthermore, a distance, which is measured from the part of the connecting portion 601 where the first-yoke ring 370 and the cover 85 overlap each other in the axial direction Da to a part of the cover 85 where the first-yoke ring 370 and the connecting portion 601 overlap each other in the axial direction Da, is defined as a second distance L2. The first distance L1 is smaller than the second distance L2.

The torque sensor 25 is configured in the above-described manner. Next, the detection of the steering torque with the torque sensor 25 will be described.

Figure 7:
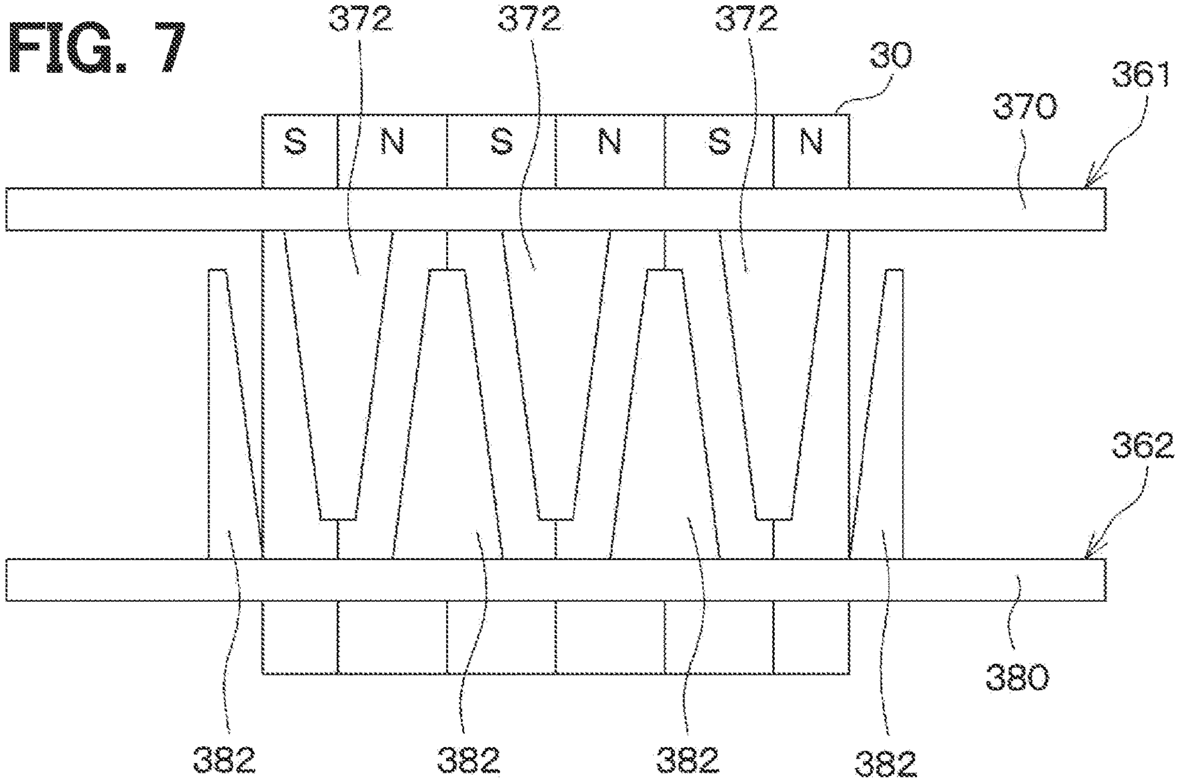
FIG. 7 is a side view showing a neutral state of a magnet, a first yoke and a second yoke of a torque sensor.

It is assumed that no steering torque is generated by the steering wheel 5 when the steering wheel 5 is not rotated. In this case, as shown in FIG. 7, a phase of the magnet 30, the first-yoke claws 372 and the second-yoke claws 382 is held in a neutral state in the circumferential direction. In this neutral state, a center of each first-yoke claw 372 and a center of each second-yoke claw 382 coincide with a boundary between the corresponding N-pole and the corresponding S-pole of the magnet 30 in the circumferential direction. In this neutral state, a center of each first-yoke claw 372 coincides with a corresponding boundary between the corresponding N-pole and the corresponding S-pole of the magnet 30 in the circumferential direction, and a center of each second-yoke claw 382 coincides with a corresponding boundary between the corresponding N-pole and the corresponding S-pole of the magnet 30 in the circumferential direction. At this time, the number of magnetic field lines, which extend from the N-pole of the magnet 30 and pass through the first-yoke claw 372, is the same as the number of magnetic field lines, which extend from the N-pole of the magnet 30 and pass through the second-yoke claw 382. Therefore, a magnetic flux density is not generated between the first yoke 361 and the second yoke 362.

Then, when the steering wheel 5 is rotated, the steering torque is generated. Thereby, the first steering shaft 11, which is coupled to the steering wheel 5, is rotated. Furthermore, the torsion bar 13, which is fixed to the first steering shaft 11 by the shaft pin 14, is rotated. Also, the second steering shaft 12, which is fixed to the torsion bar 13 by the shaft pin 14, is rotated. Furthermore, the second steering shaft 12 is coupled to the fixation collar 354. Therefore, the rotor 35 is rotated. Thereby, the first yoke 361 and the second yoke 362, which are integrally formed with the rotor 35, are rotated relative to the magnet 30.

Figure 8:
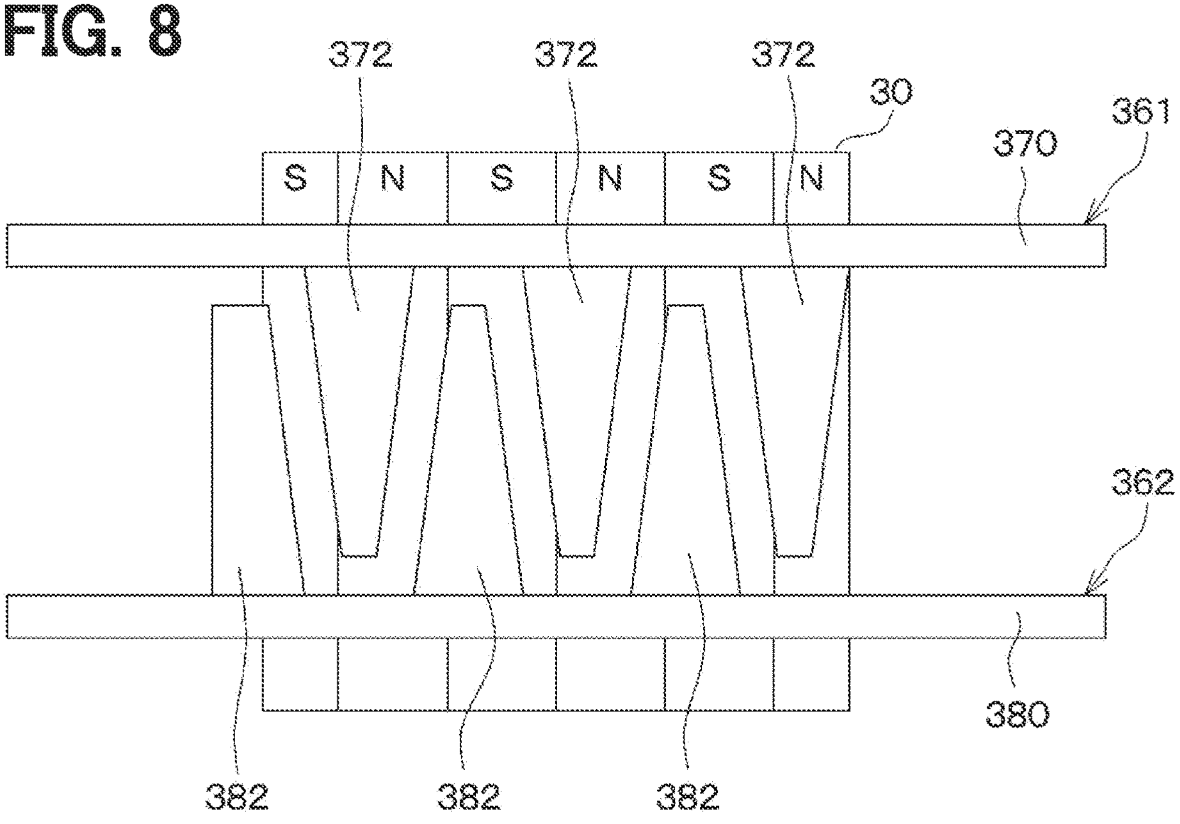
FIG. 8 is a side view of the magnet, the first yoke and the second yoke of the torque sensor when a steering wheel of the steering system is rotated.

In this case, as shown in FIG. 8, an overlapping area between the N-pole of the magnet 30 and the first-yoke claw 372 in the direction perpendicular to the axial direction Da is increased. Furthermore, an overlapping area between the S-pole of the magnet 30 and the second-yoke claw 382 in the direction perpendicular to the axial direction Da is increased. At this time, the number of magnetic field lines, which extend from the N-pole of the magnet 30 to the first-yoke claw 372, is increased, and the number of magnetic field lines, which extend from the second-yoke claw 382 to the S-pole of the magnet 30, is increased. Therefore, the magnetic flux density is generated between the first yoke 361 and the second yoke 362.

Here, as described above, the first magnetic guide member 71 is made of the soft magnetic material and is opposed to the first-yoke ring 370 and the magnetic detector 600 in the axial direction Da. Furthermore, as described above, the second magnetic guide member 72 is made of the soft magnetic material and is opposed to the magnetic detector 600 and the second-yoke ring 380 in the axial direction Da.

Therefore, at this time, the number of magnetic field lines, which extend from the N-pole of the magnet 30 and pass through the magnetic detector 600 via the first-yoke ring 370 and the first magnetic guide member 71, is increased. Furthermore, the magnetic field lines, which have passed through the magnetic detector 600, pass through the S-pole of the magnet 30 via the second magnetic guide member 72 and the second-yoke ring 380.

Thus, the magnetic detector 600 detects the strength of the magnetic field directed toward one side among two opposite sides in the axial direction Da. Thereby, the magnetic detector 600 detects the steering torque. Furthermore, the magnetic detector 600 outputs a signal, which corresponds to the detected strength of the magnetic field, to the motor control device 18 through the corresponding terminal 80. The motor control device 18 calculates the steering torque based on the signal outputted from the magnetic detector 600.

Figure 9:
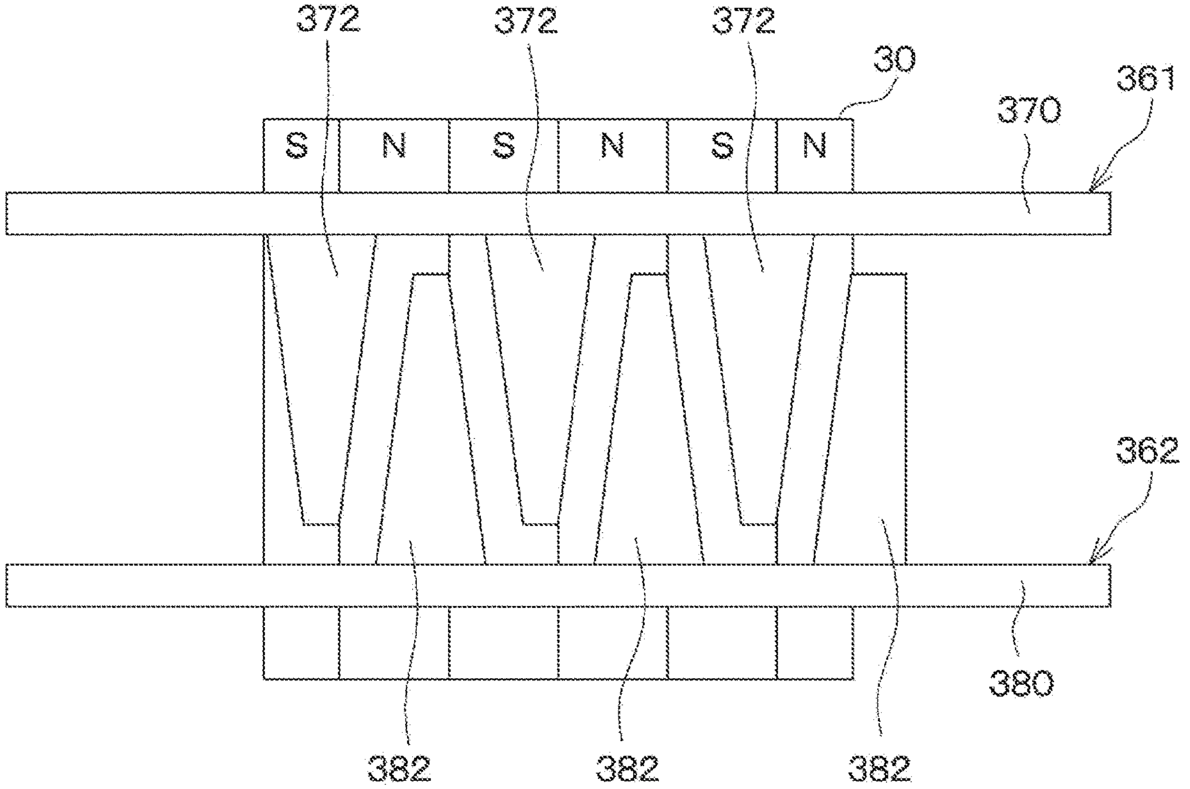
FIG. 9 is a side view of the magnet, the first yoke and the second yoke of the torque sensor when the steering wheel is further rotated.
Figure 10:
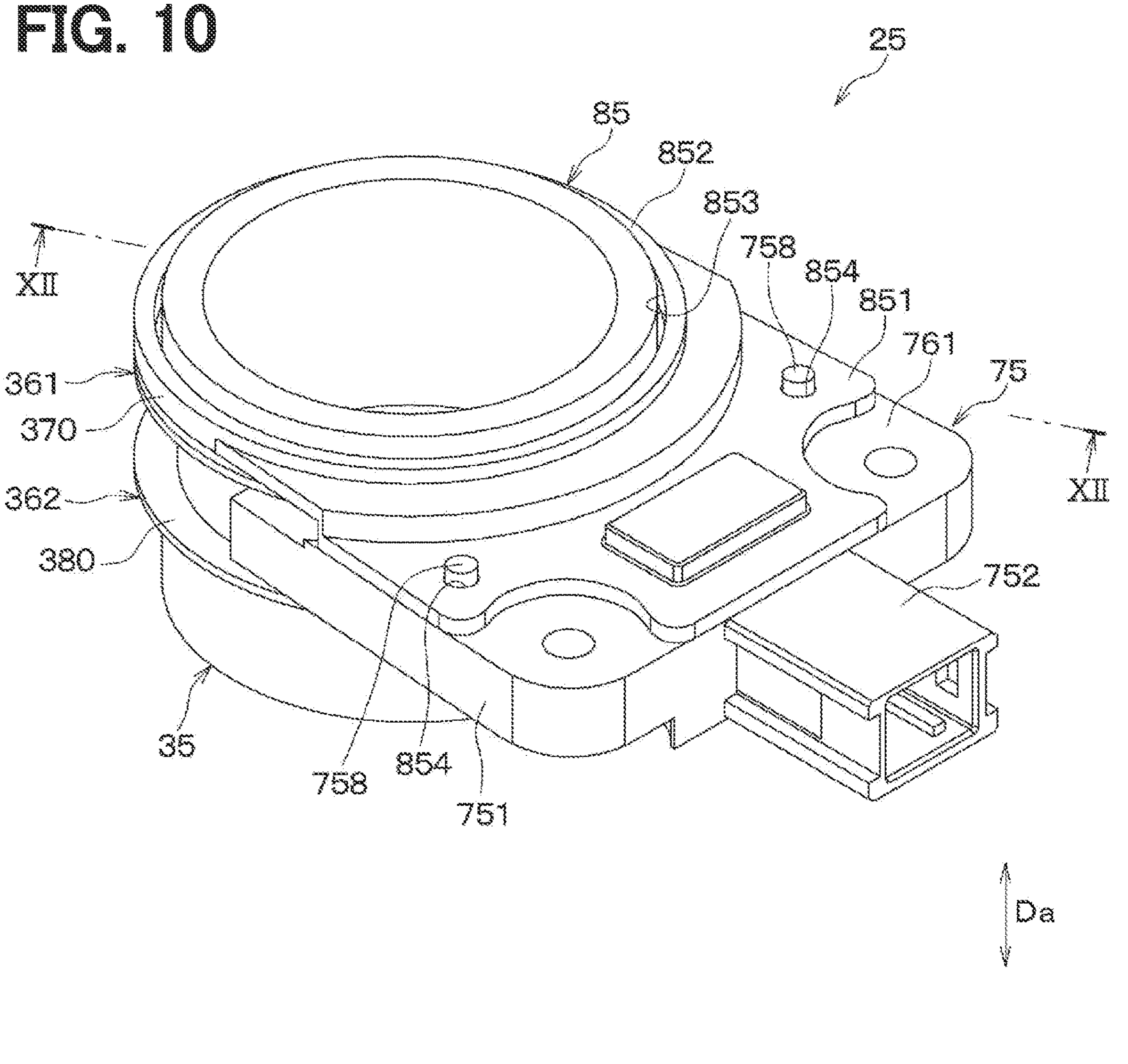
FIG. 10 is a perspective view of a torque detection device of a second embodiment.
Figure 11:
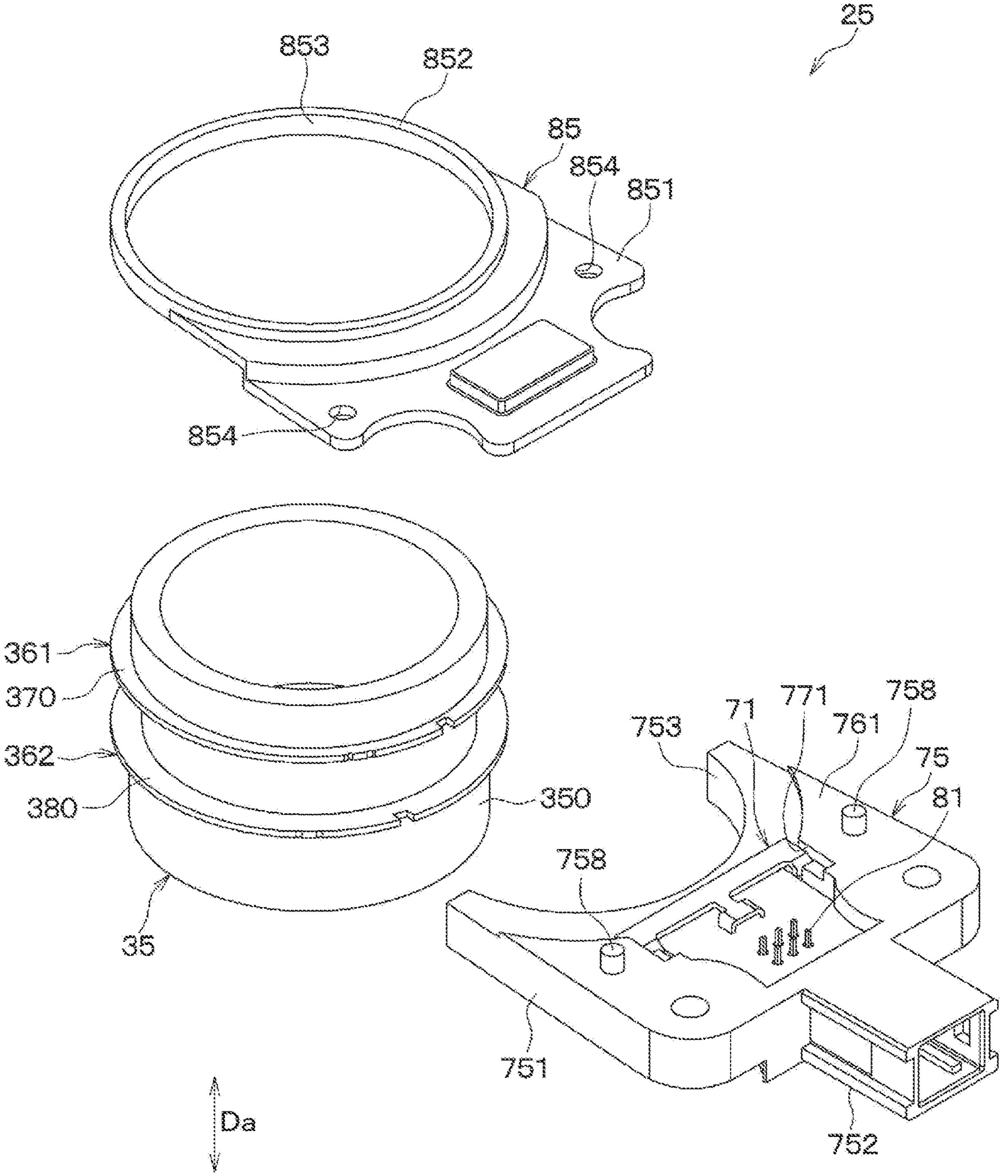
FIG. 11 is an exploded perspective view of the torque detection device.
Figure 12:
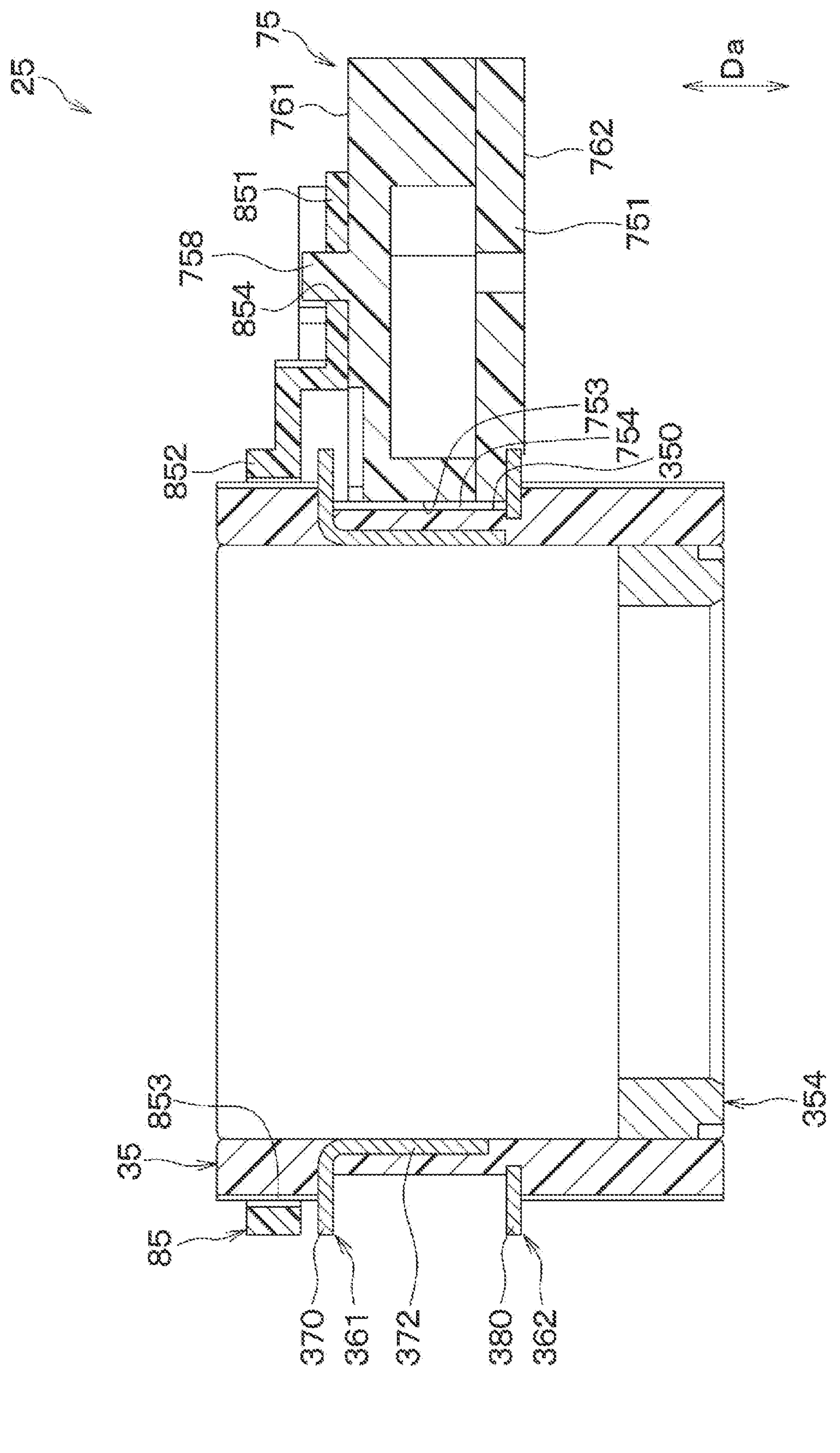
FIG. 12 is a cross-sectional view taken along line XII-XII in FIG. 10.
Figure 13:
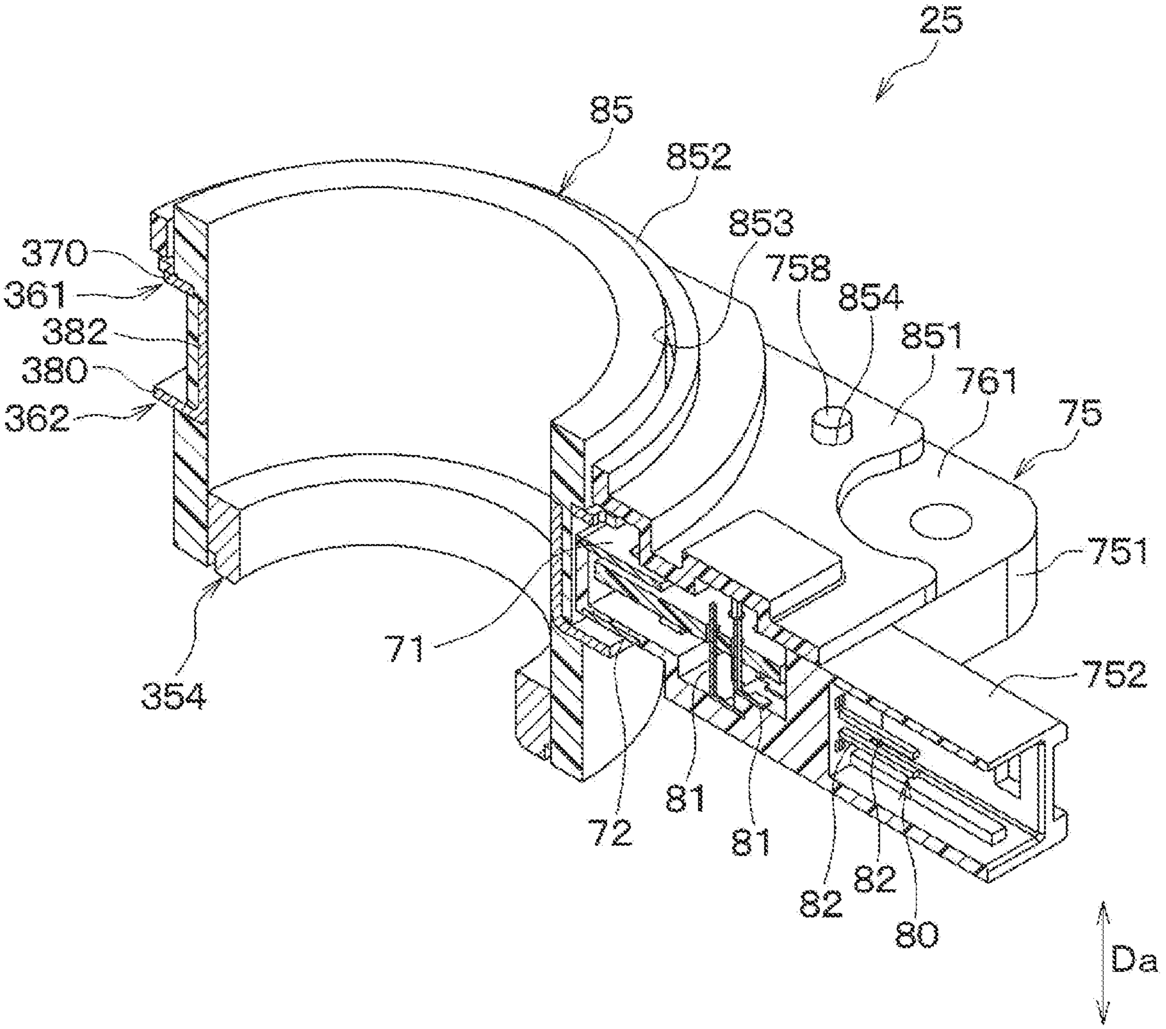
FIG. 13 is a perspective cross-sectional view of the torque detection device.
Figure 14:
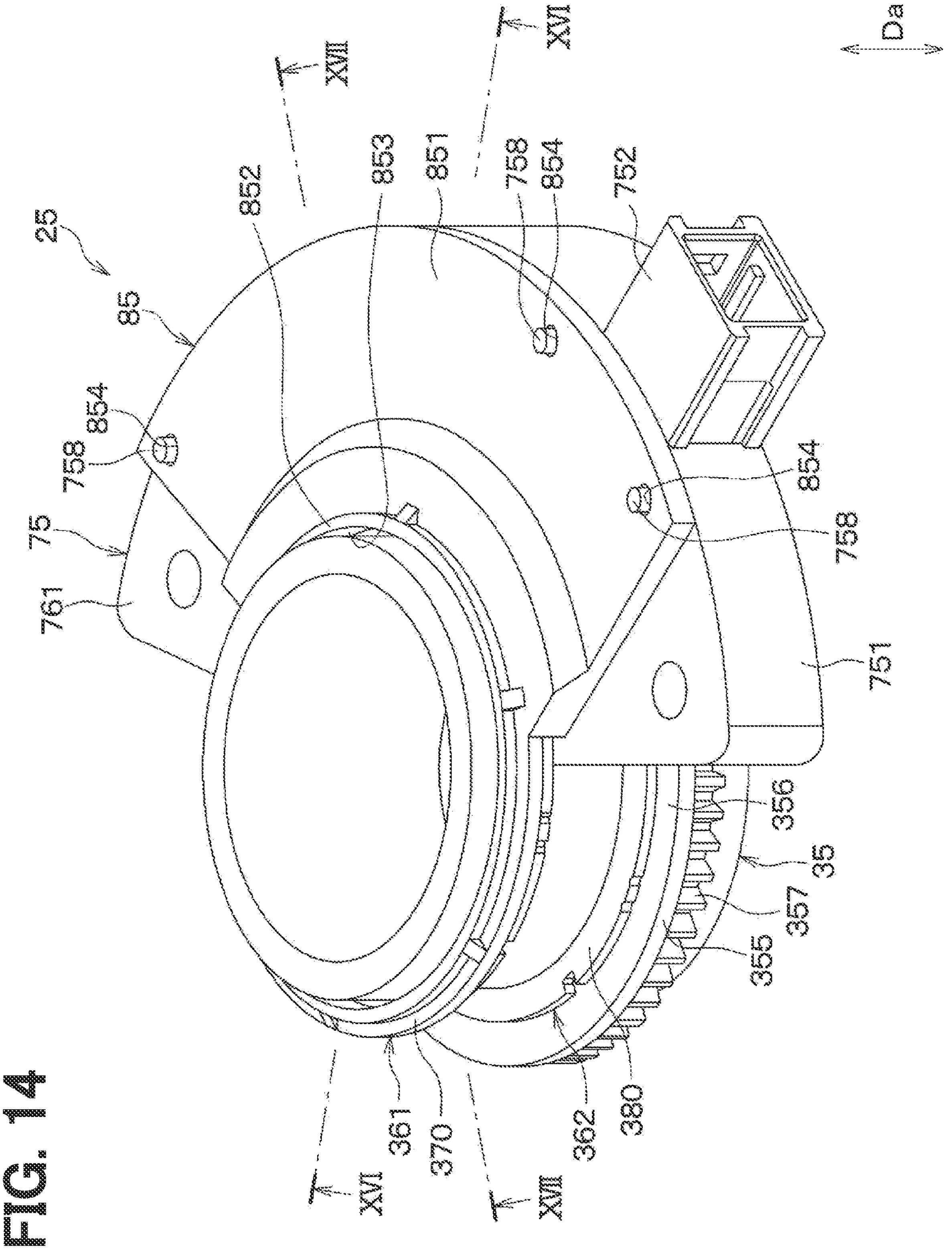
FIG. 14 is a perspective view of a torque detection device of a third embodiment.
Figure 15:
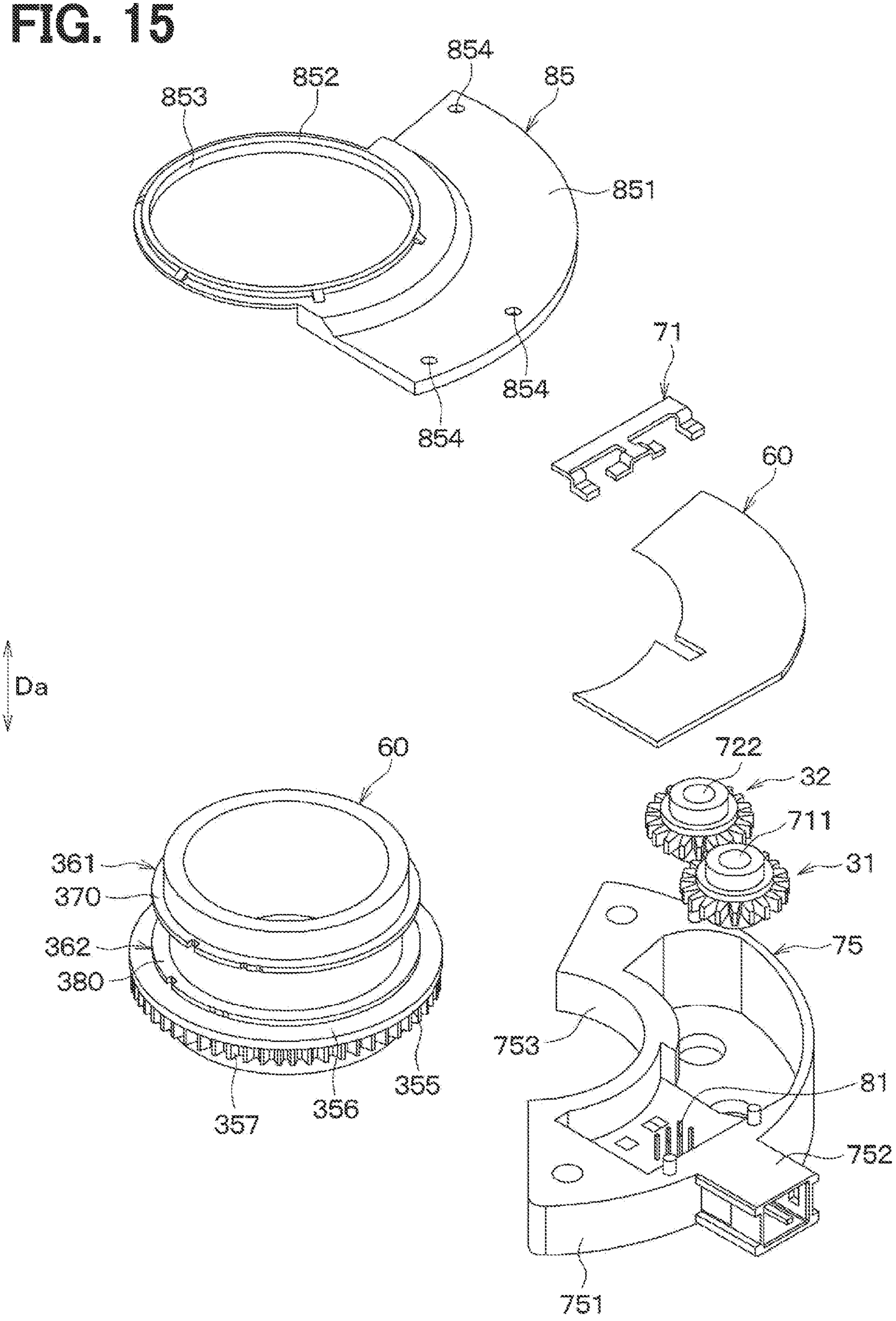
FIG. 15 is an exploded perspective view of the torque detection device.
Figure 16:
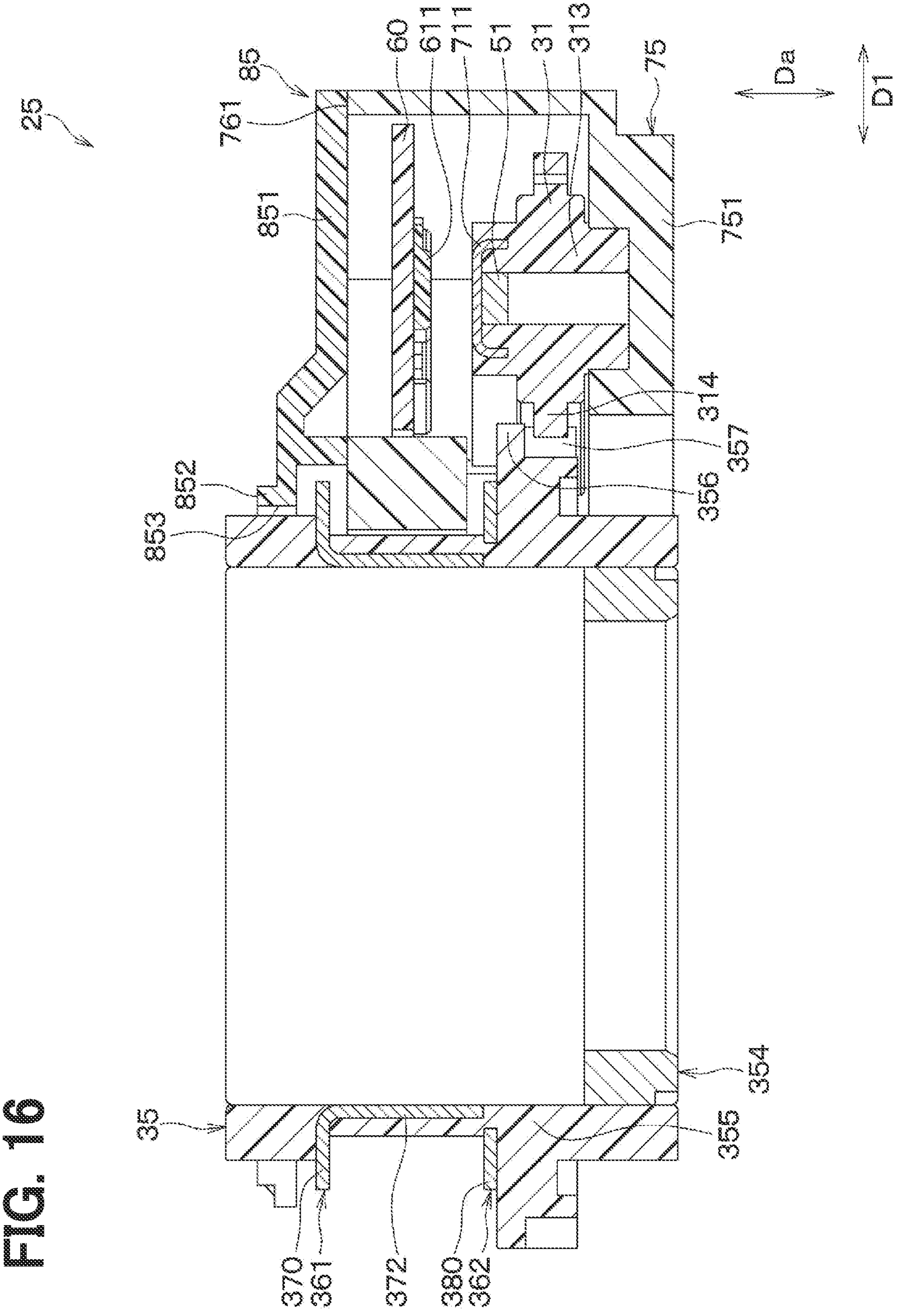
FIG. 16 is a cross-sectional view taken along line XVI-XVI in FIG. 14.
Figure 17:
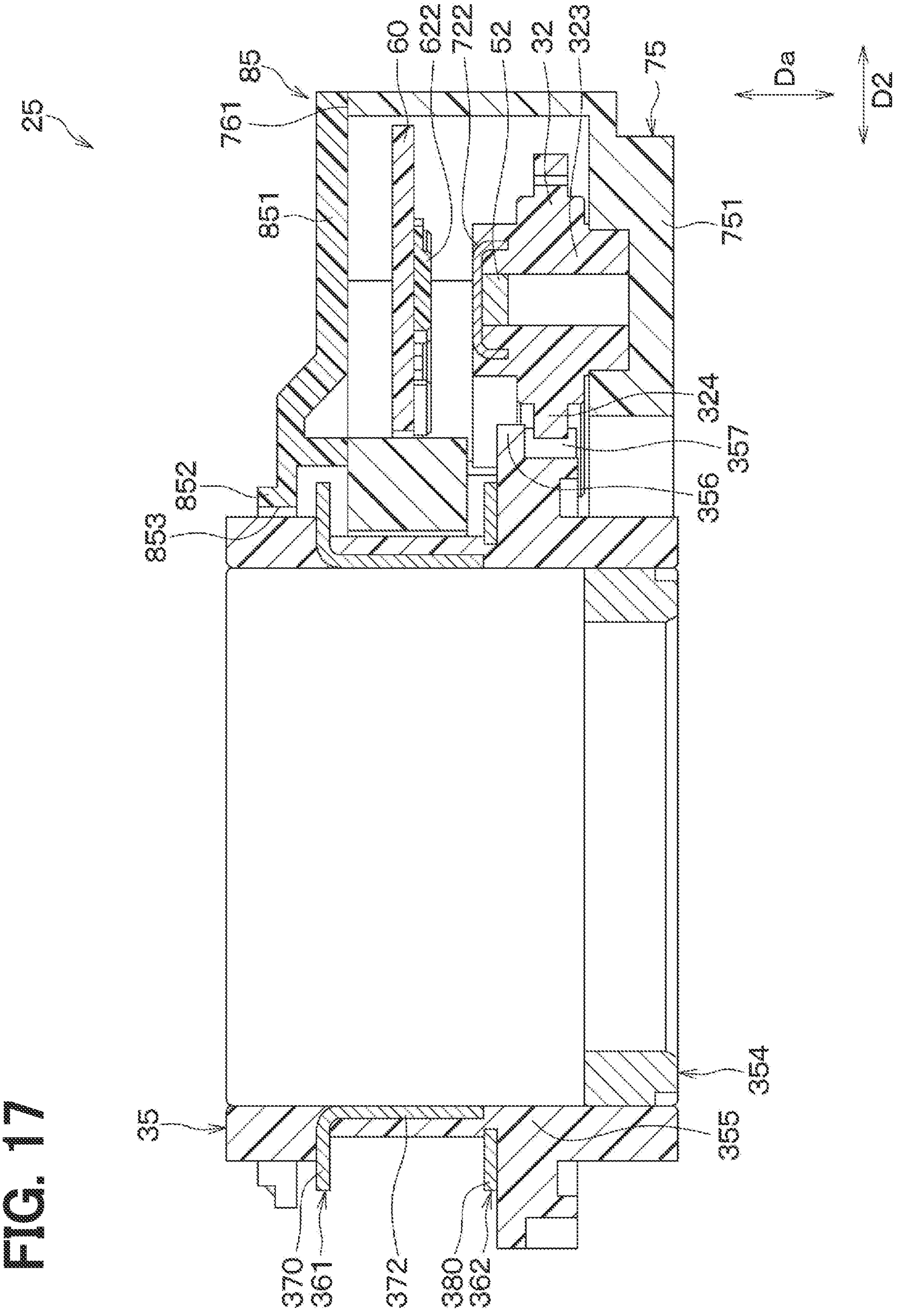
FIG. 17 is a cross-sectional view taken along line XVII-XVII in FIG. 14.
Figure 18:
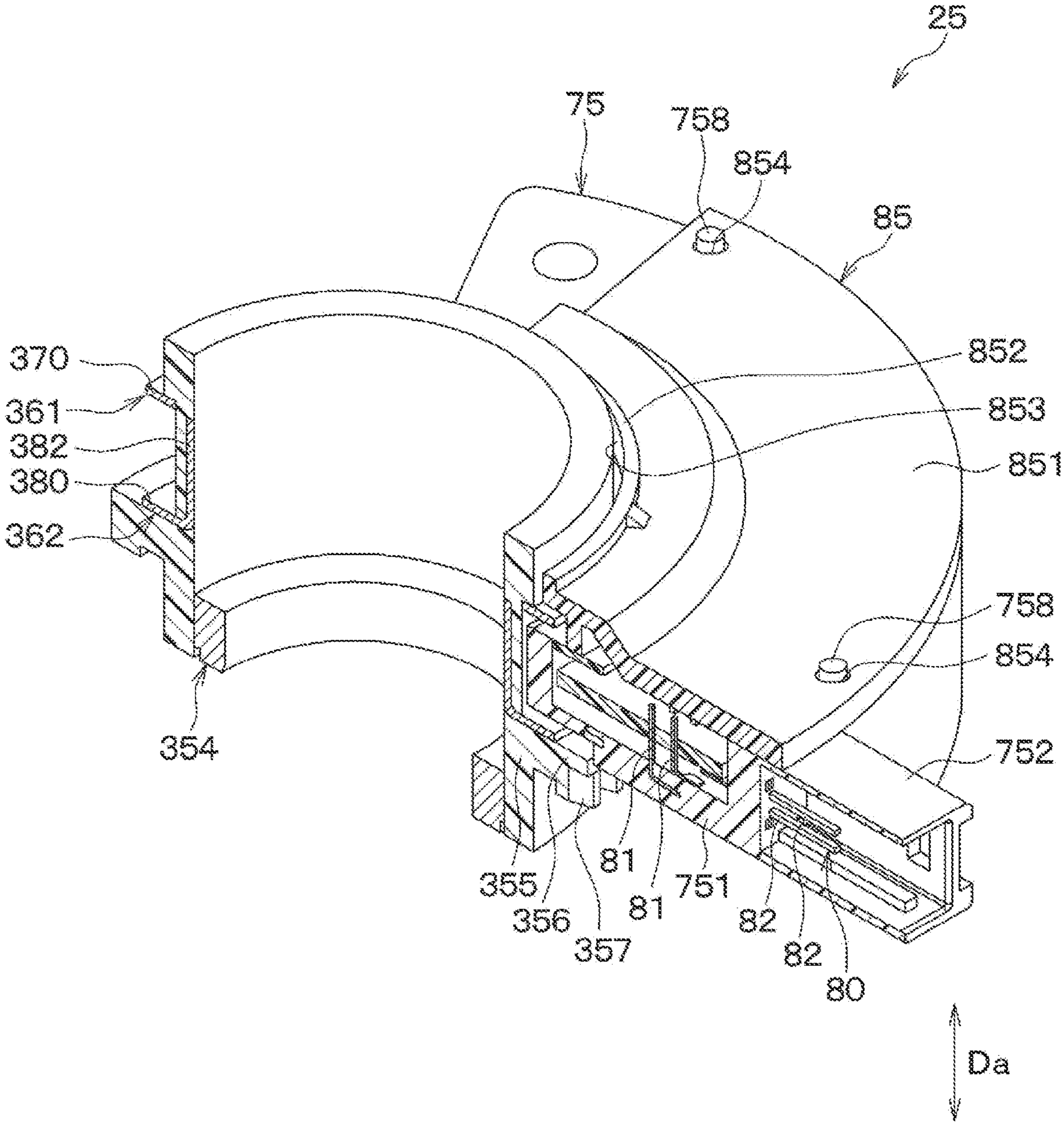
FIG. 18 is a perspective cross-sectional view of the torque detection device.
Figure 19:
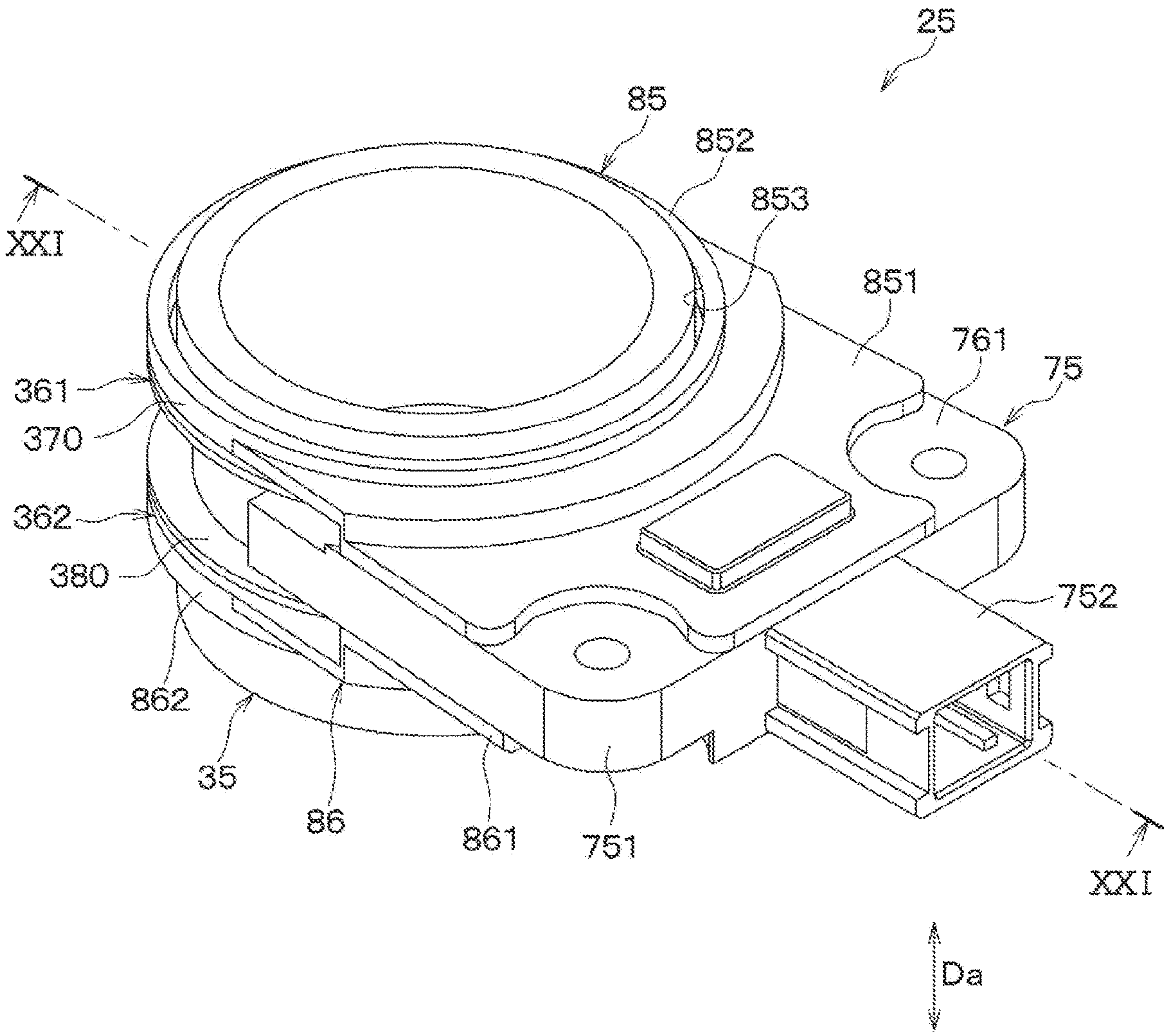
FIG. 19 is a perspective view of a torque detection device of a fourth embodiment.
Figure 20:
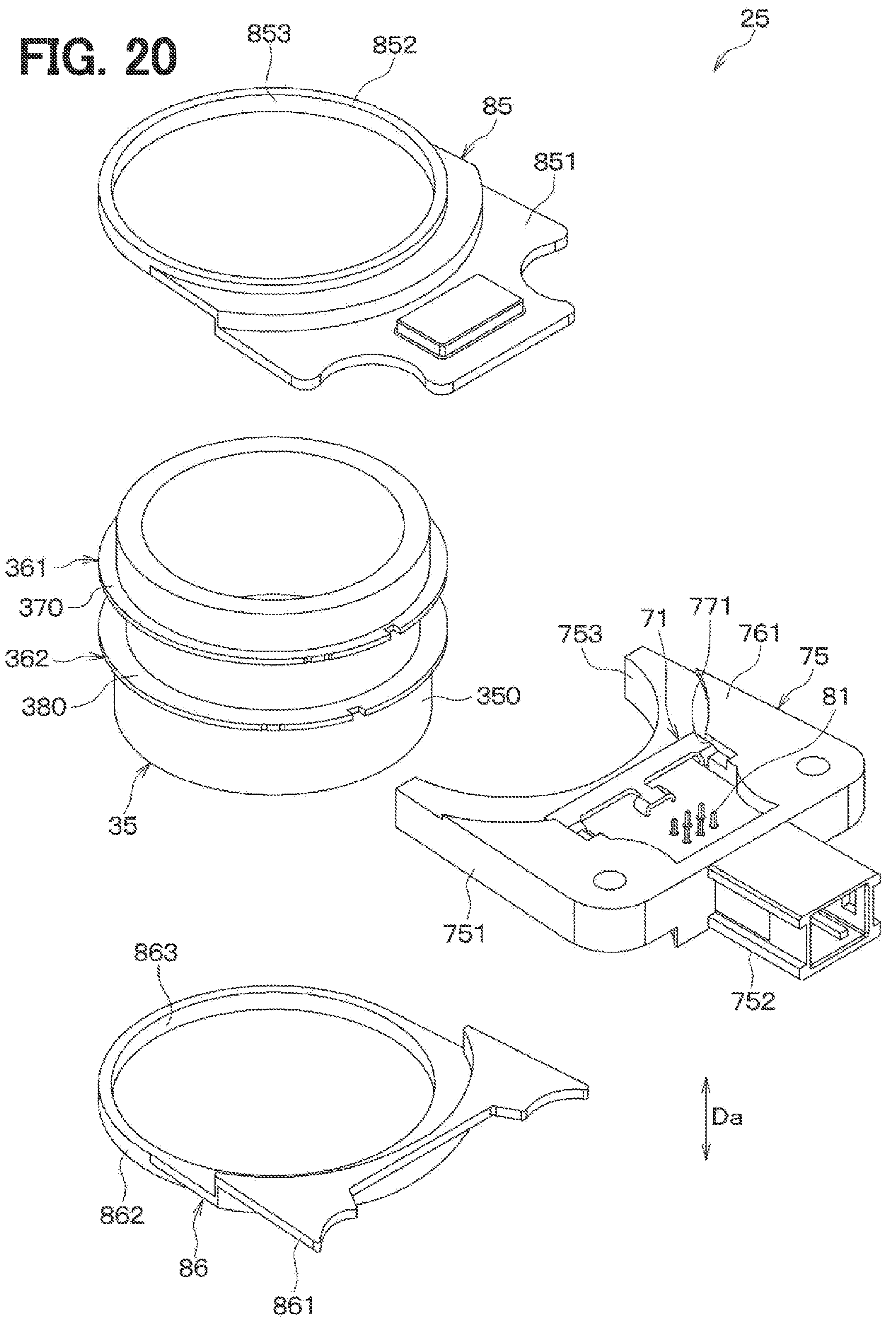
FIG. 20 is an exploded perspective view of the torque detection device.
Figure 21:
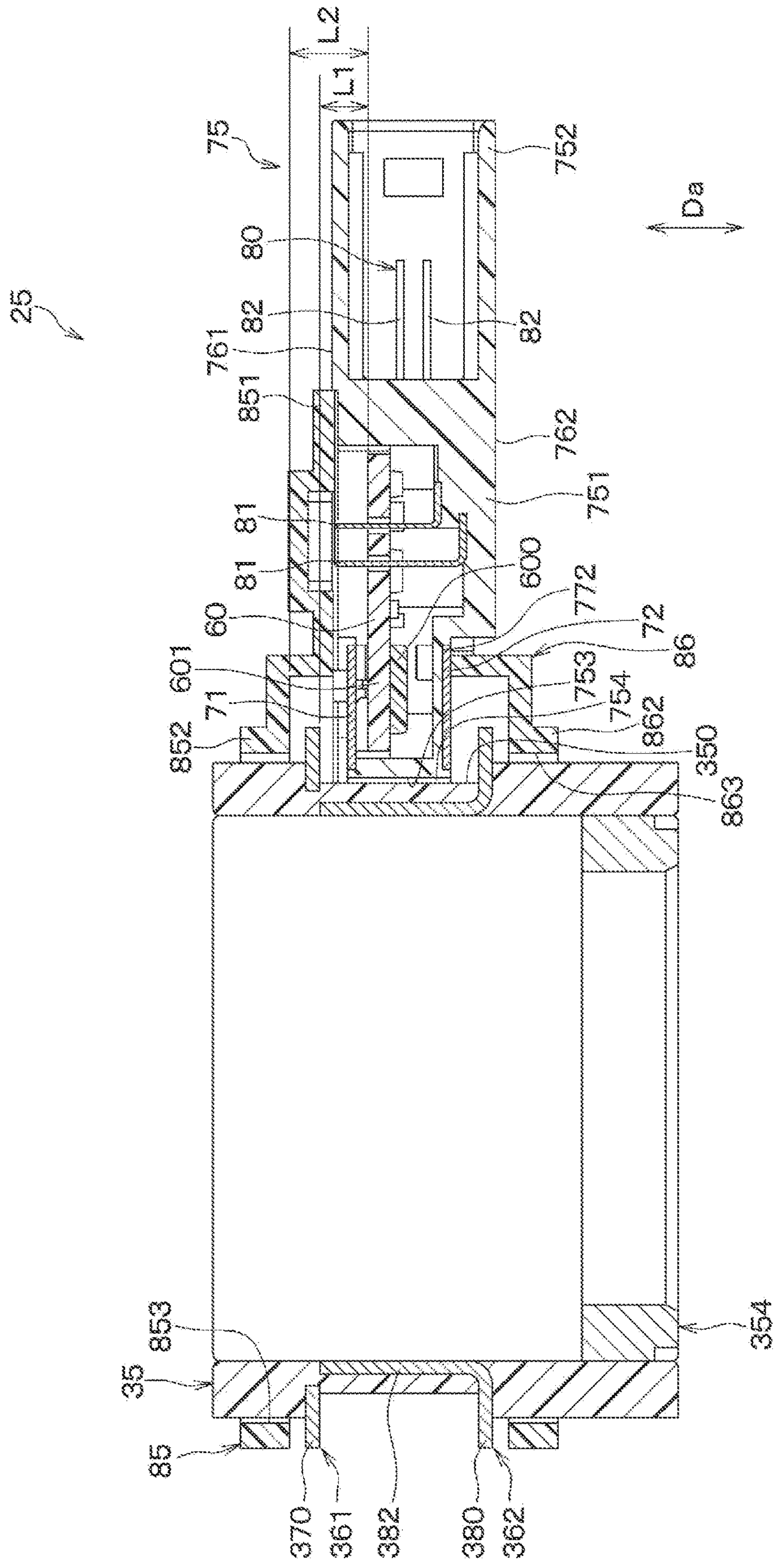
FIG. 21 is a cross-sectional view taken along line XXI-XXI in FIG. 19.
Figure 22:
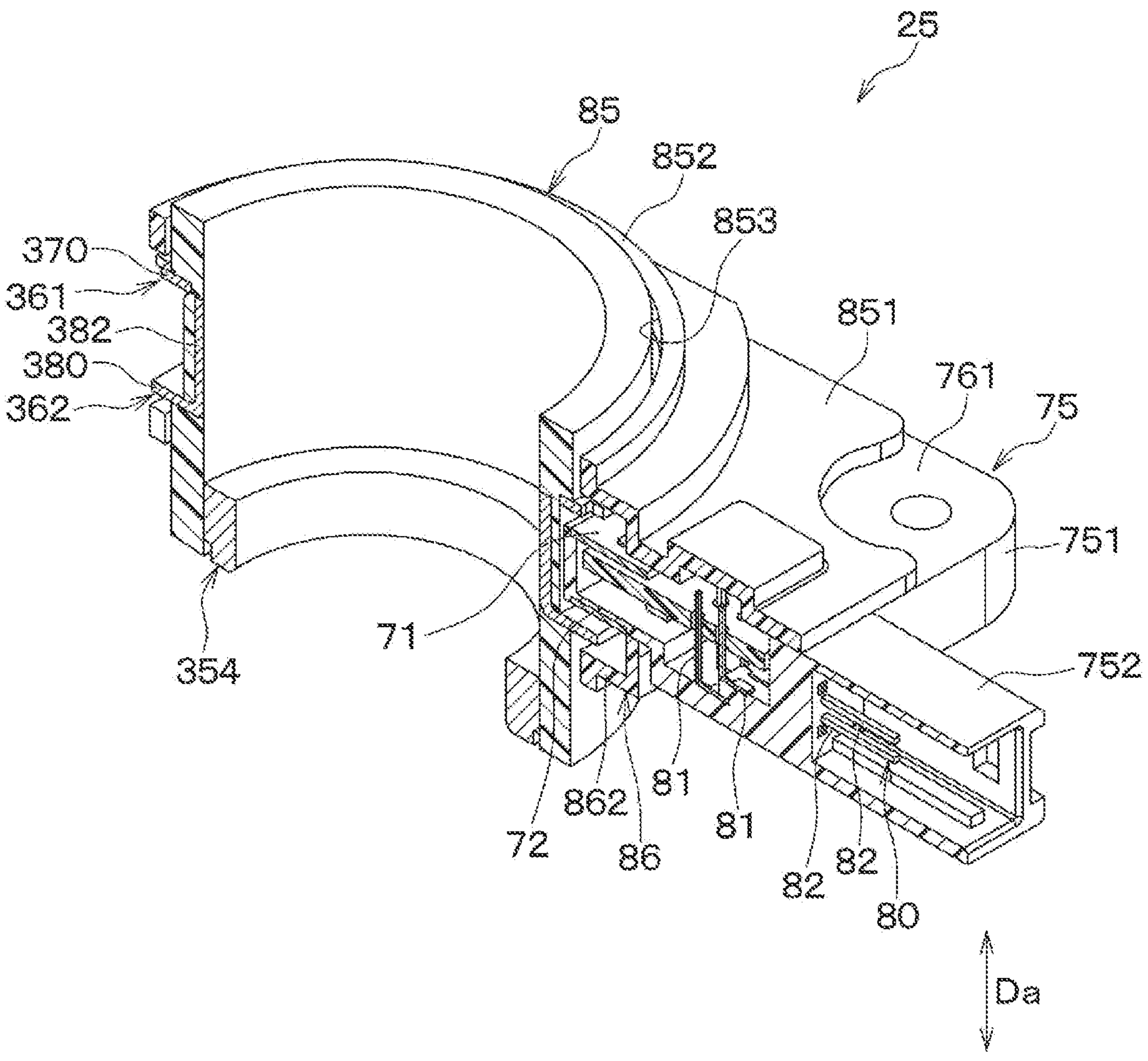
FIG. 22 is a perspective cross-sectional view of the torque detection device.
Figure 23:
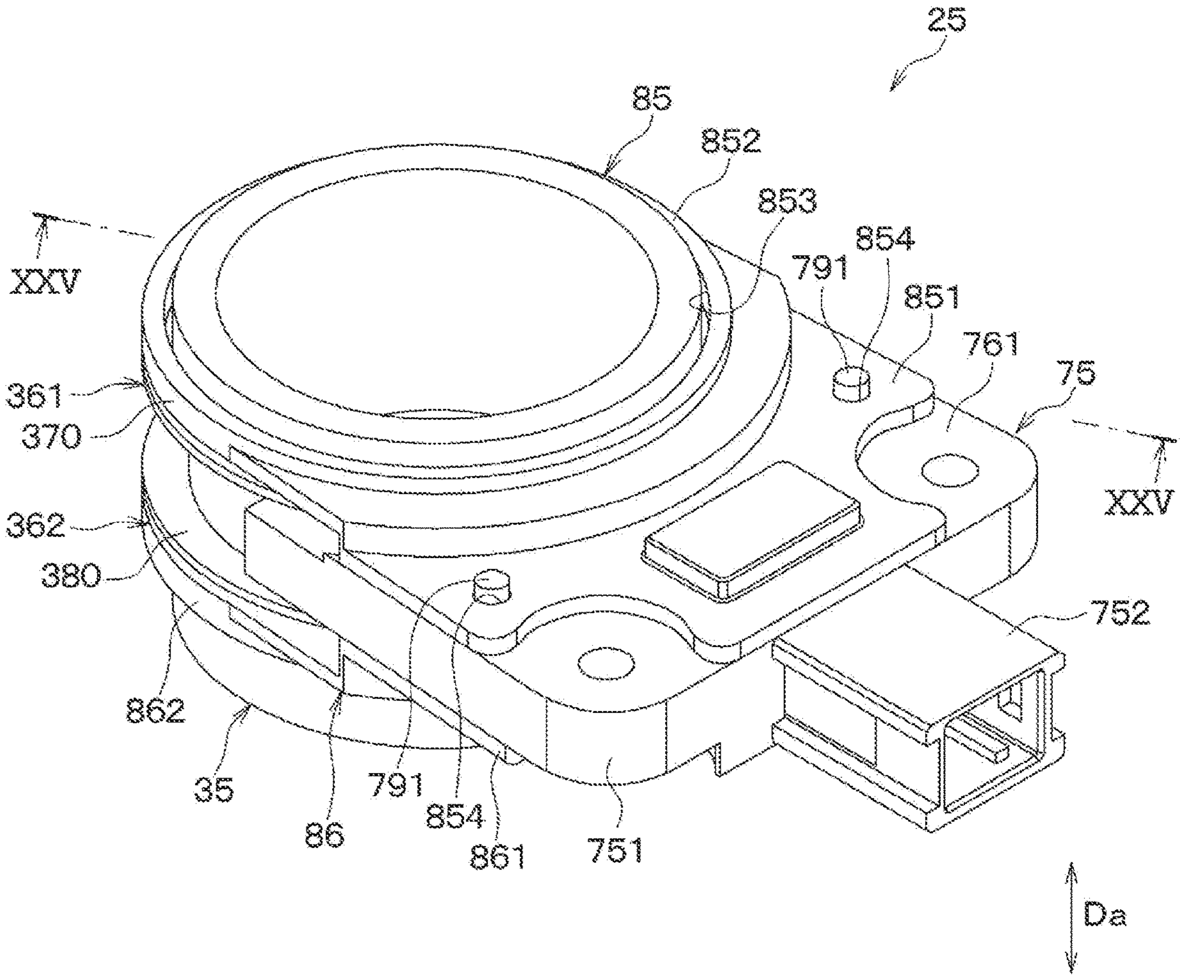
FIG. 23 is a perspective view of a torque detection device of a fifth embodiment.
Figure 24:
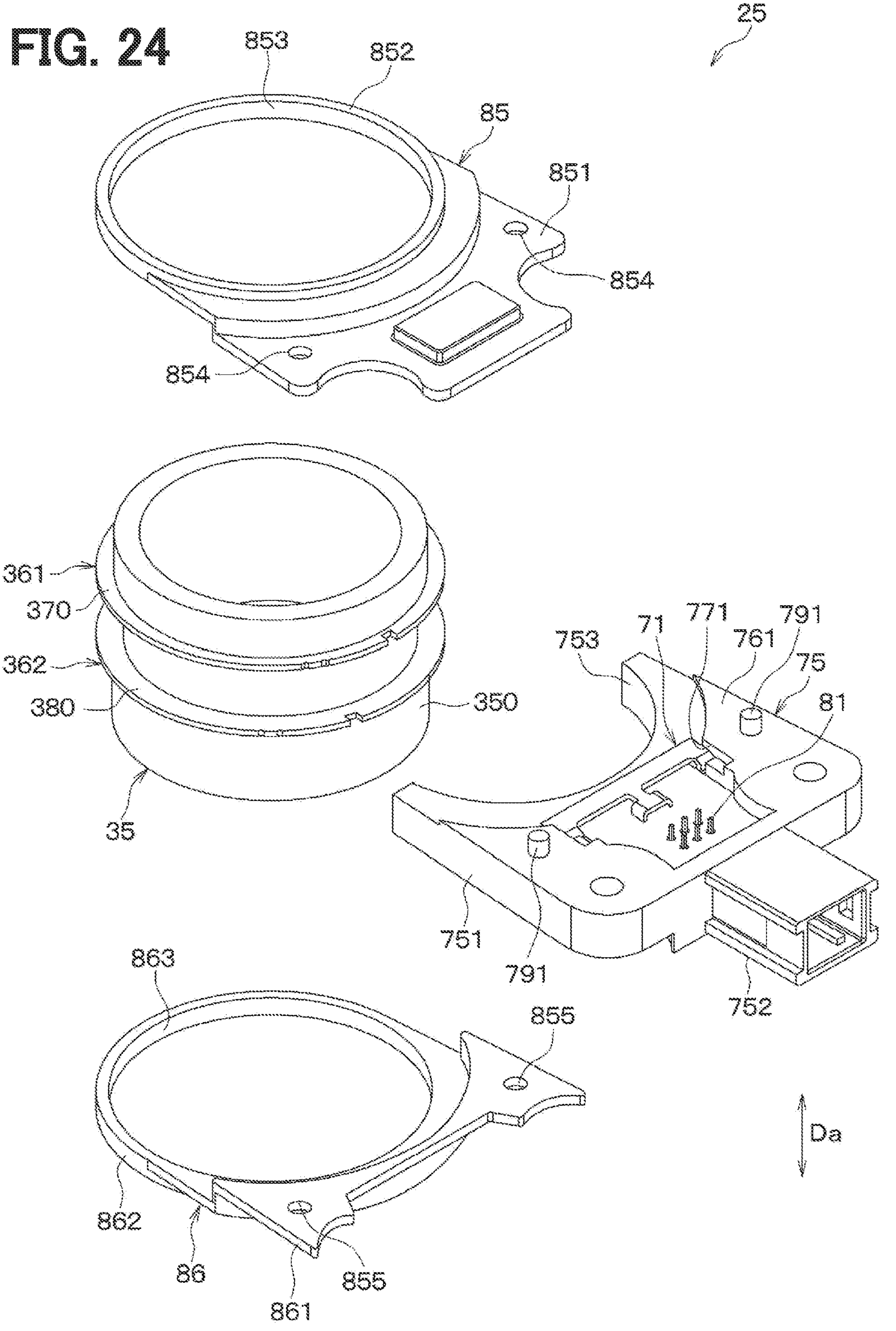
FIG. 24 is an exploded perspective view of the torque detection device.
Figure 25:
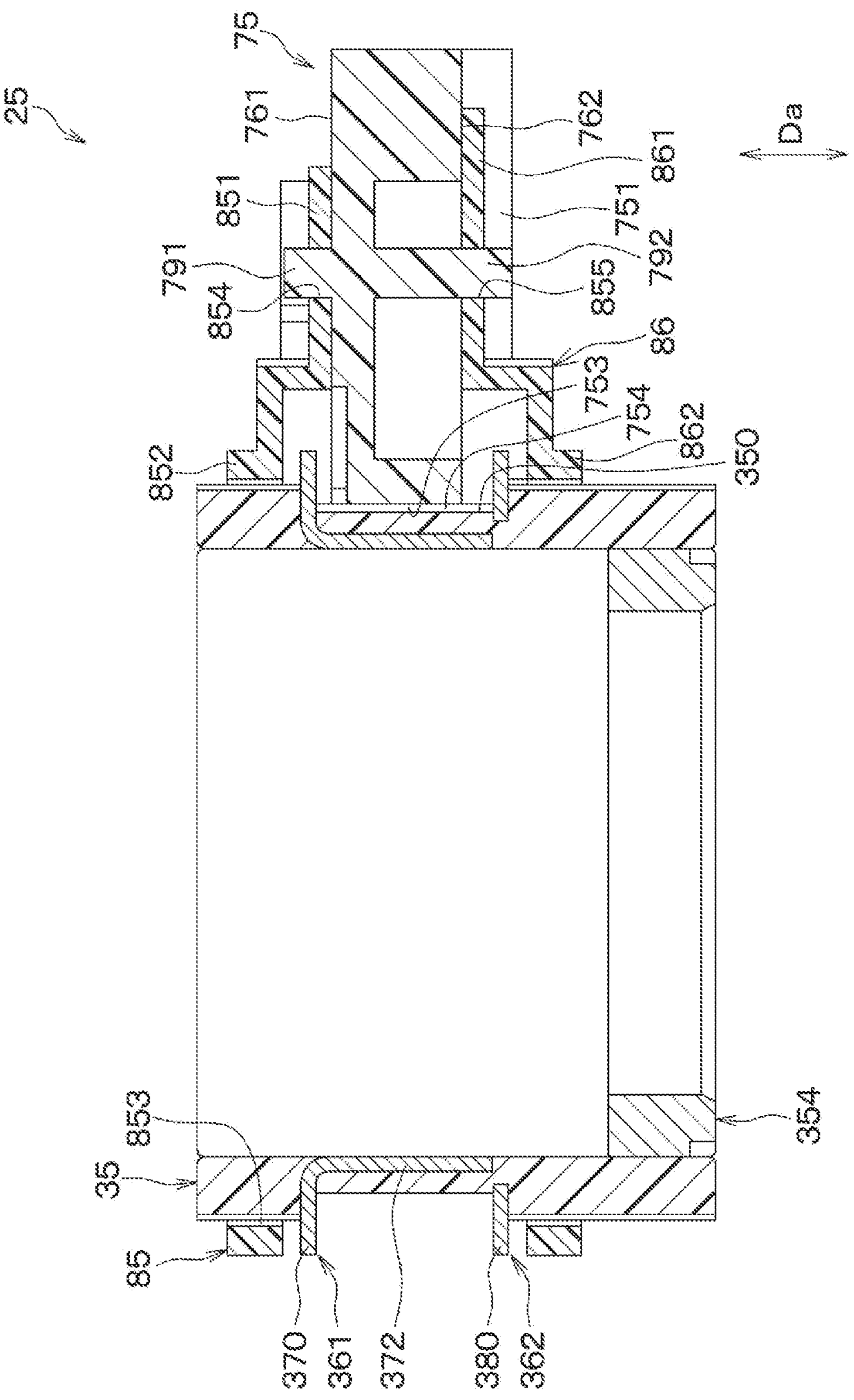
FIG. 25 is a cross-sectional view taken along line XXV-XXV in FIG. 23.
Figure 26:
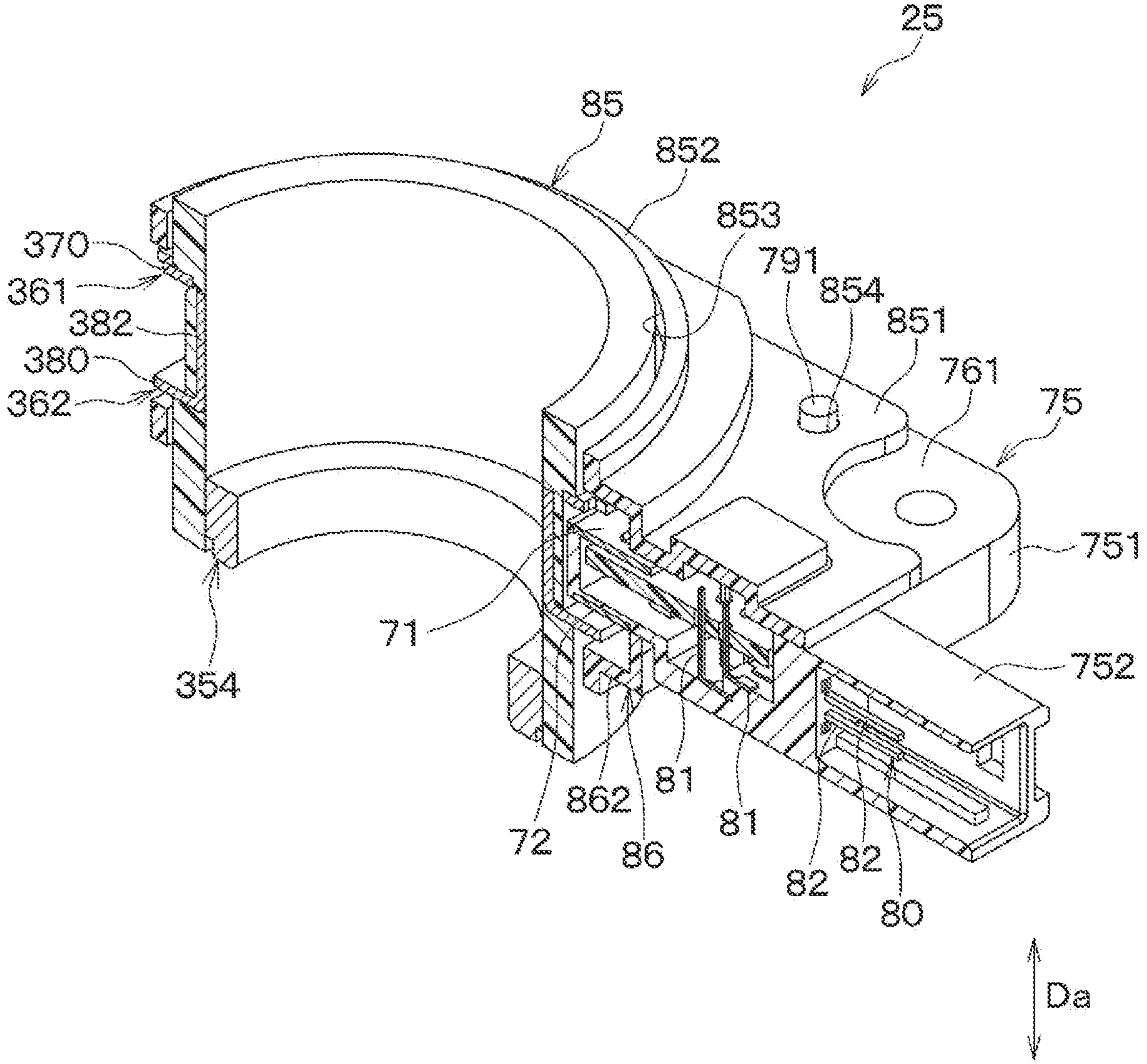
FIG. 26 is a perspective cross-sectional view of the torque detection device.
Figure 27:
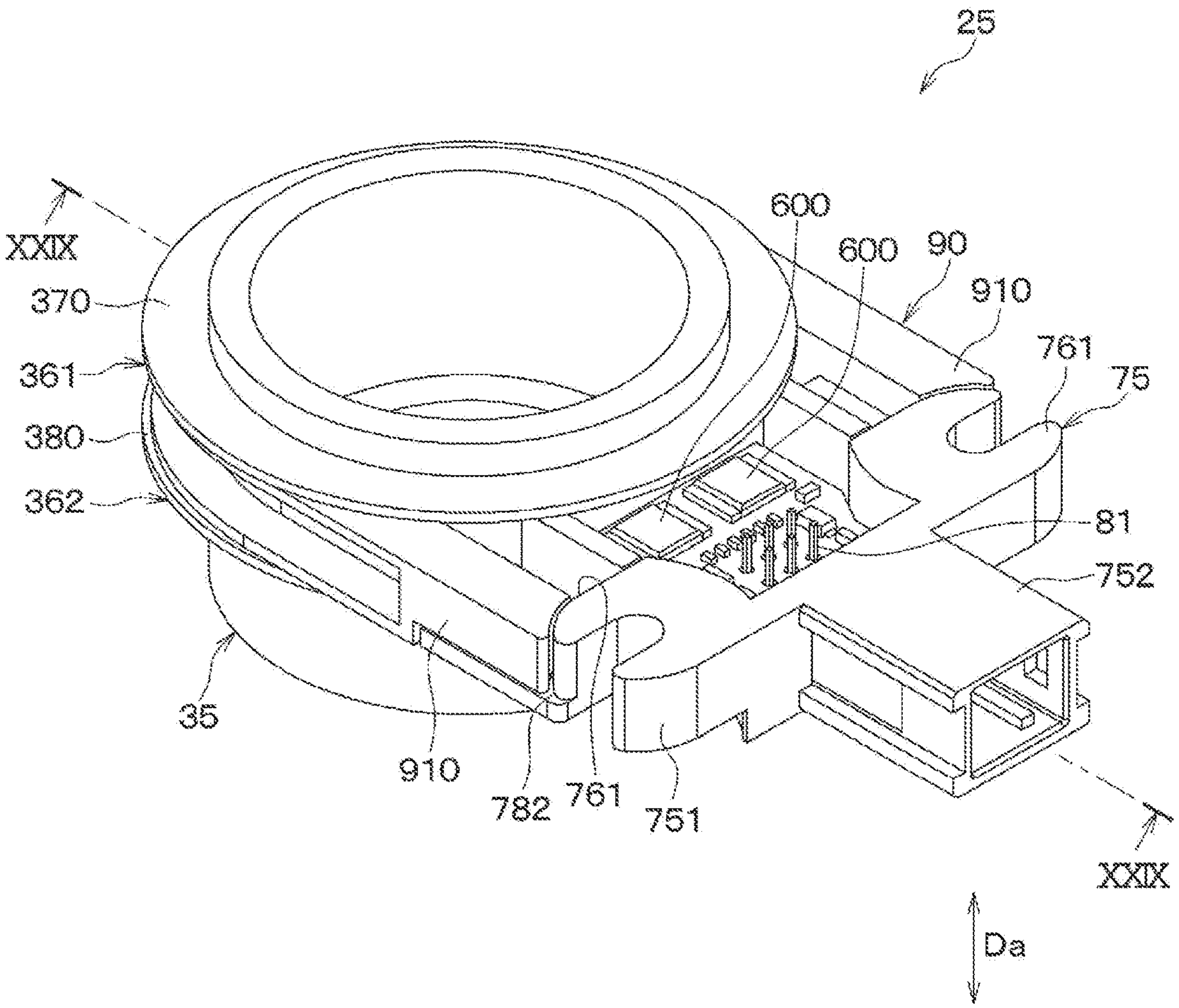
FIG. 27 is a perspective view of a torque detection device of a sixth embodiment.
Figure 28:
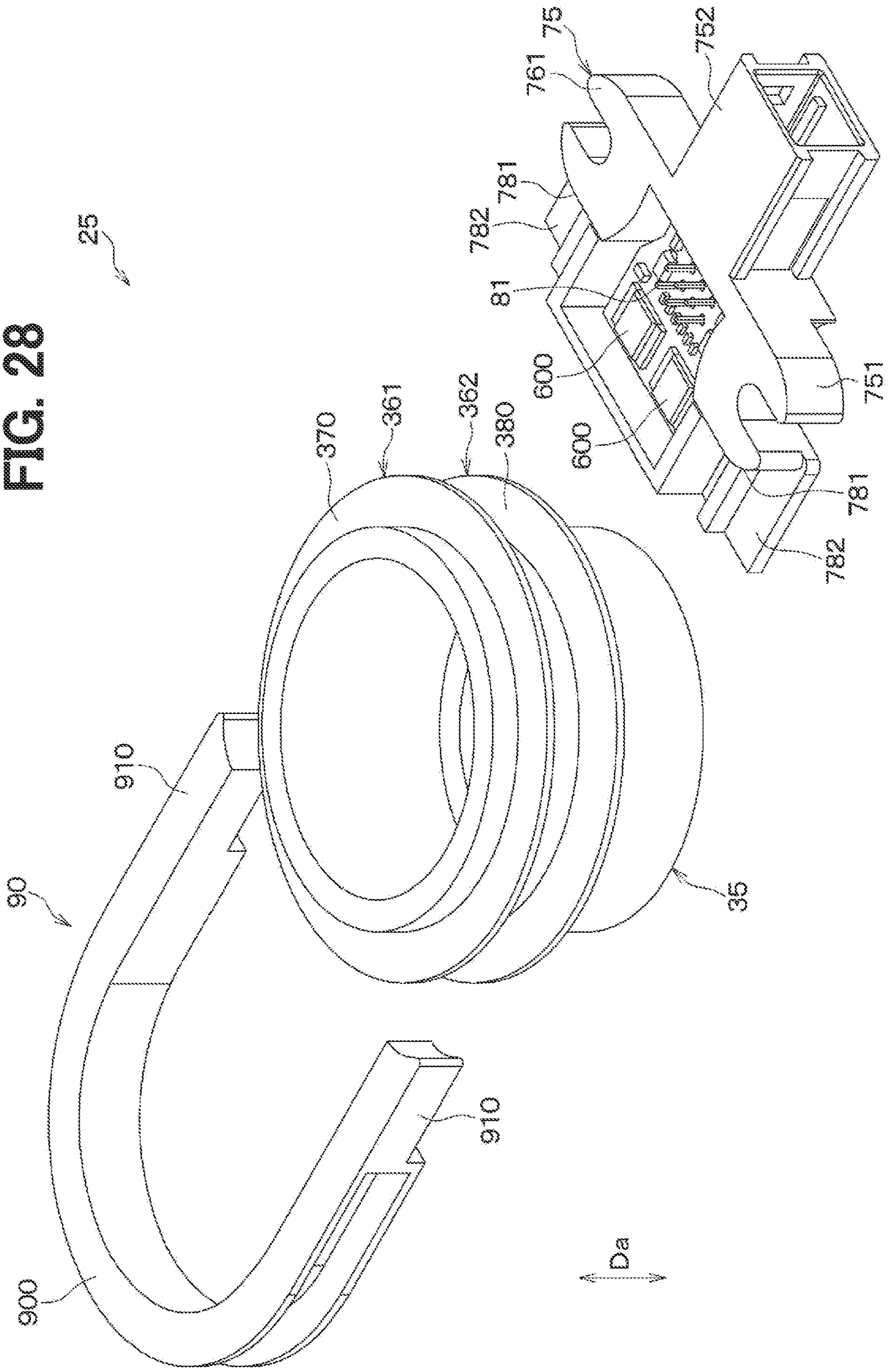
FIG. 28 is an exploded perspective view of the torque detection device.
Figure 29:
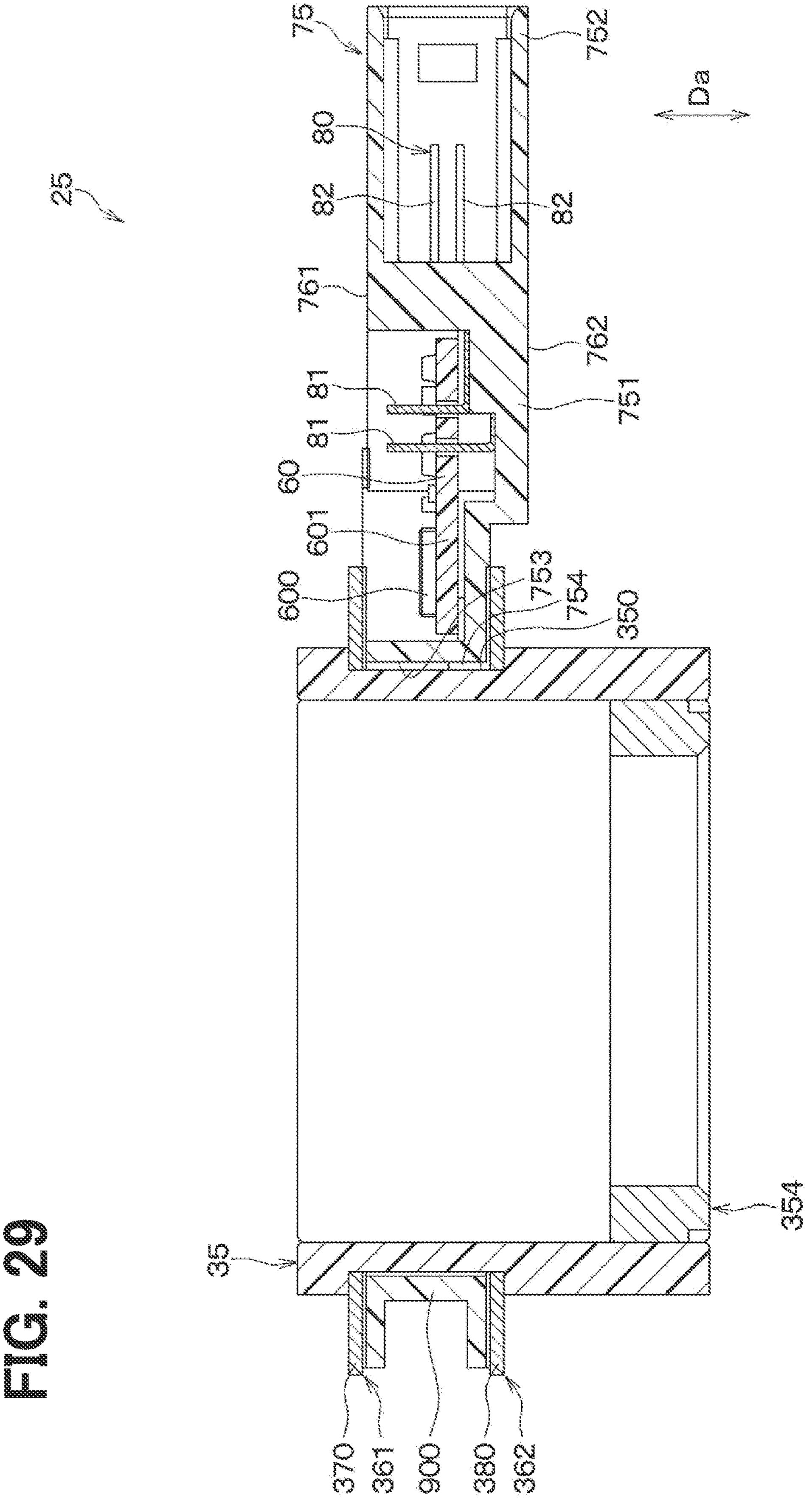
FIG. 29 is a cross-sectional view taken along line XXIX-XXIX in FIG. 27.
Figure 30:
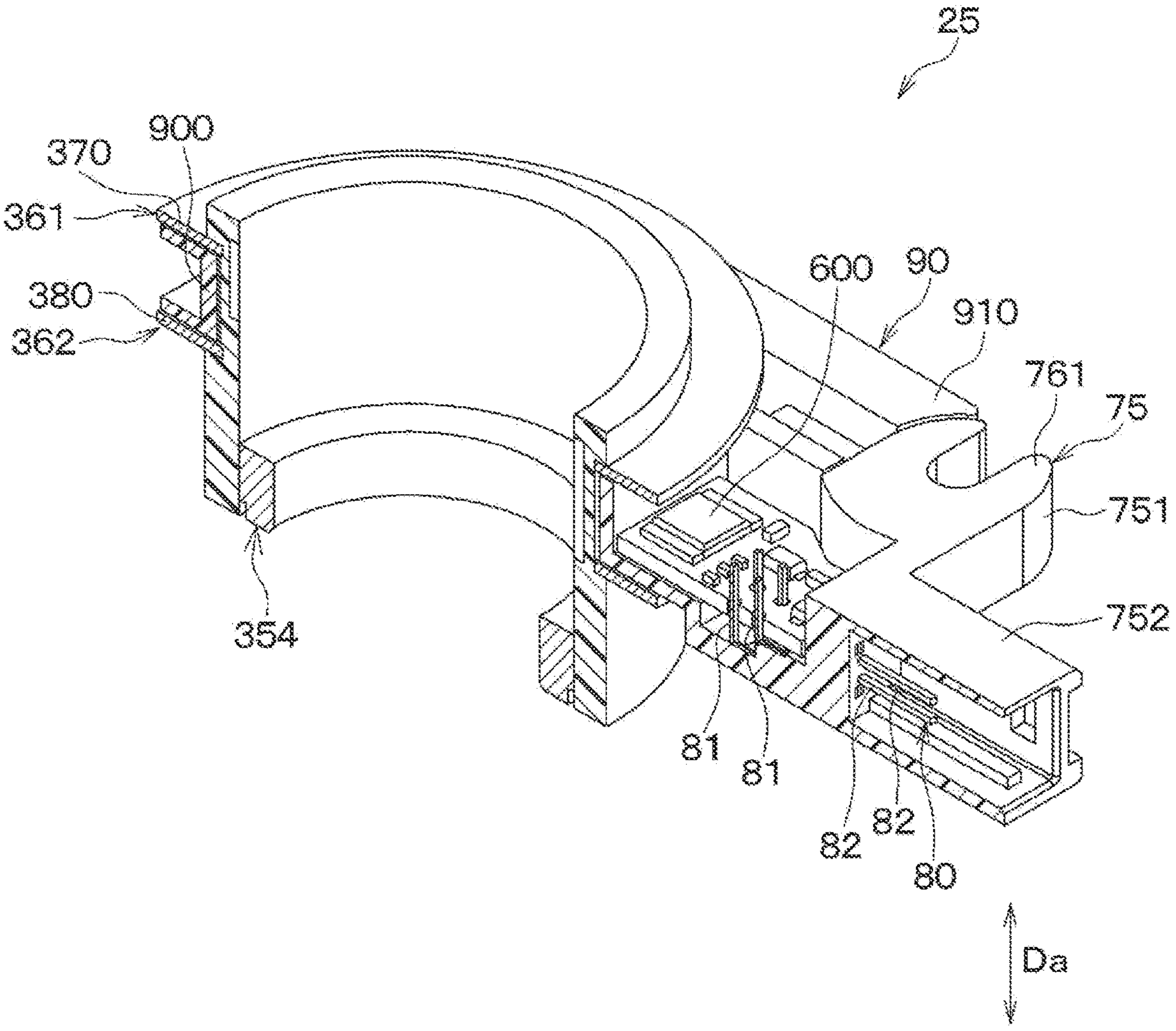
FIG. 30 is a perspective cross-sectional view of the torque detection device.
Figure 31:
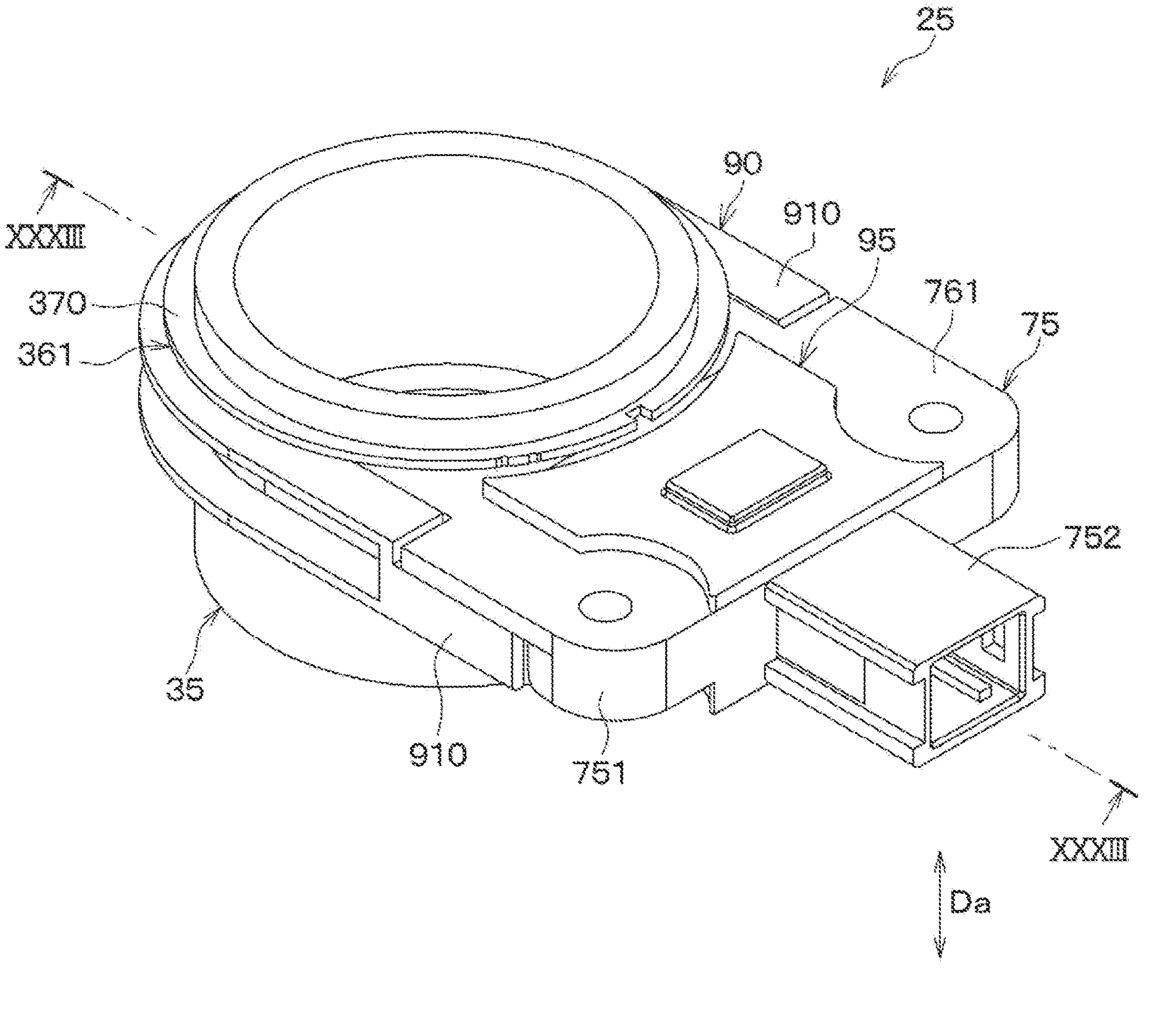
FIG. 31 is a perspective view of a torque detection device of a seventh embodiment.
Figure 32:
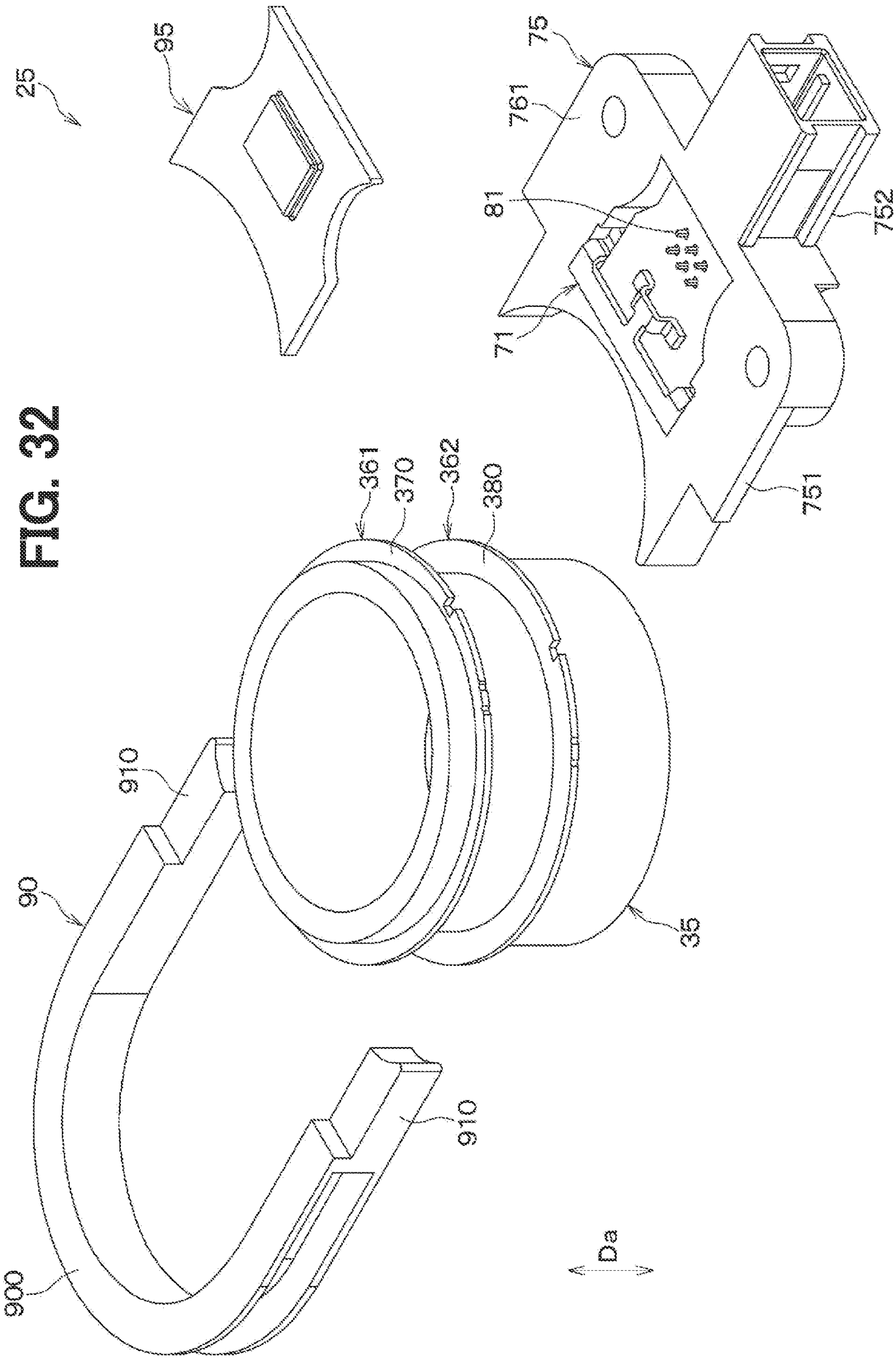
FIG. 32 is an exploded perspective view of the torque detection device.
Figure 33:
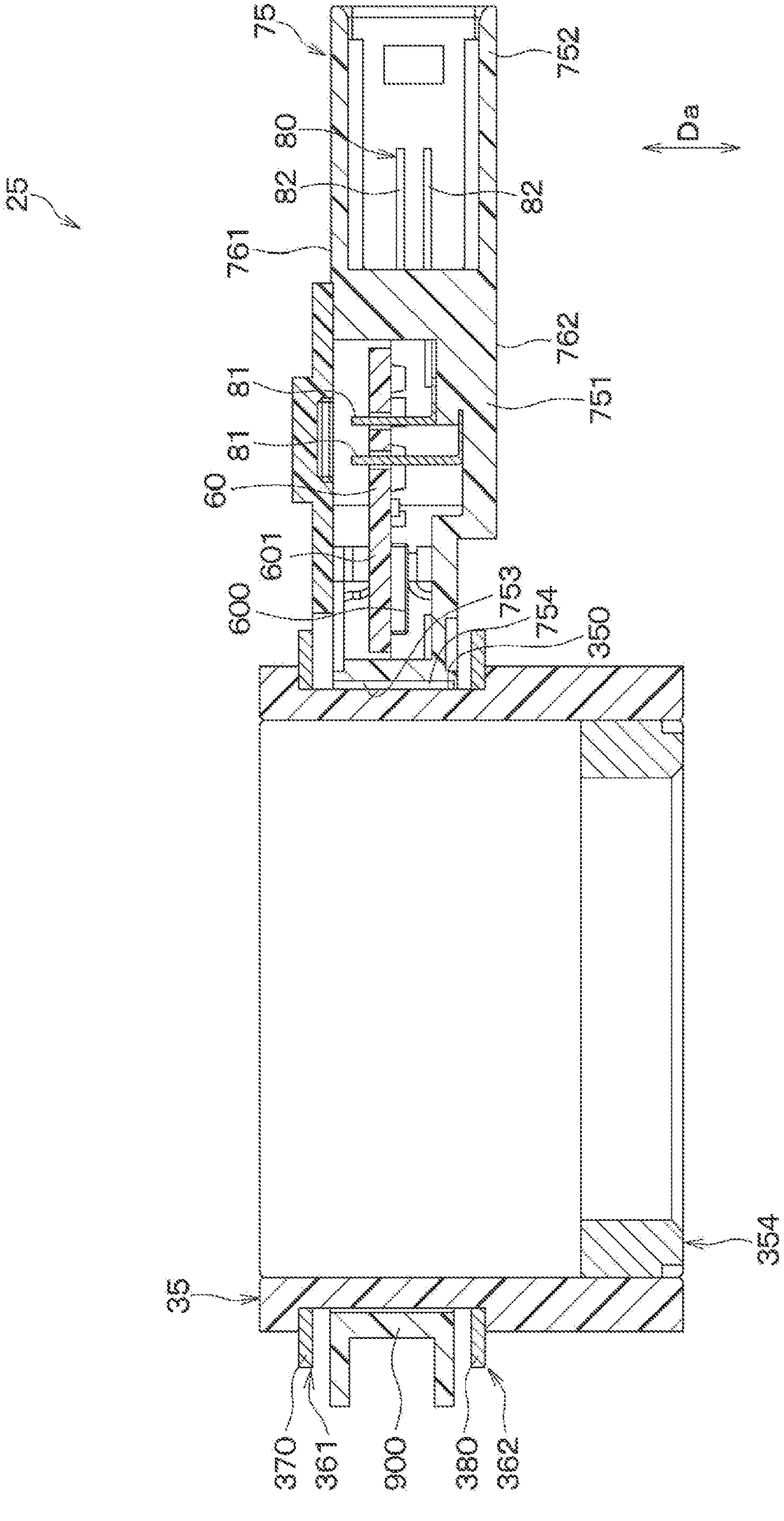
FIG. 33 is a cross-sectional view taken along line XXXIII-XXXIII in FIG. 31.
Figure 34:
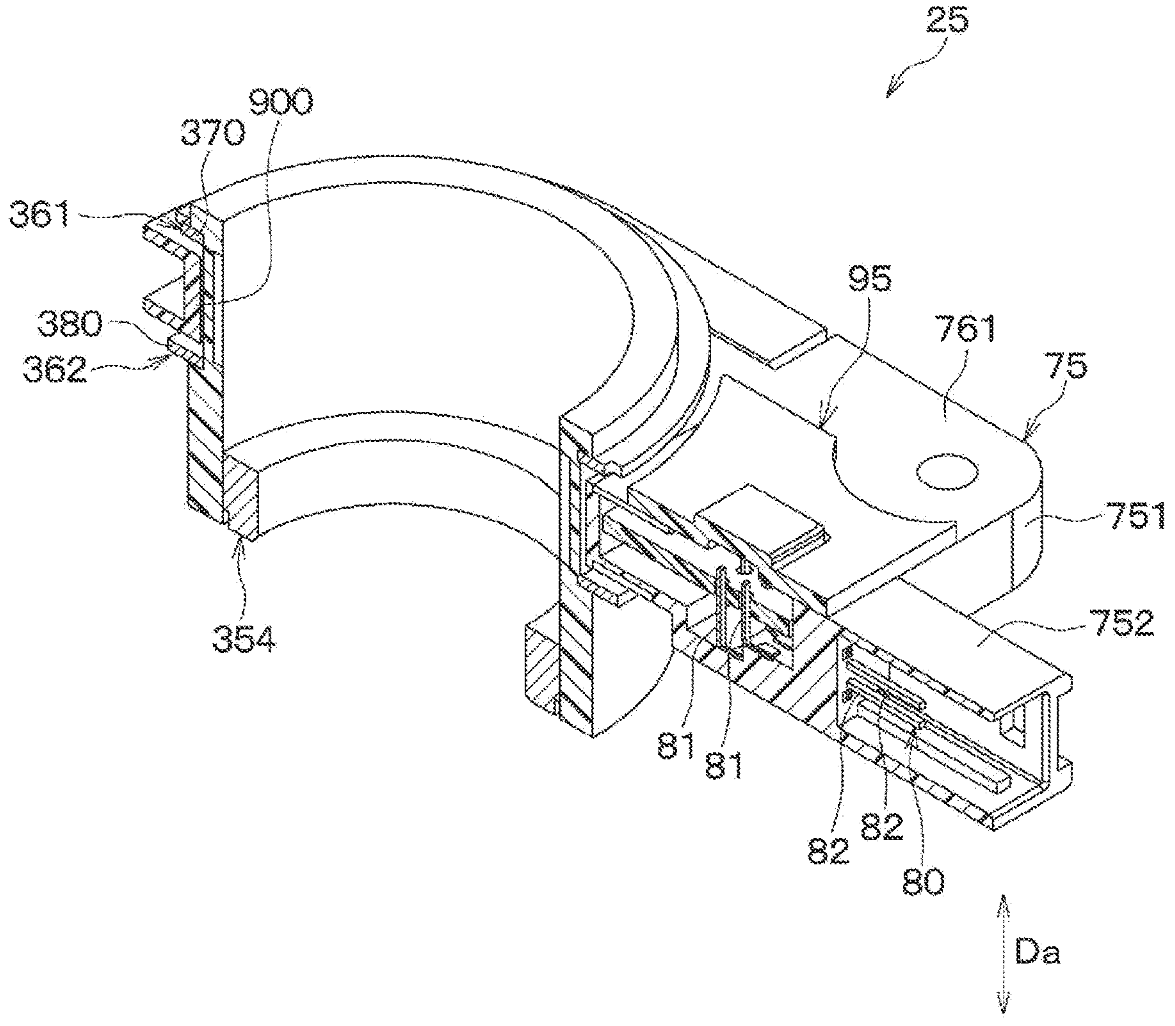
FIG. 34 is a perspective cross-sectional view of the torque detection device.
Figure 35:
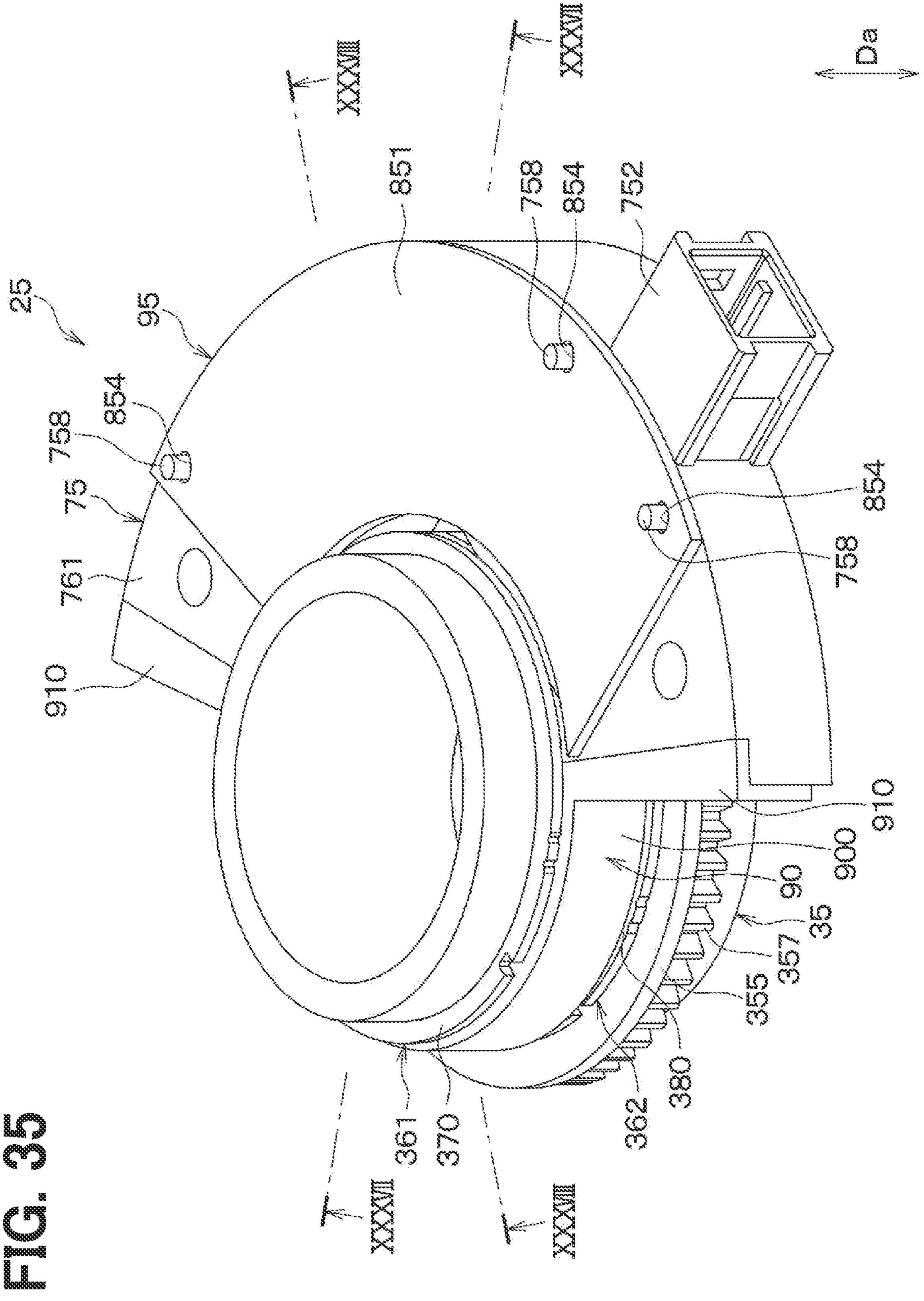
FIG. 35 is a perspective view of a torque detection device of an eighth embodiment.
Figure 36:
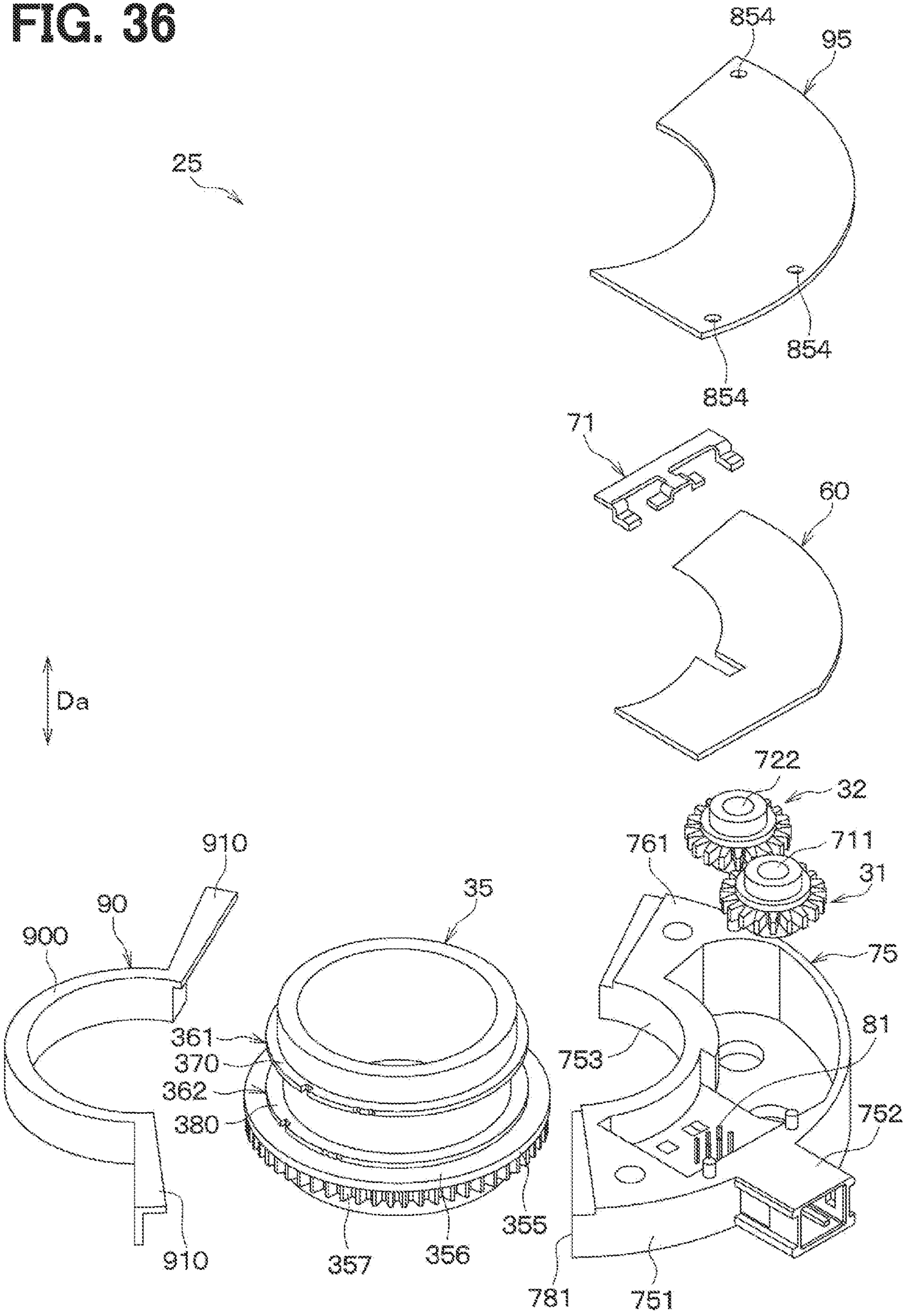
FIG. 36 is an exploded perspective view of the torque detection device.
Figure 37:
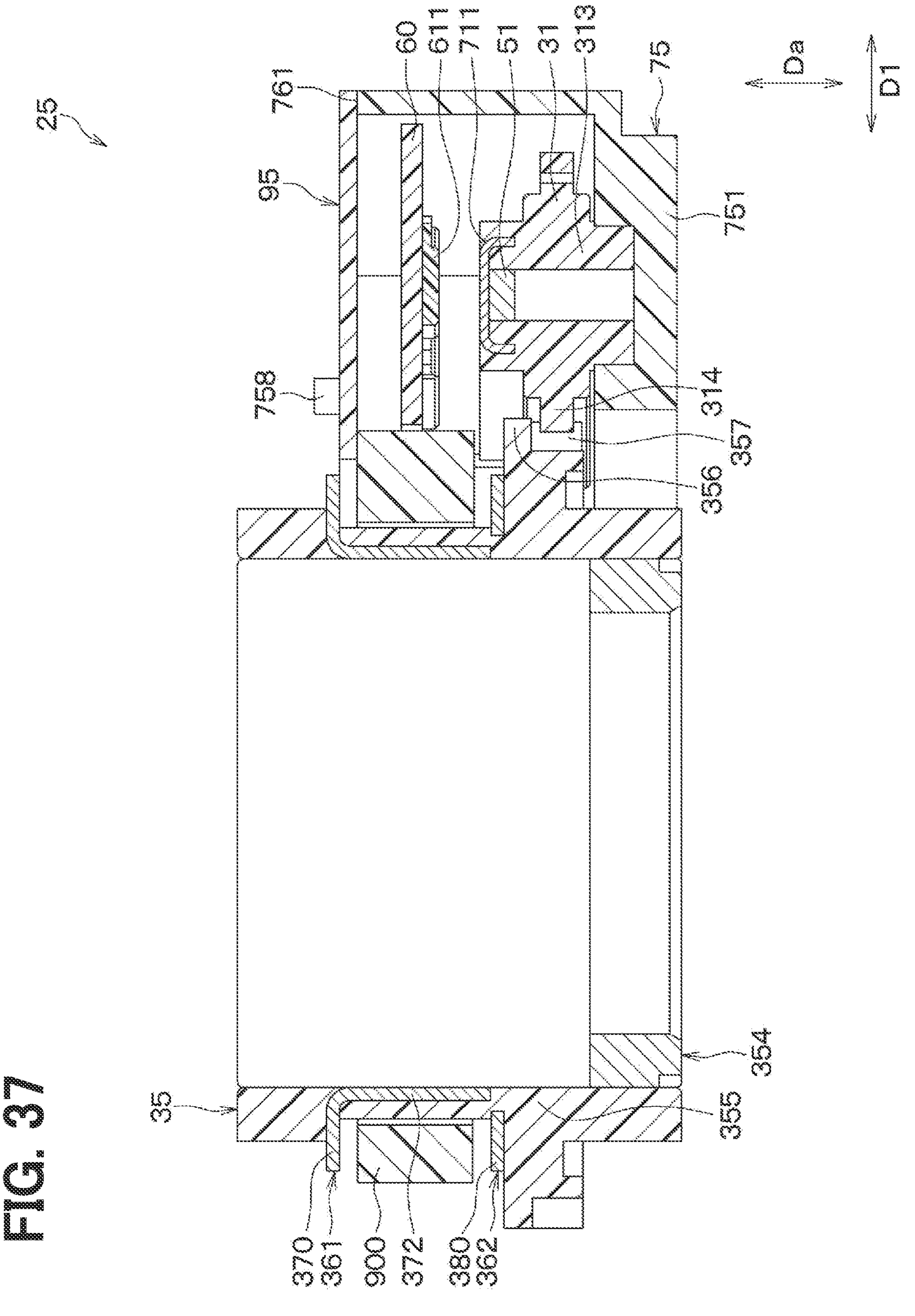
FIG. 37 is a cross-sectional view taken along line XXXVII-XXXVII in FIG. 35.
Figure 38:
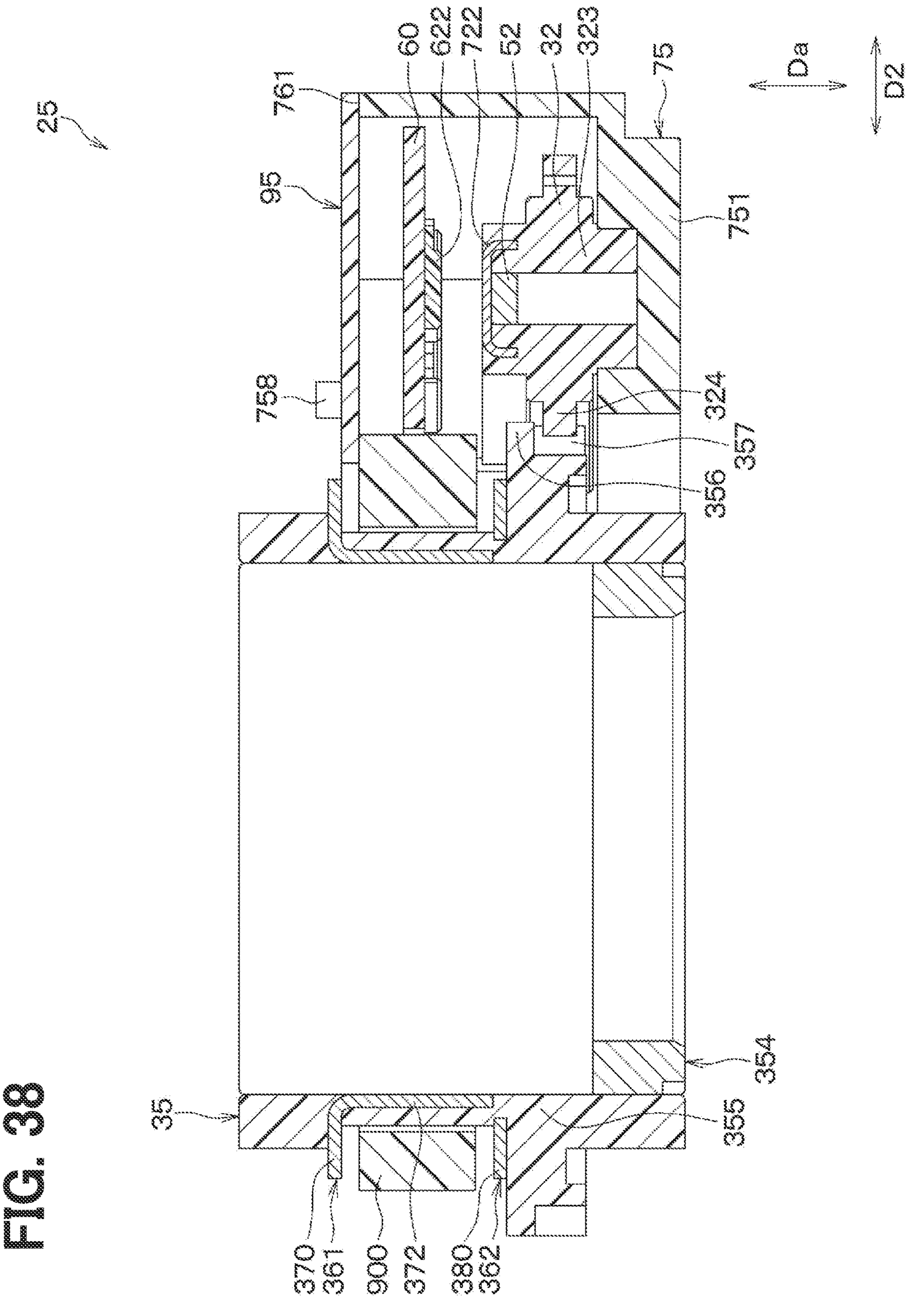
FIG. 38 is a cross-sectional view taken along line XXXVIII-XXXVIII in FIG. 35.
Figure 39:
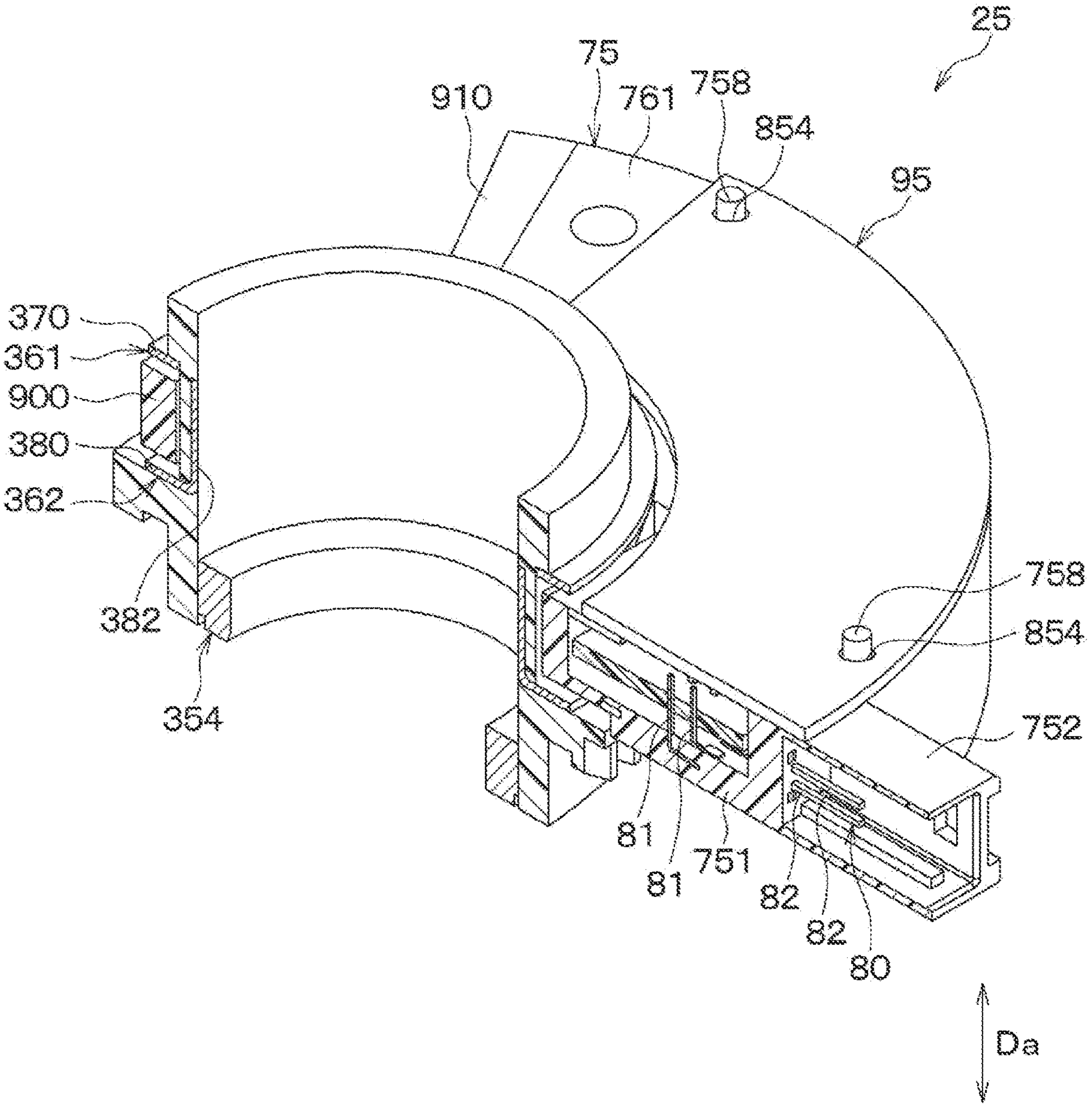
FIG. 39 is a perspective cross-sectional view of the torque detection device.
Figure 40:
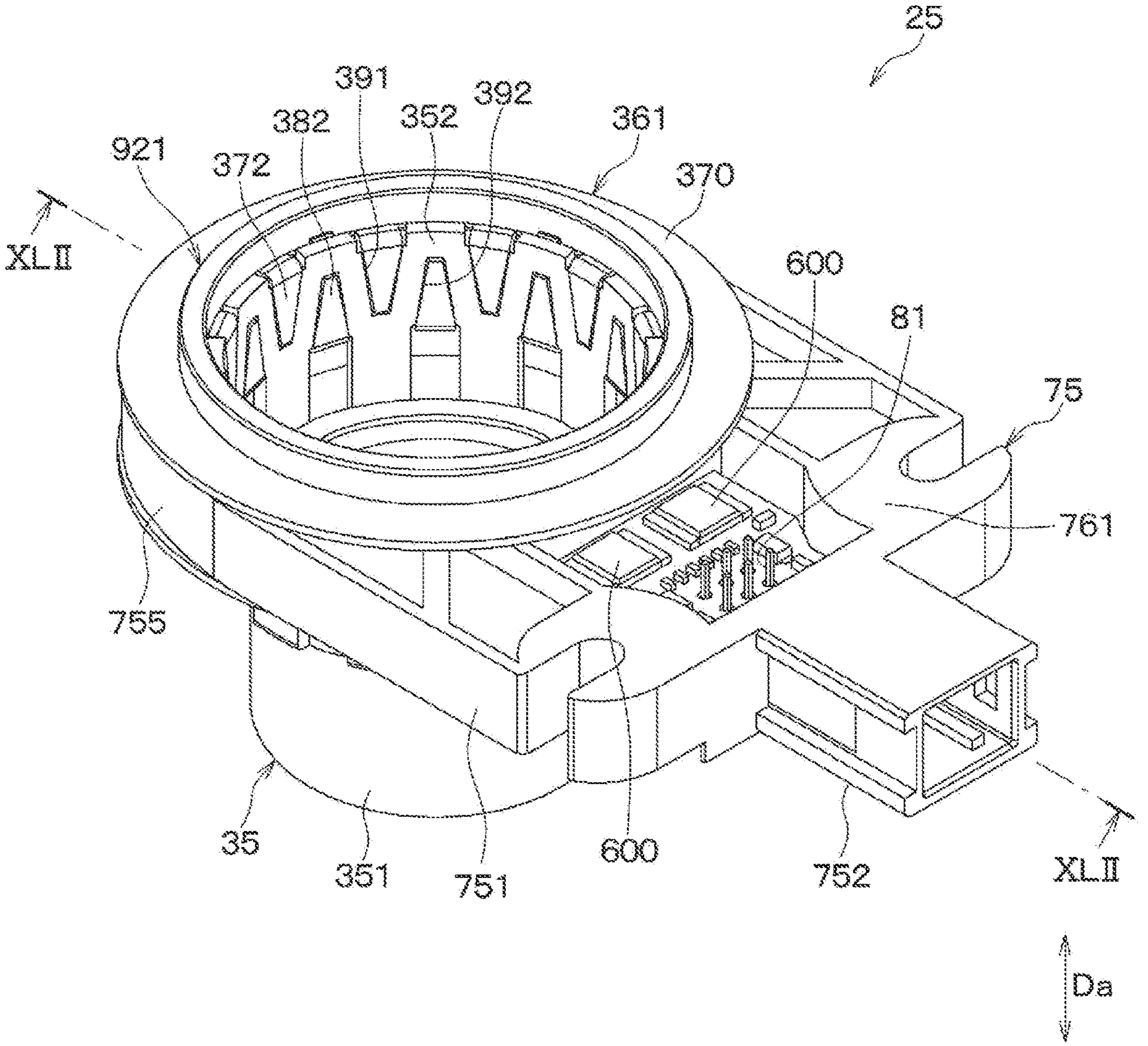
FIG. 40 is a perspective view of a torque detection device of a ninth embodiment.
Figure 41:
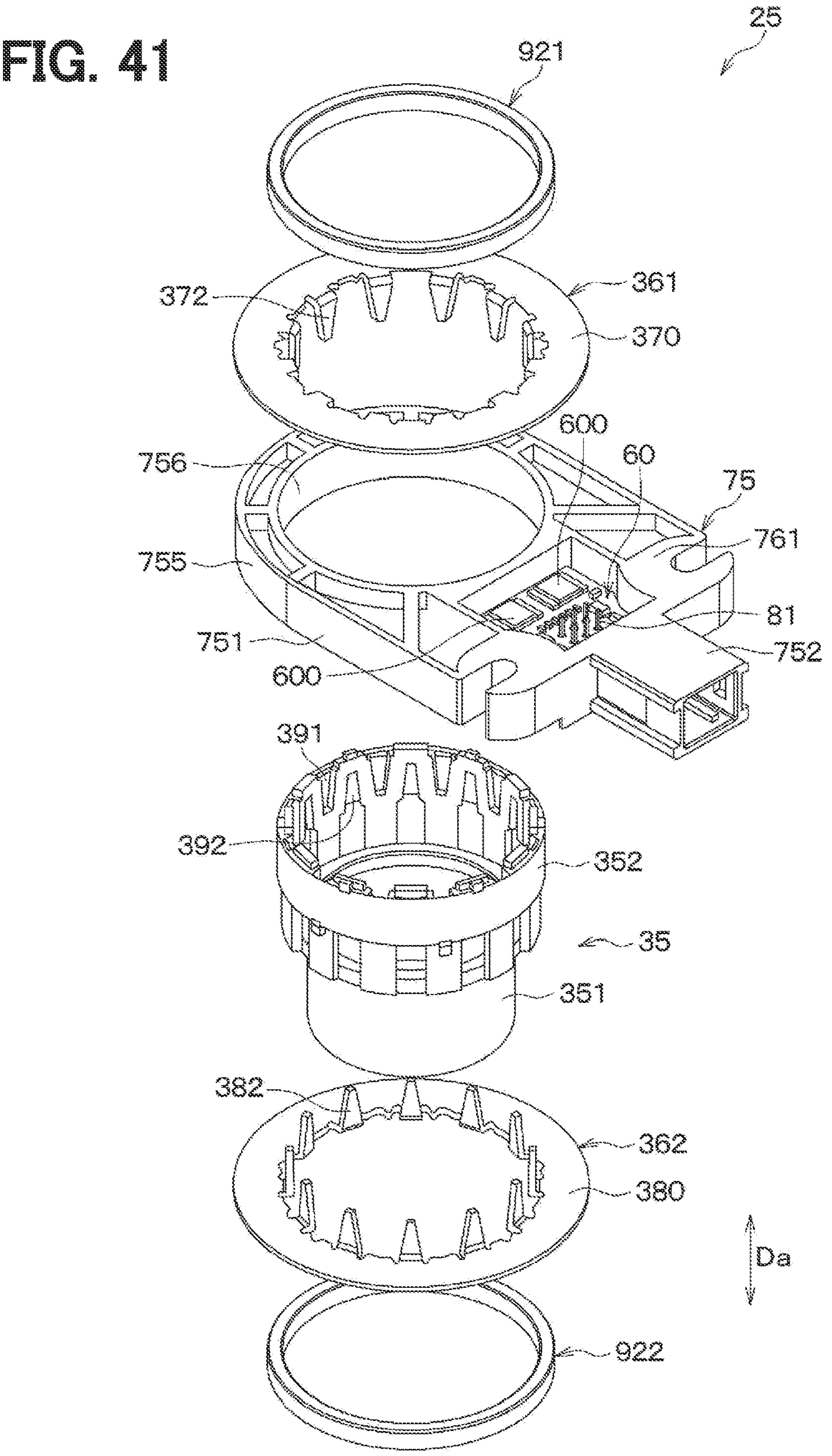
FIG. 41 is an exploded perspective view of the torque detection device.
Figure 42:
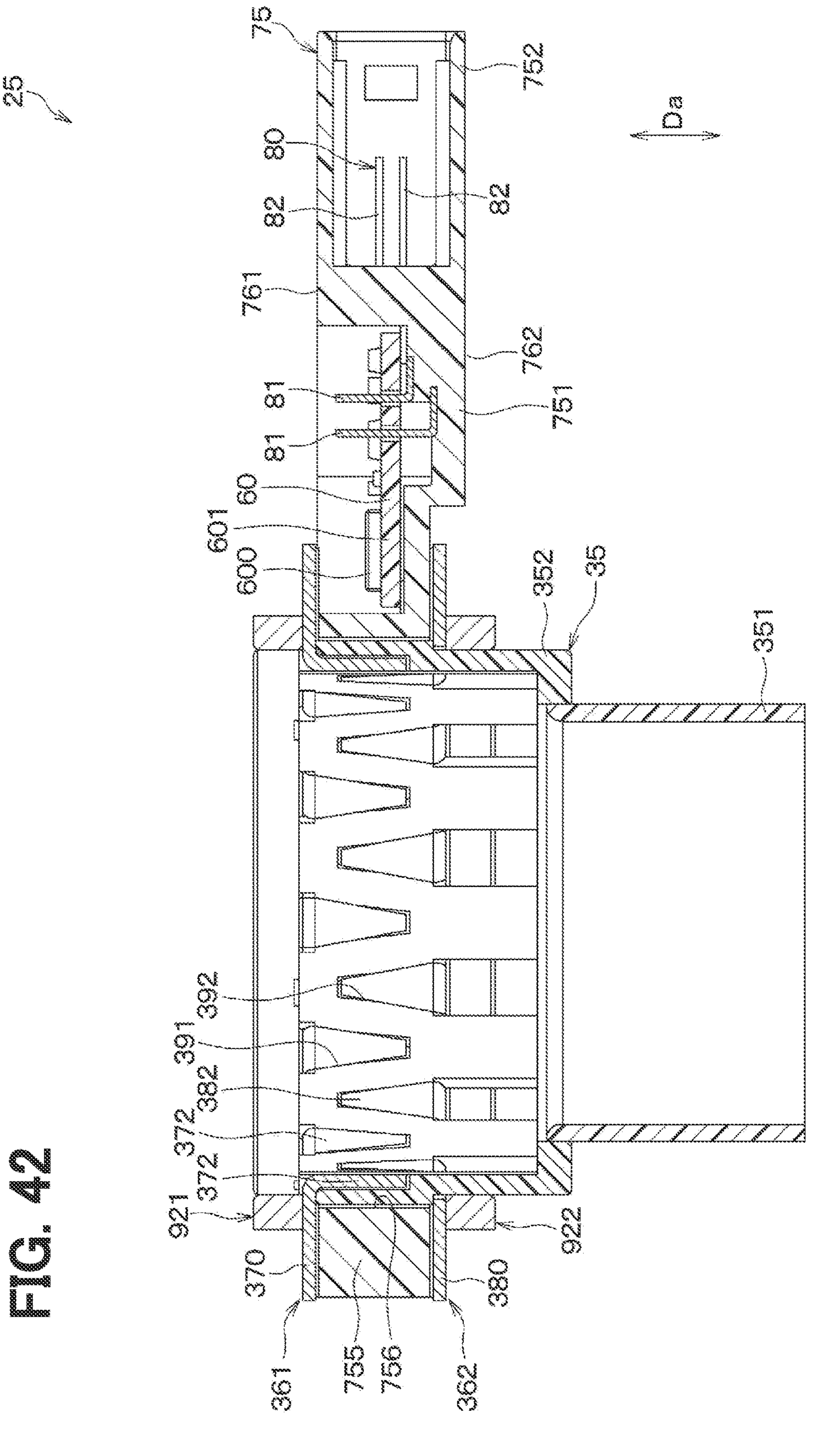
FIG. 42 is a cross-sectional view taken along line XLII-XLII in FIG. 40.
Figure 43:
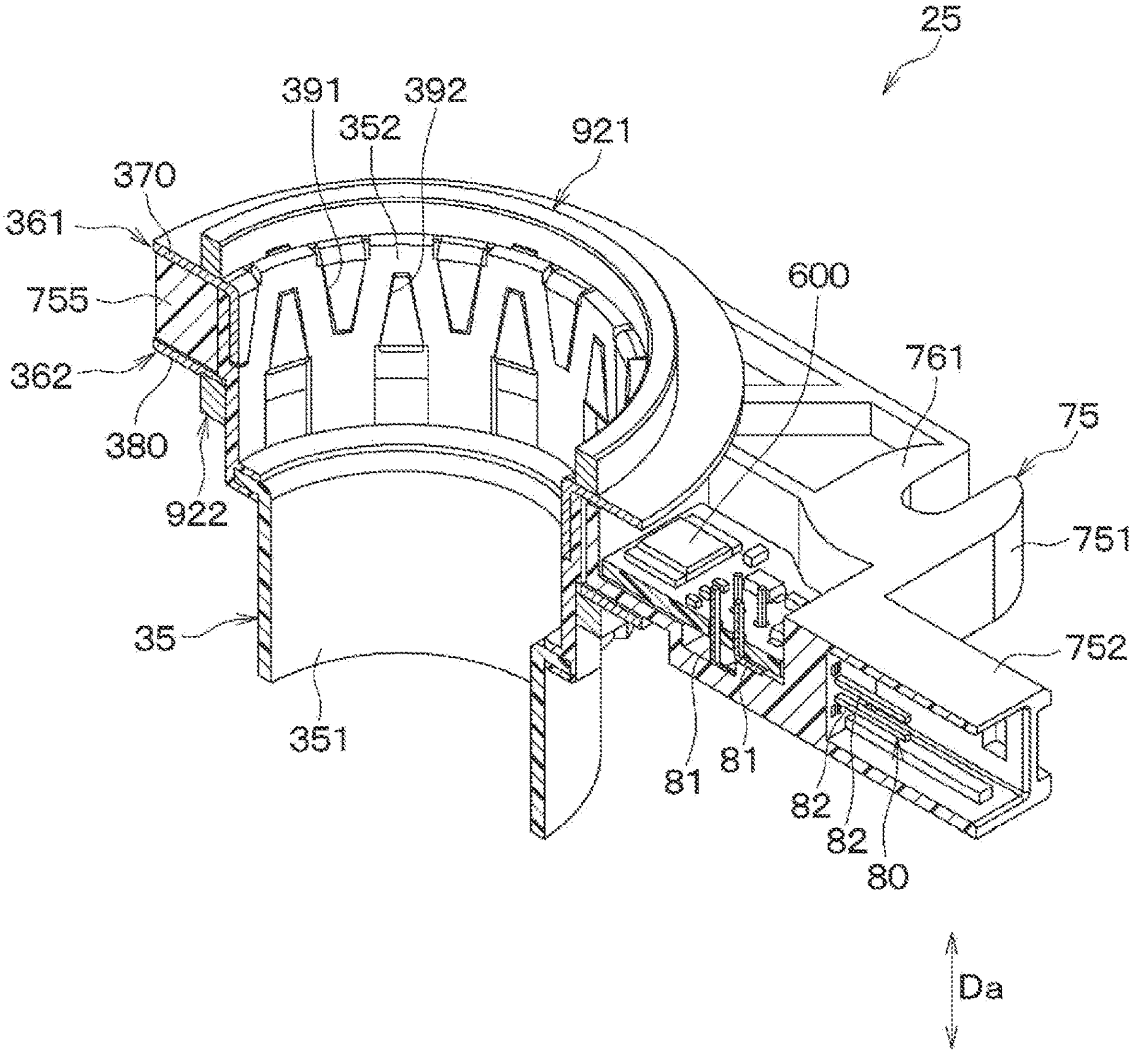
FIG. 43 is a perspective cross-sectional view of the torque detection device.
Figure 44:
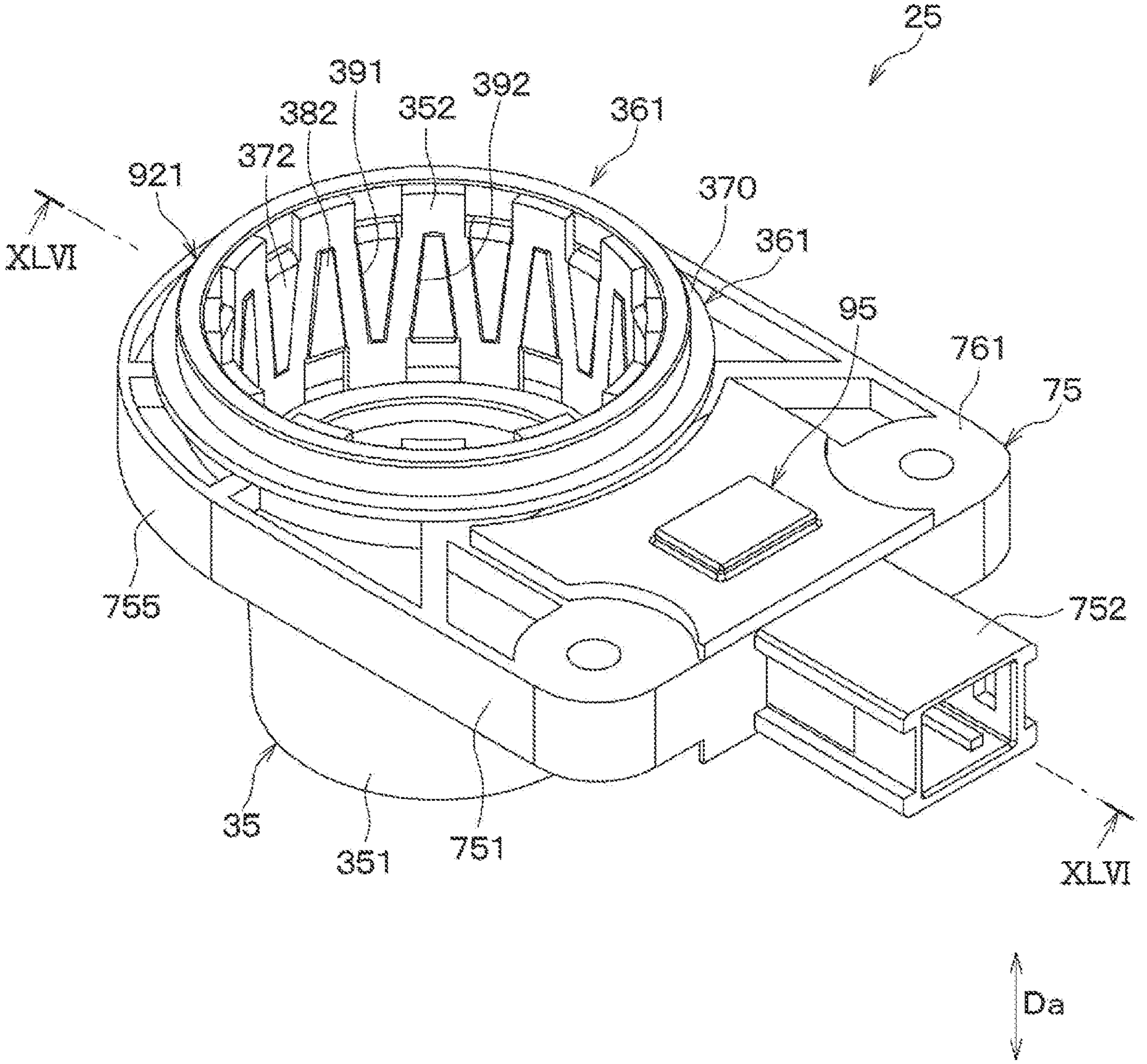
FIG. 44 is a perspective view of a torque detection device of a tenth embodiment.
Figure 45:
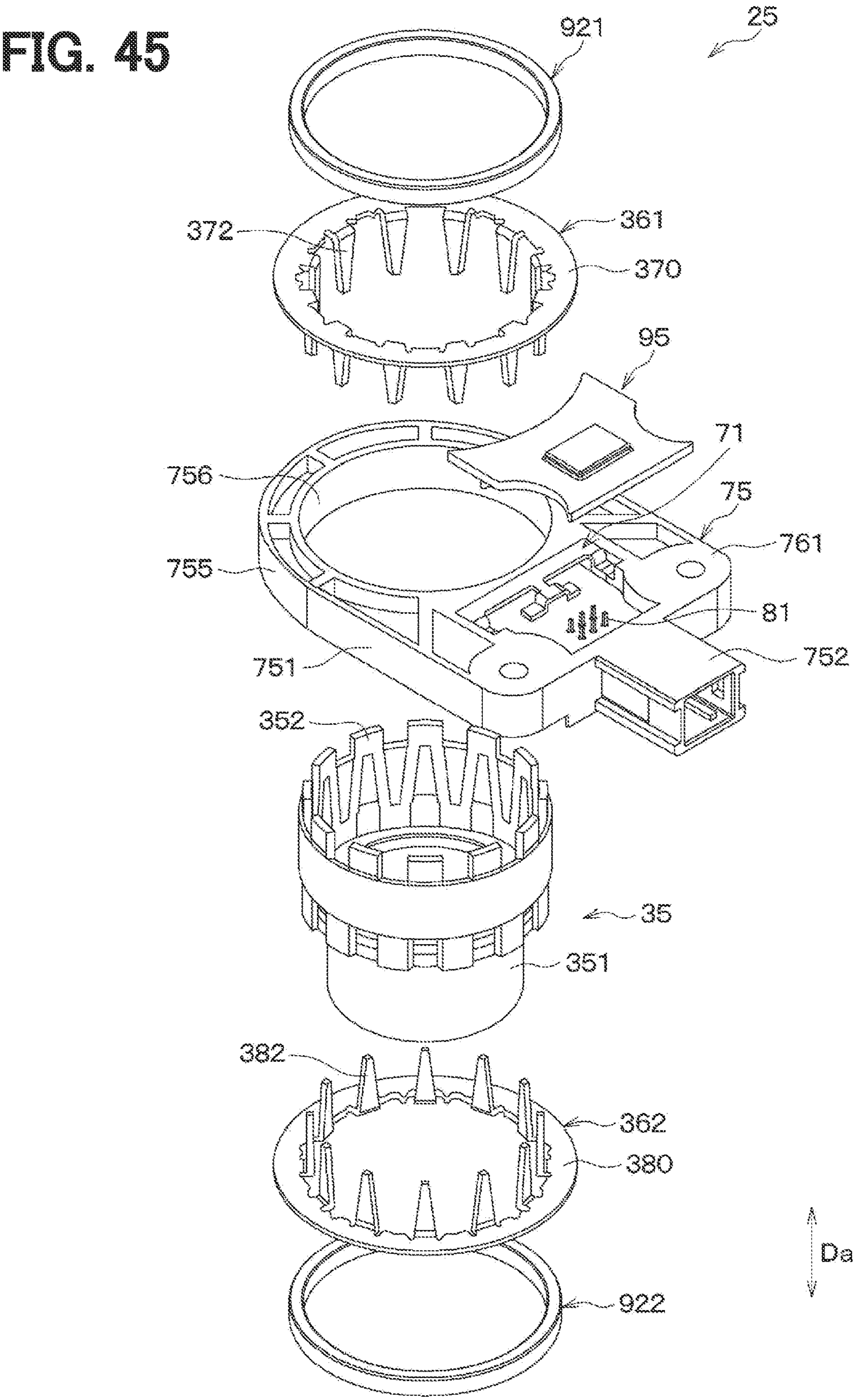
FIG. 45 is an exploded perspective view of the torque detection device.
Figure 46:
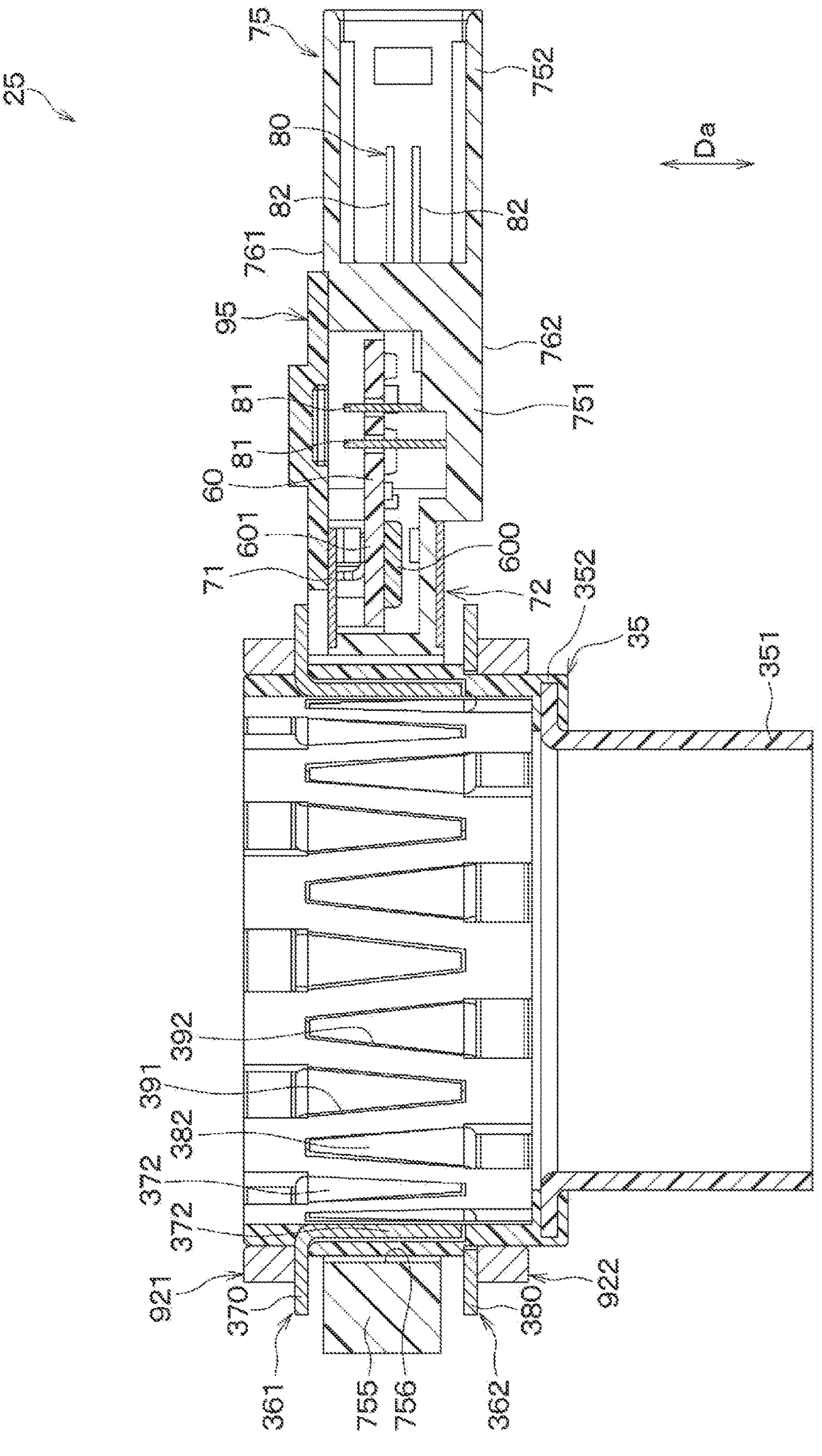
FIG. 46 is a cross-sectional view taken along line XLVI-XLVI in FIG. 44.
Figure 47:
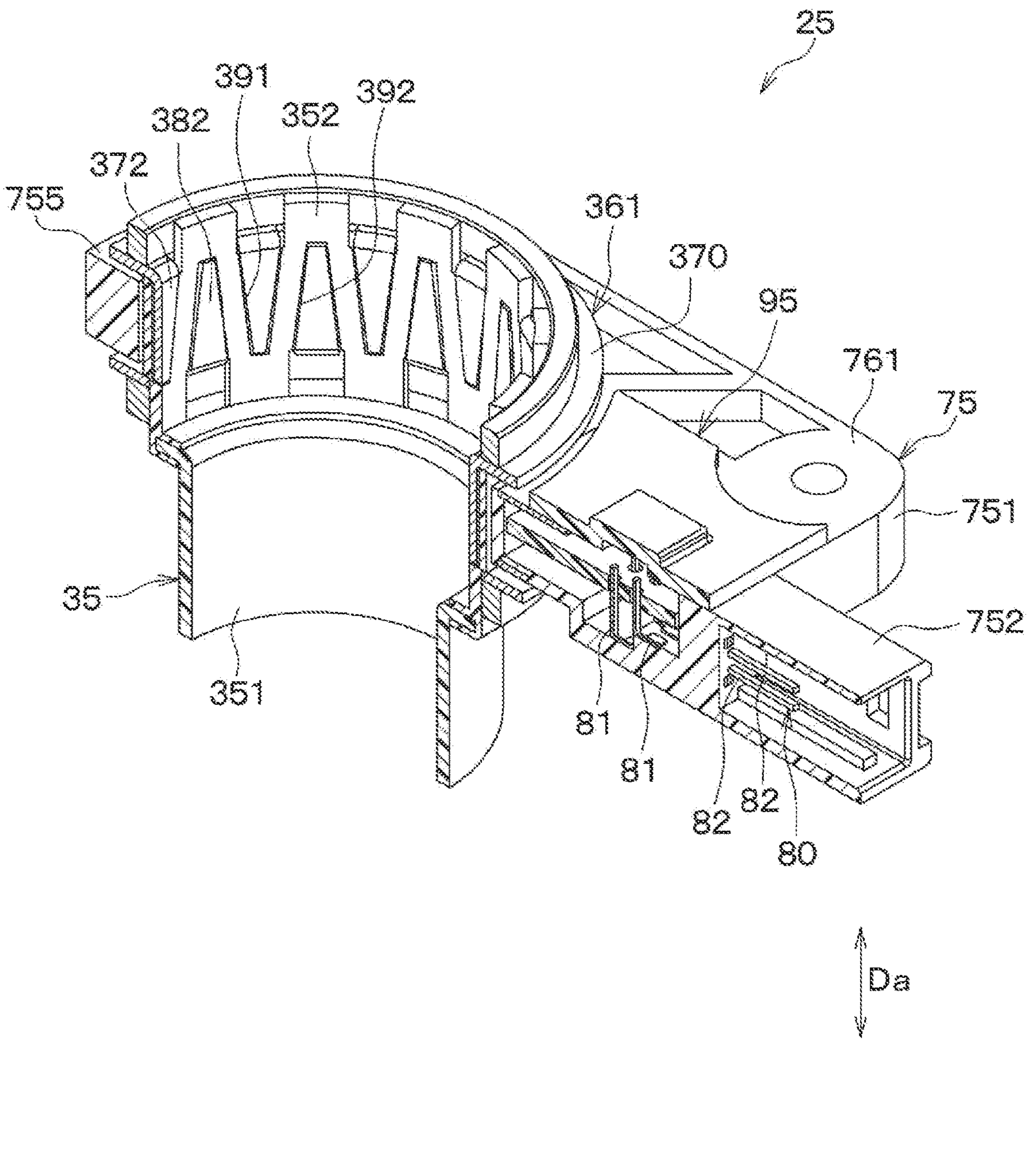
FIG. 47 is a perspective cross-sectional view of the torque detection device.
Figure 48:
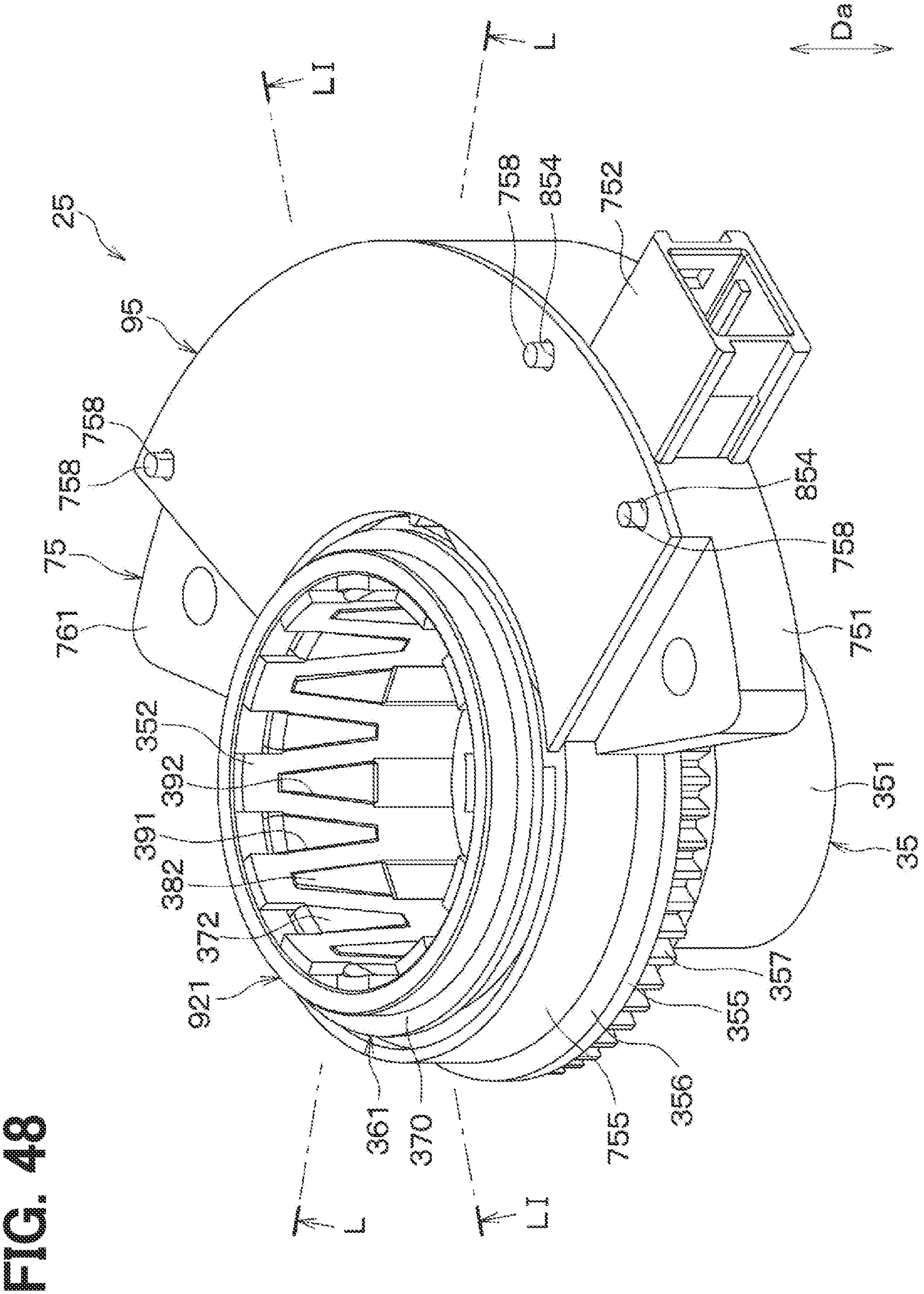
FIG. 48 is a perspective view of a torque detection device of an eleventh embodiment.
Figure 49:
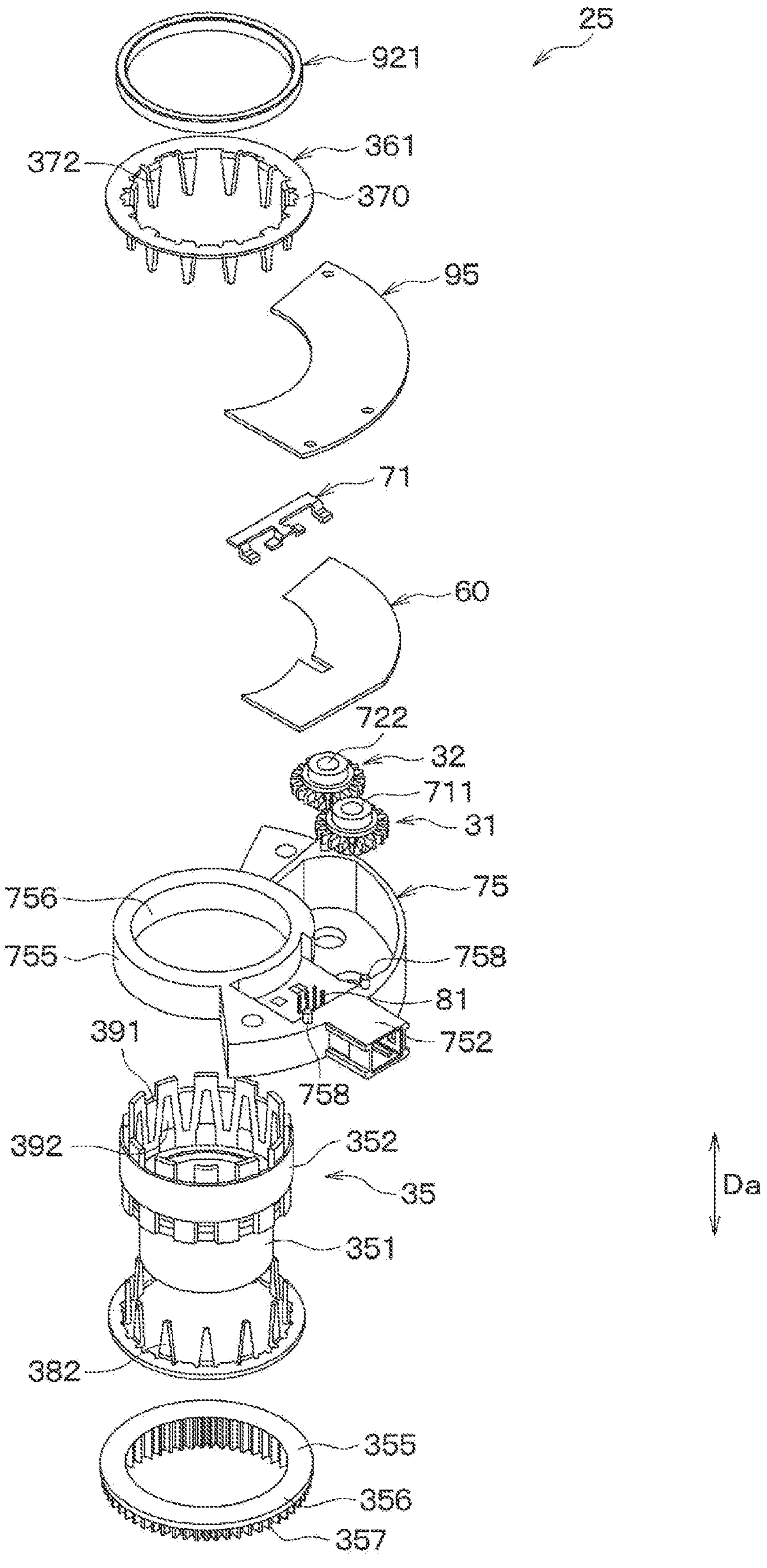
FIG. 49 is an exploded perspective view of the torque detection device.
Figure 50:
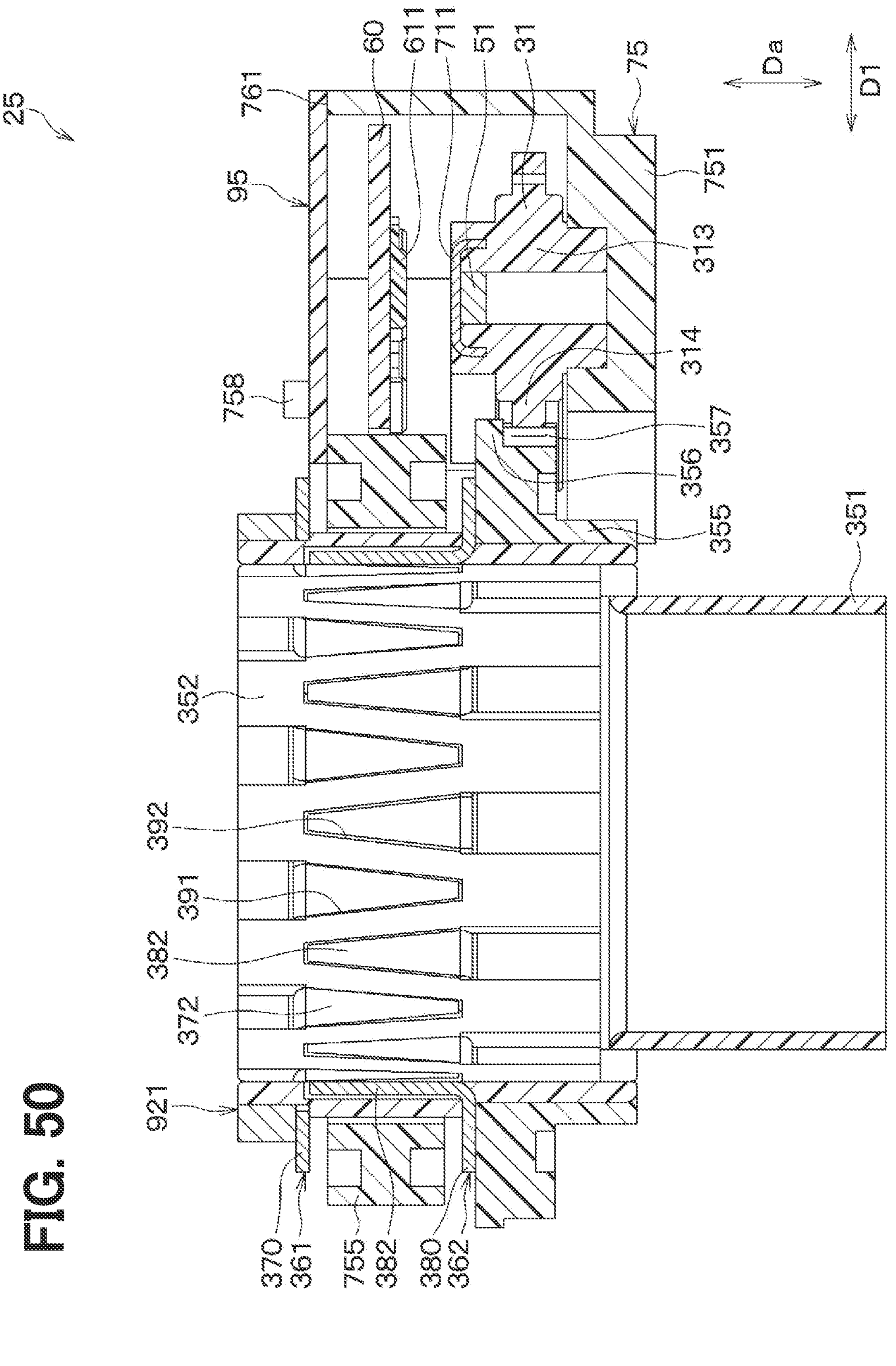
FIG. 50 is a cross-sectional view taken along line L-L in FIG. 48.
Figure 51:
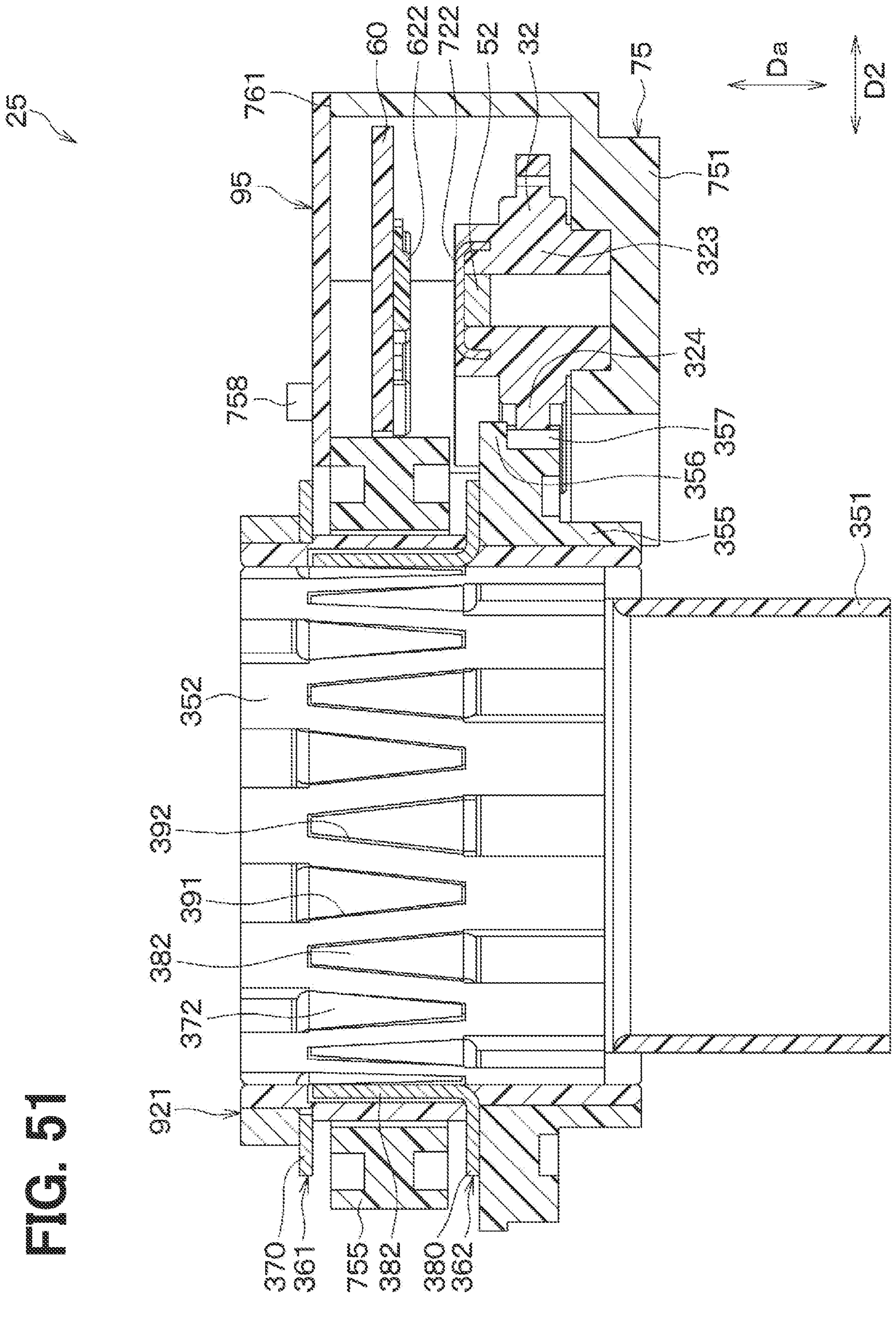
FIG. 51 is a cross-sectional view taken along line LI-LI in FIG. 48.
Figure 52:
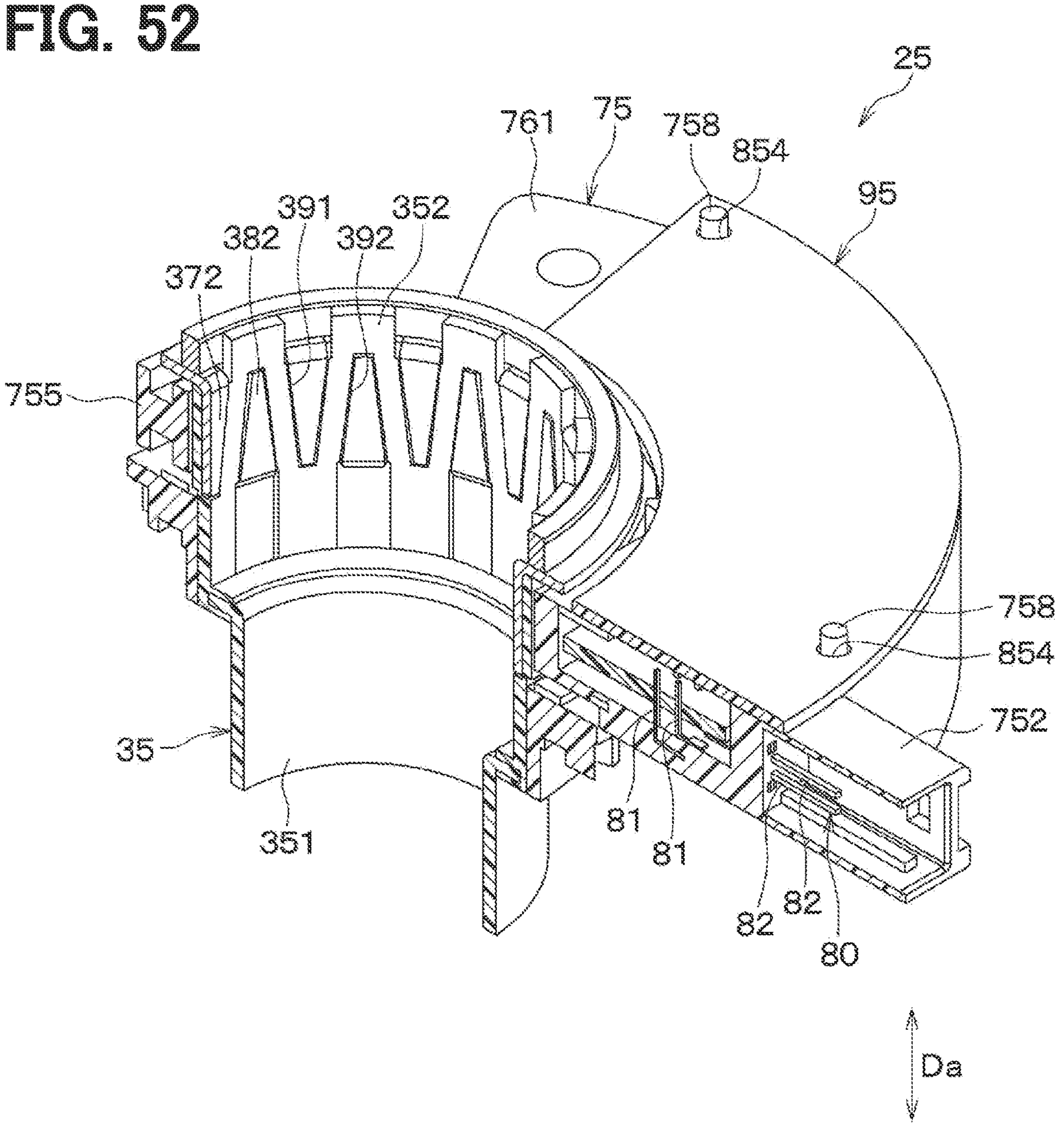
FIG. 52 is a perspective cross-sectional view of the torque detection device.
Figure 53:
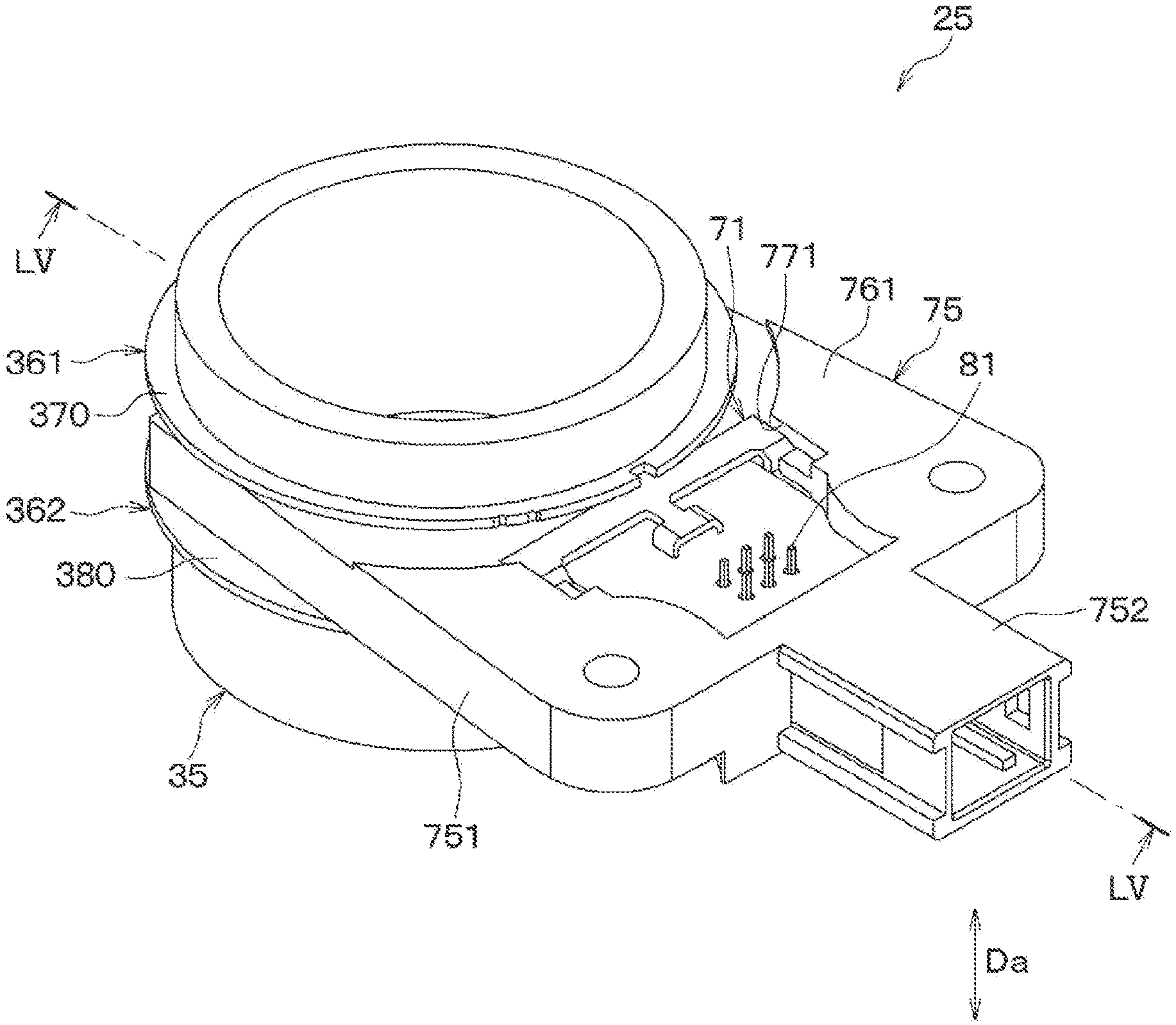
FIG. 53 is a perspective view of a torque detection device of a twelfth embodiment.
Figure 54:
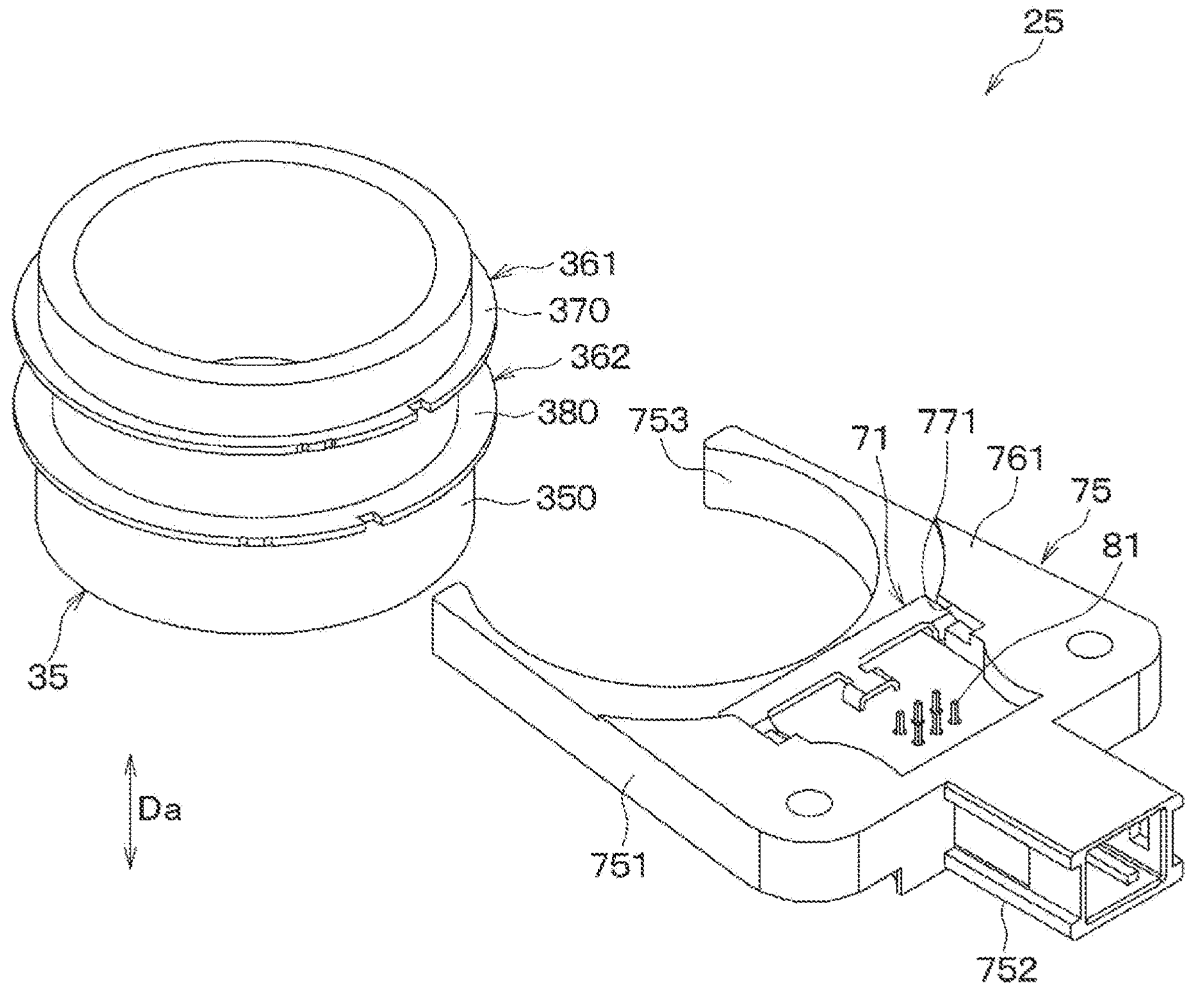
FIG. 54 is an exploded perspective view of the torque detection device.
Figure 55:
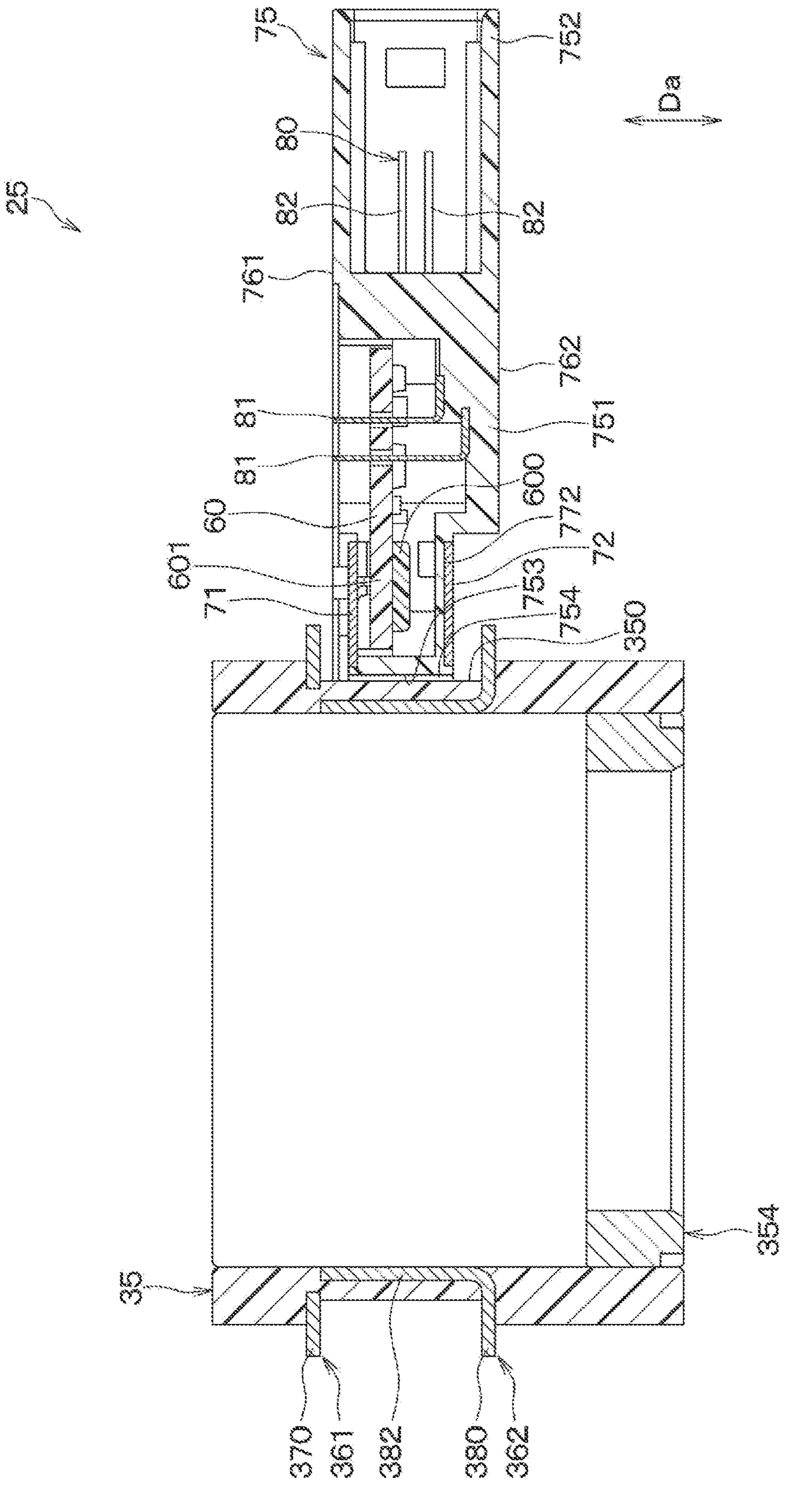
FIG. 55 is a cross-sectional view taken along line LV-LV in FIG. 53.
Figure 56:
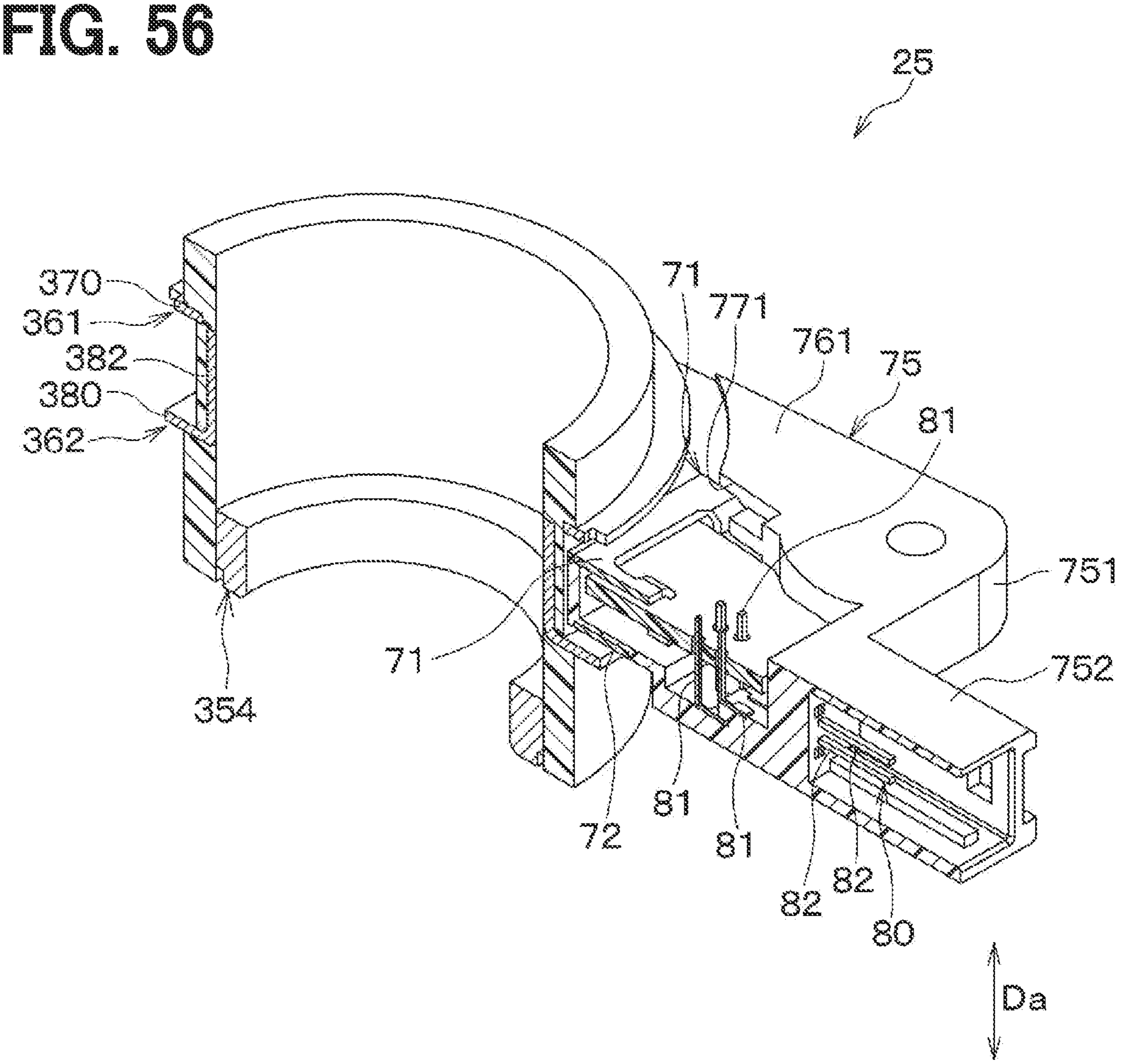
FIG. 56 is a perspective cross-sectional view of the torque detection device.
Figure 57:
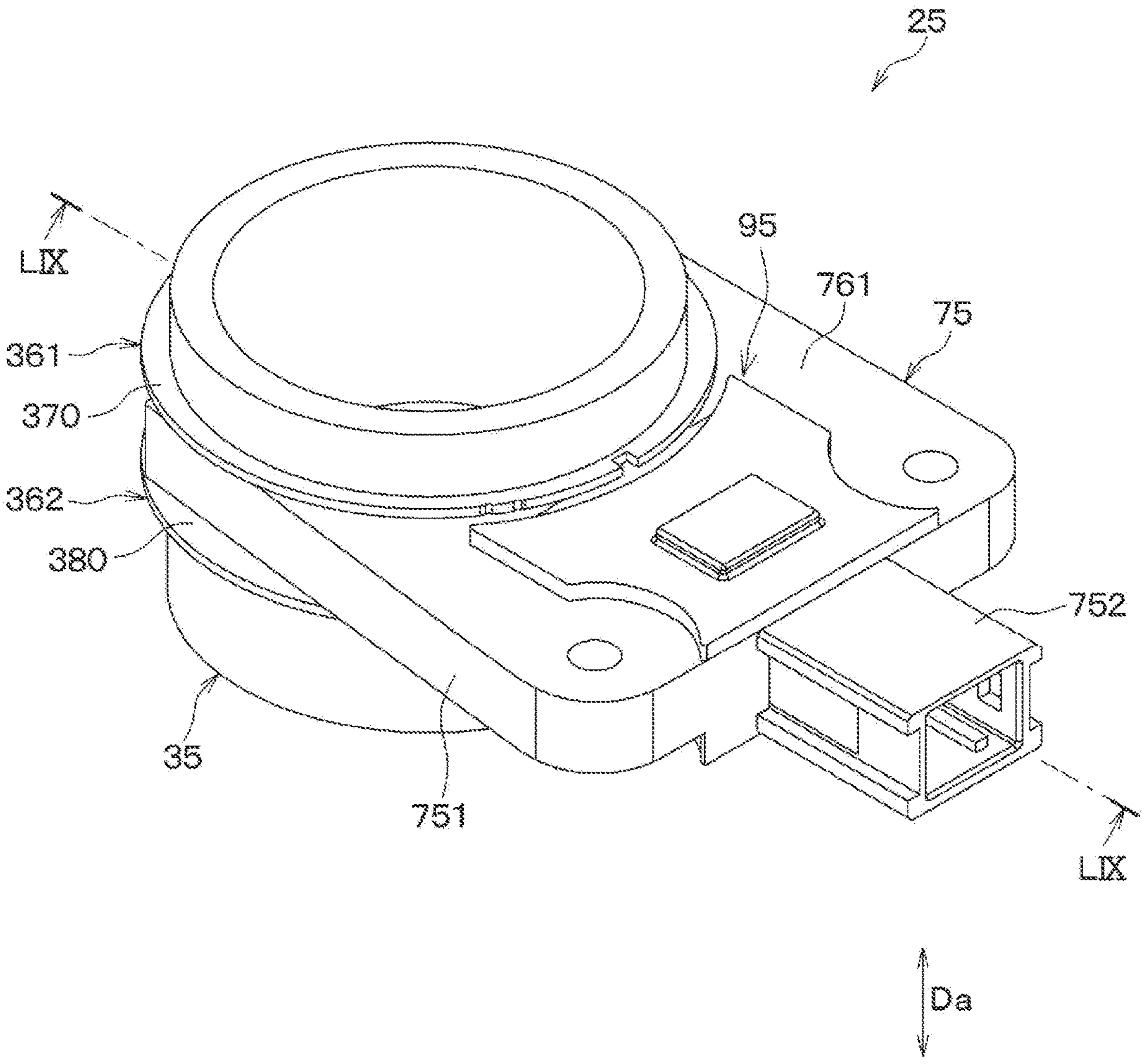
FIG. 57 is a perspective view of a torque detection device of a thirteenth embodiment.
Figure 58:
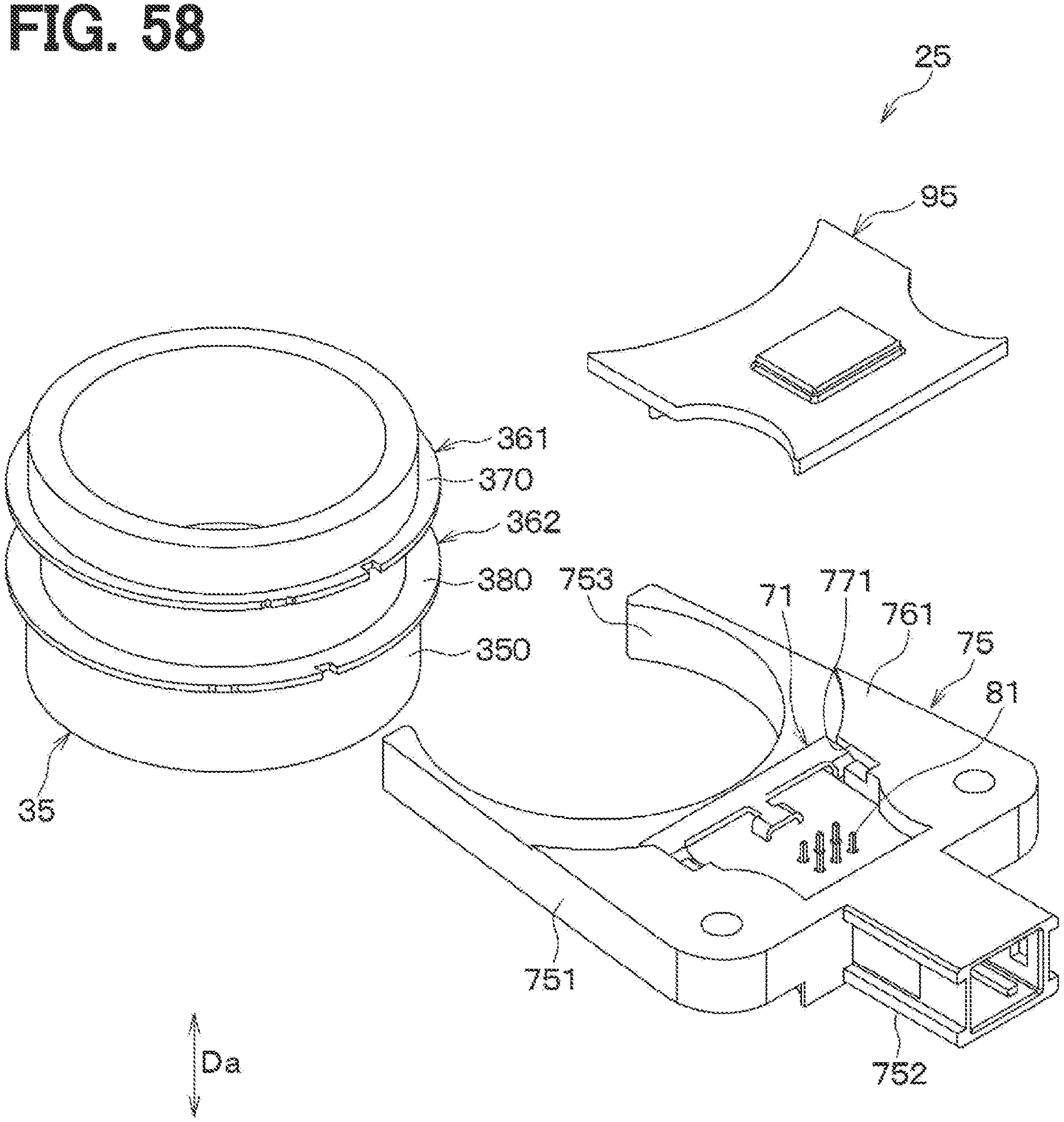
FIG. 58 is an exploded perspective view of the torque detection device.
Figure 59:
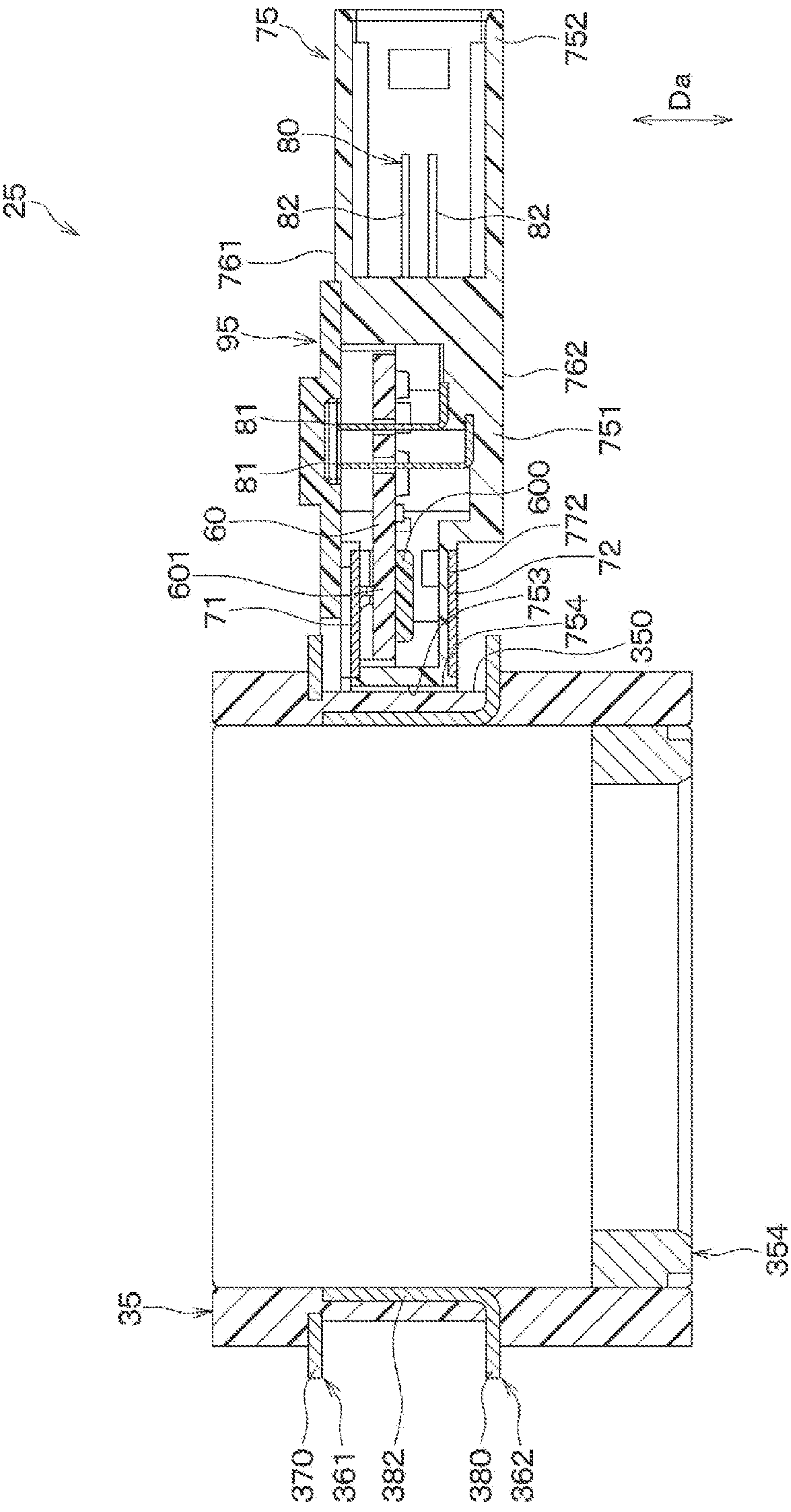
FIG. 59 is a cross-sectional view taken along line LIX-LIX in FIG. 57.
Figure 60:
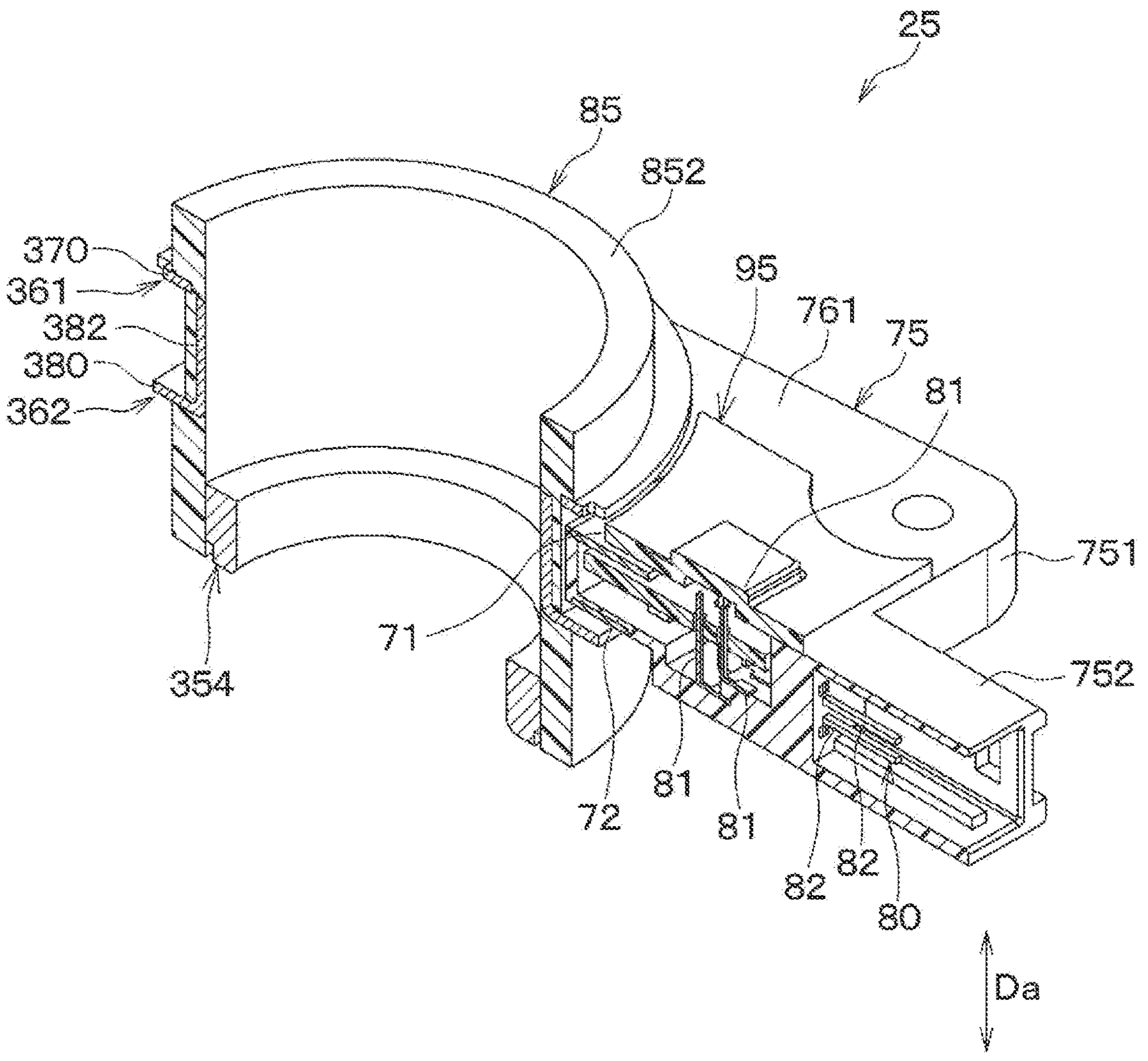
FIG. 60 is a perspective cross-sectional view of the torque detection device.
Figure 61:
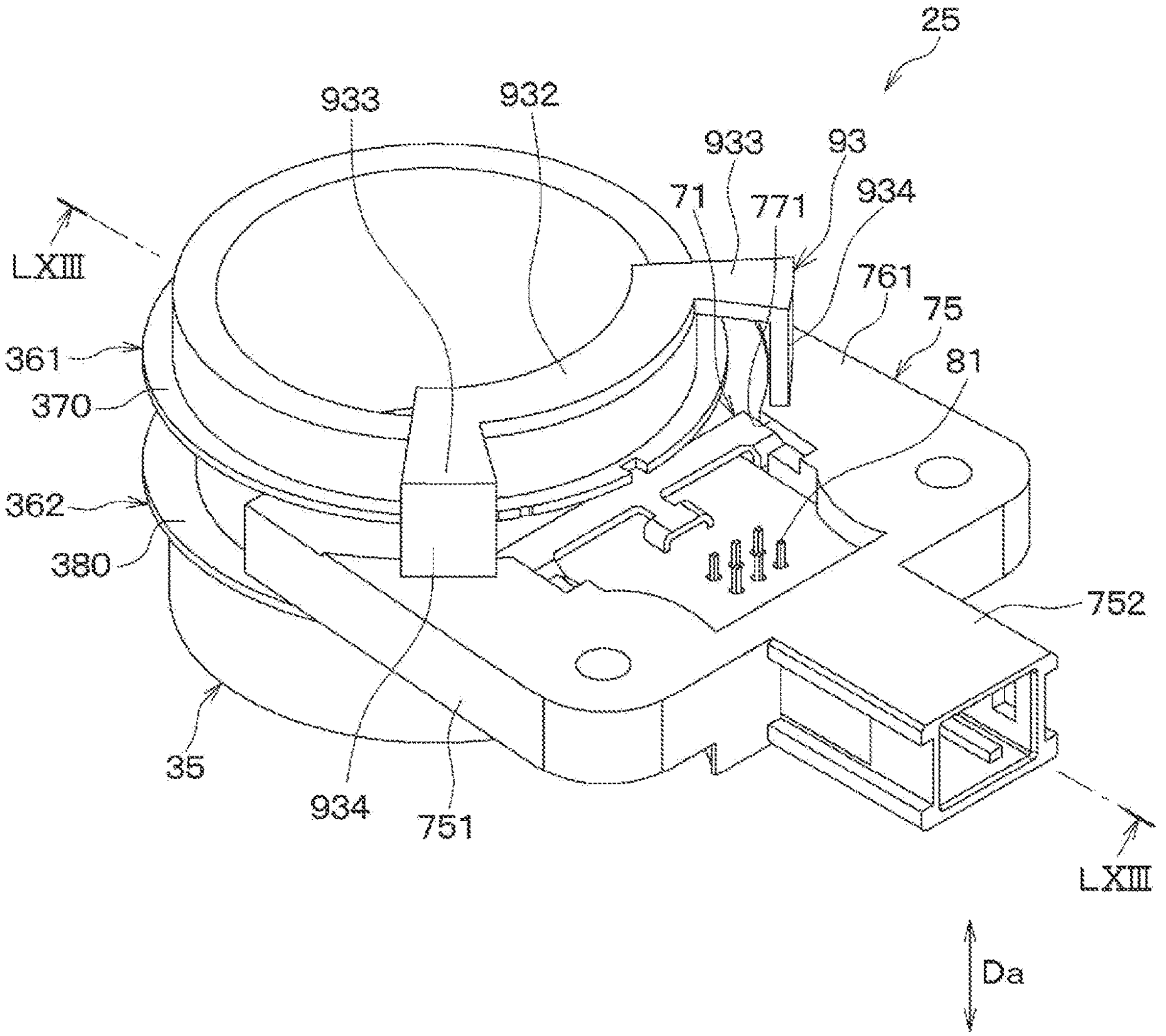
FIG. 61 is a perspective view of a torque detection device of a fourteenth embodiment.
Figure 62:
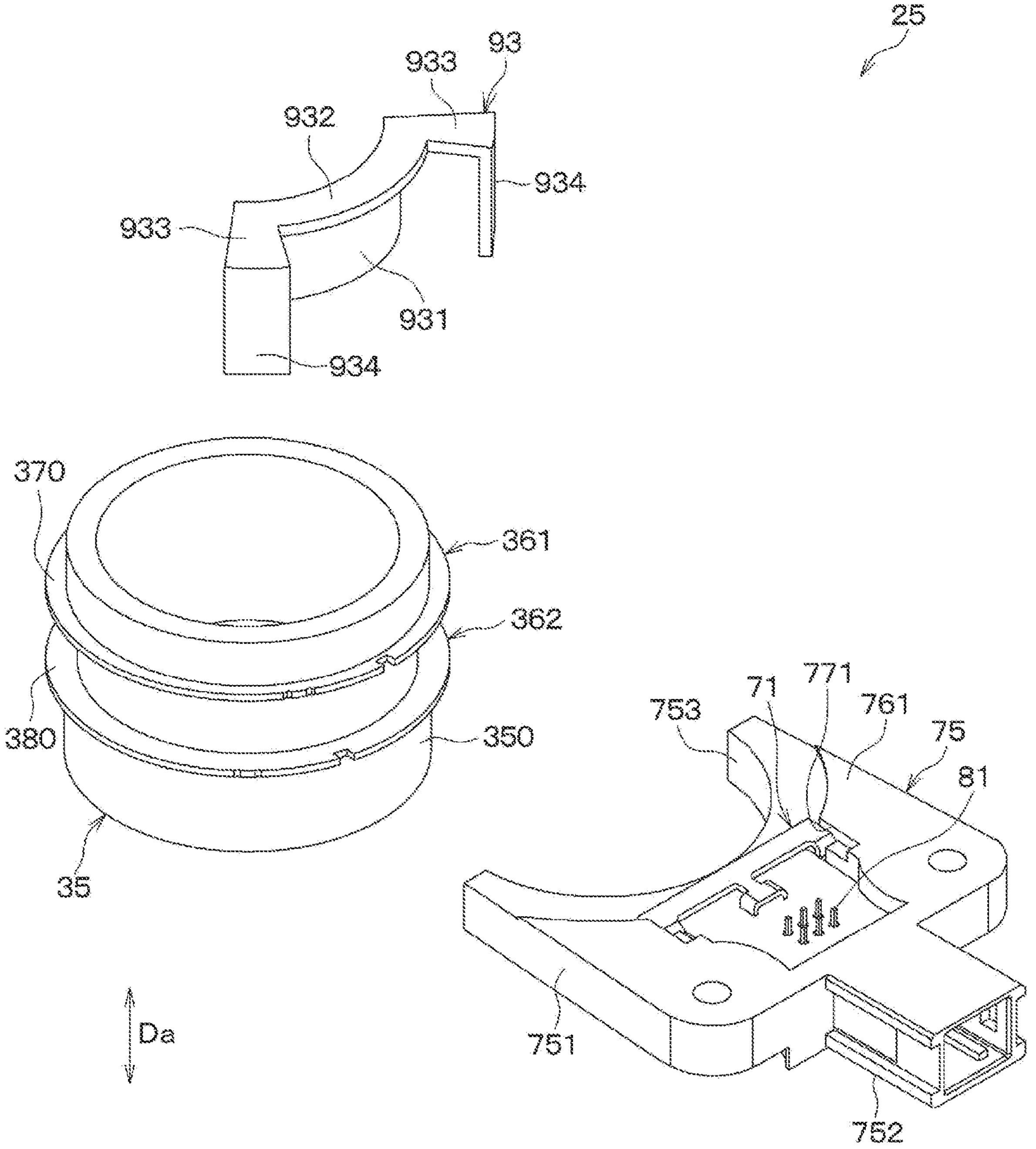
FIG. 62 is an exploded perspective view of the torque detection device.
Figure 63:
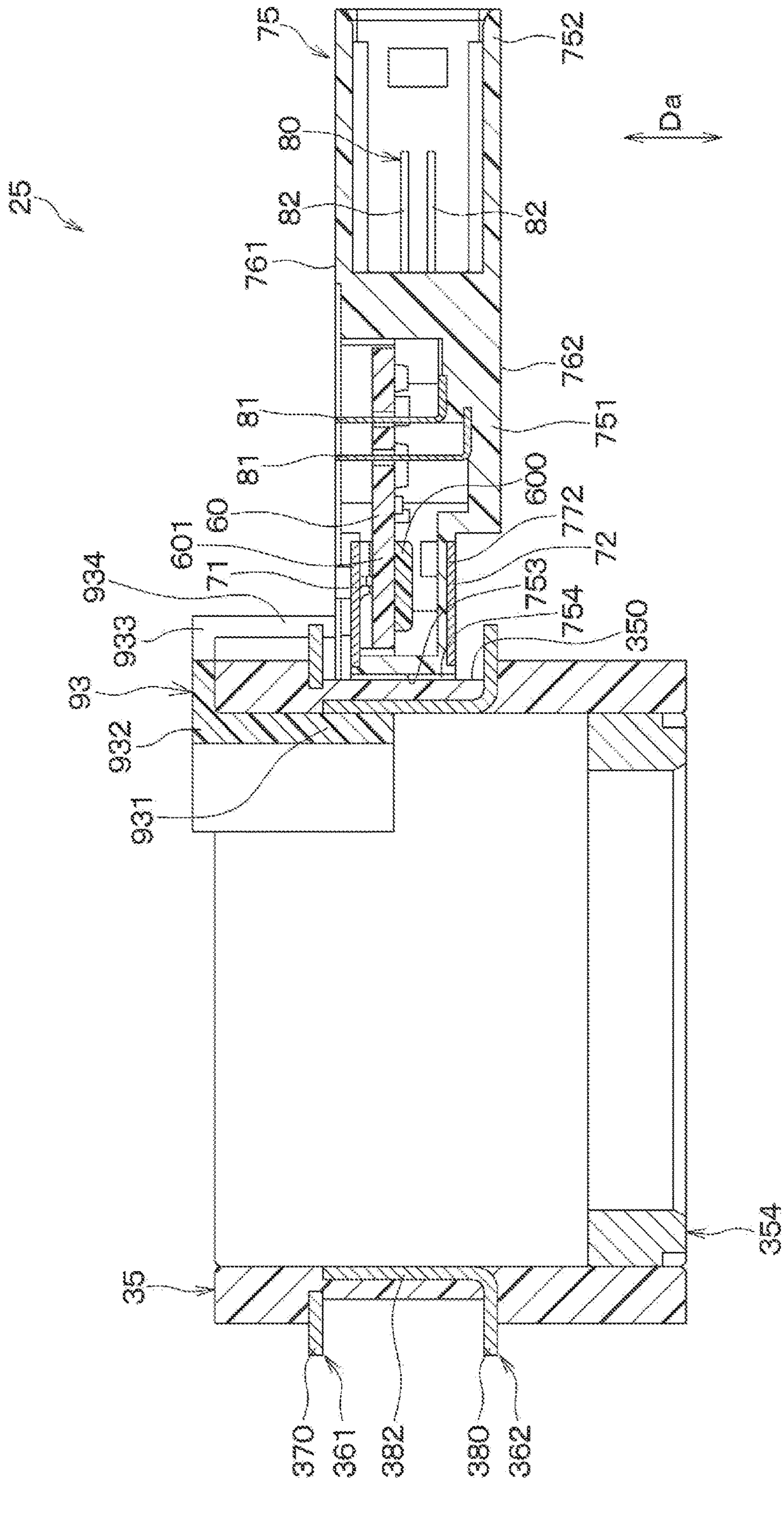
FIG. 63 is a cross-sectional view taken along line LXIII-LXIII in FIG. 61.
Figure 64:
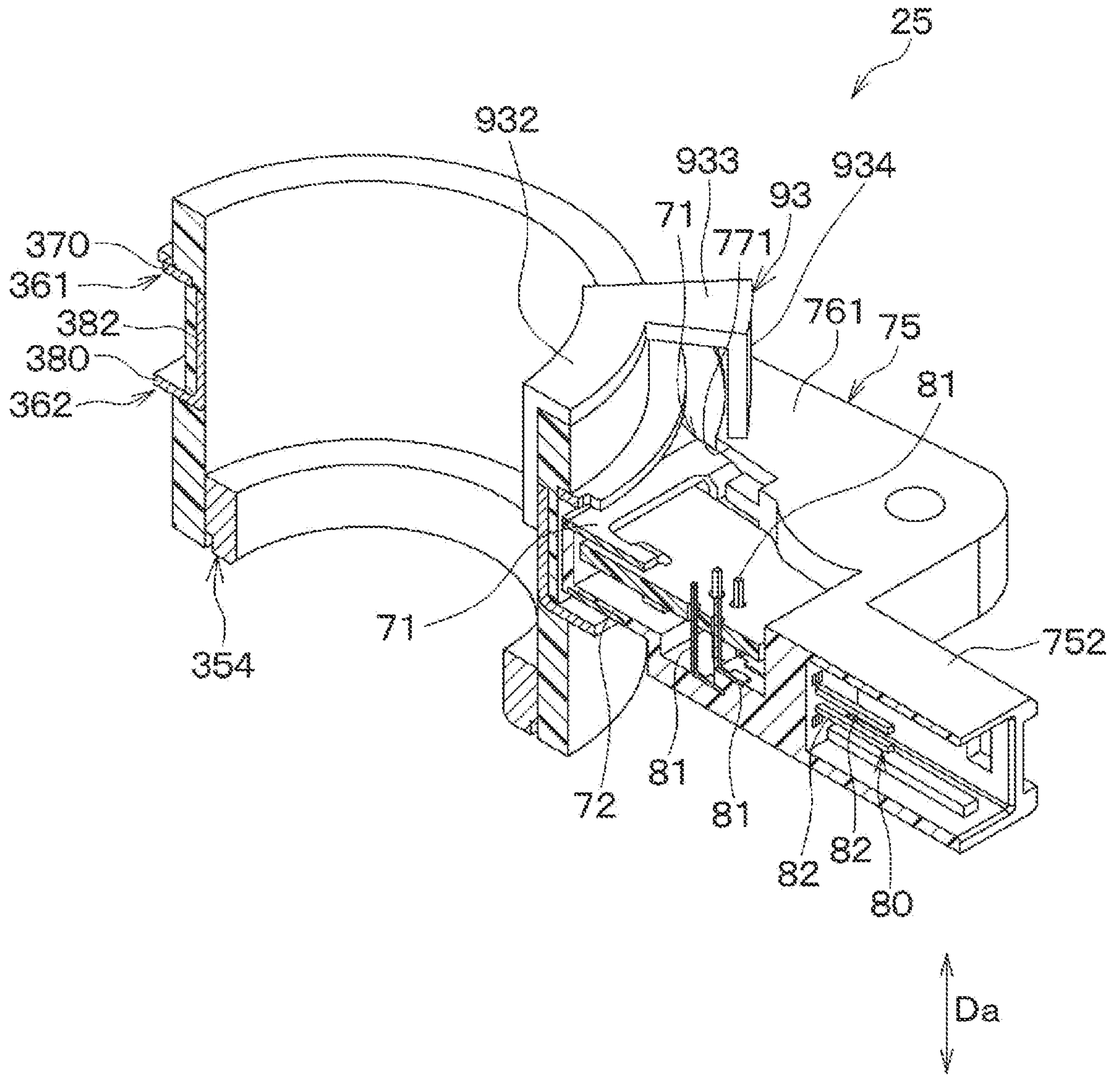
FIG. 64 is a perspective cross-sectional view of the torque detection device.
Figure 65:
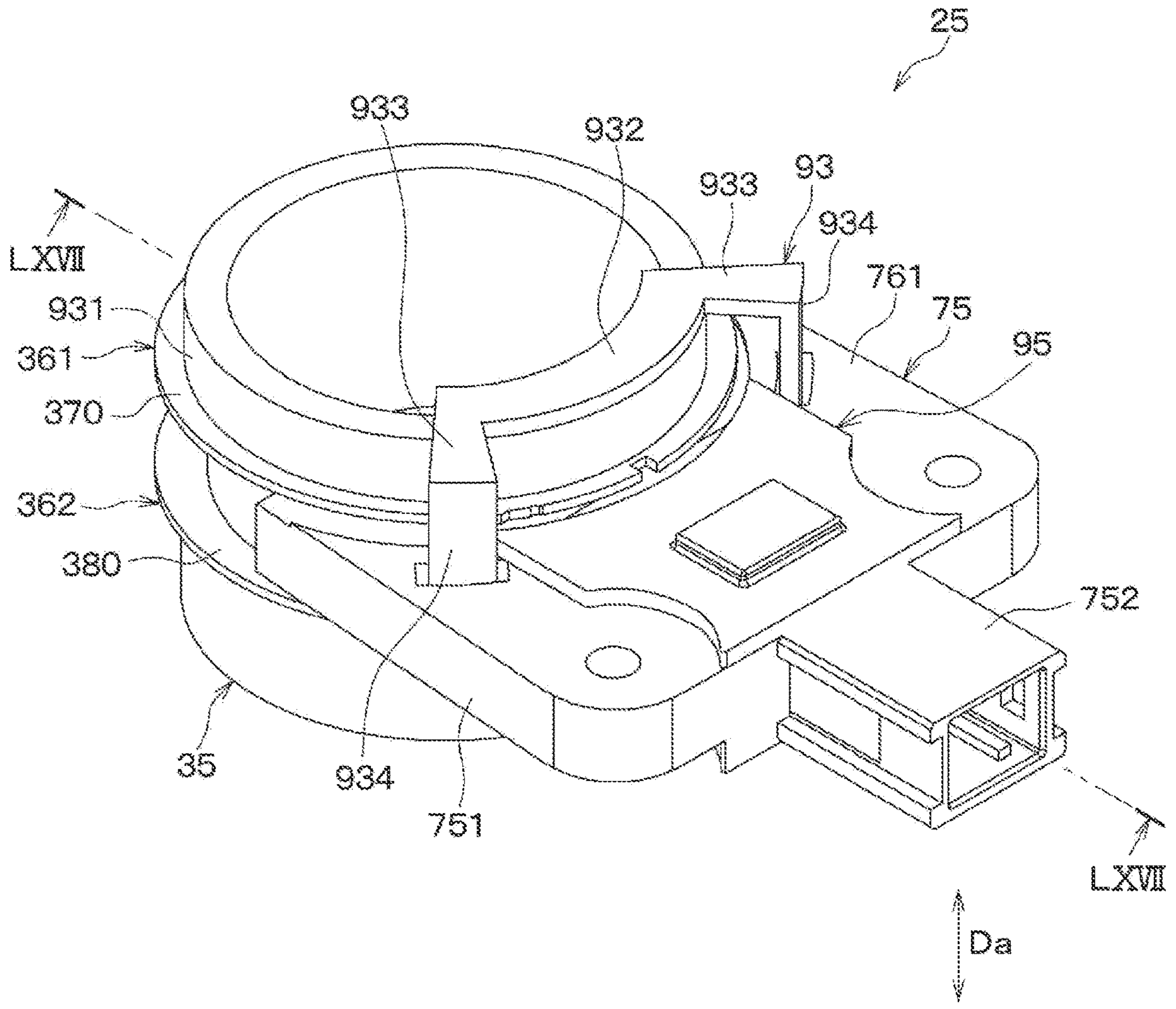
FIG. 65 is a perspective view of a torque detection device of a fifteenth embodiment.
Figure 66:
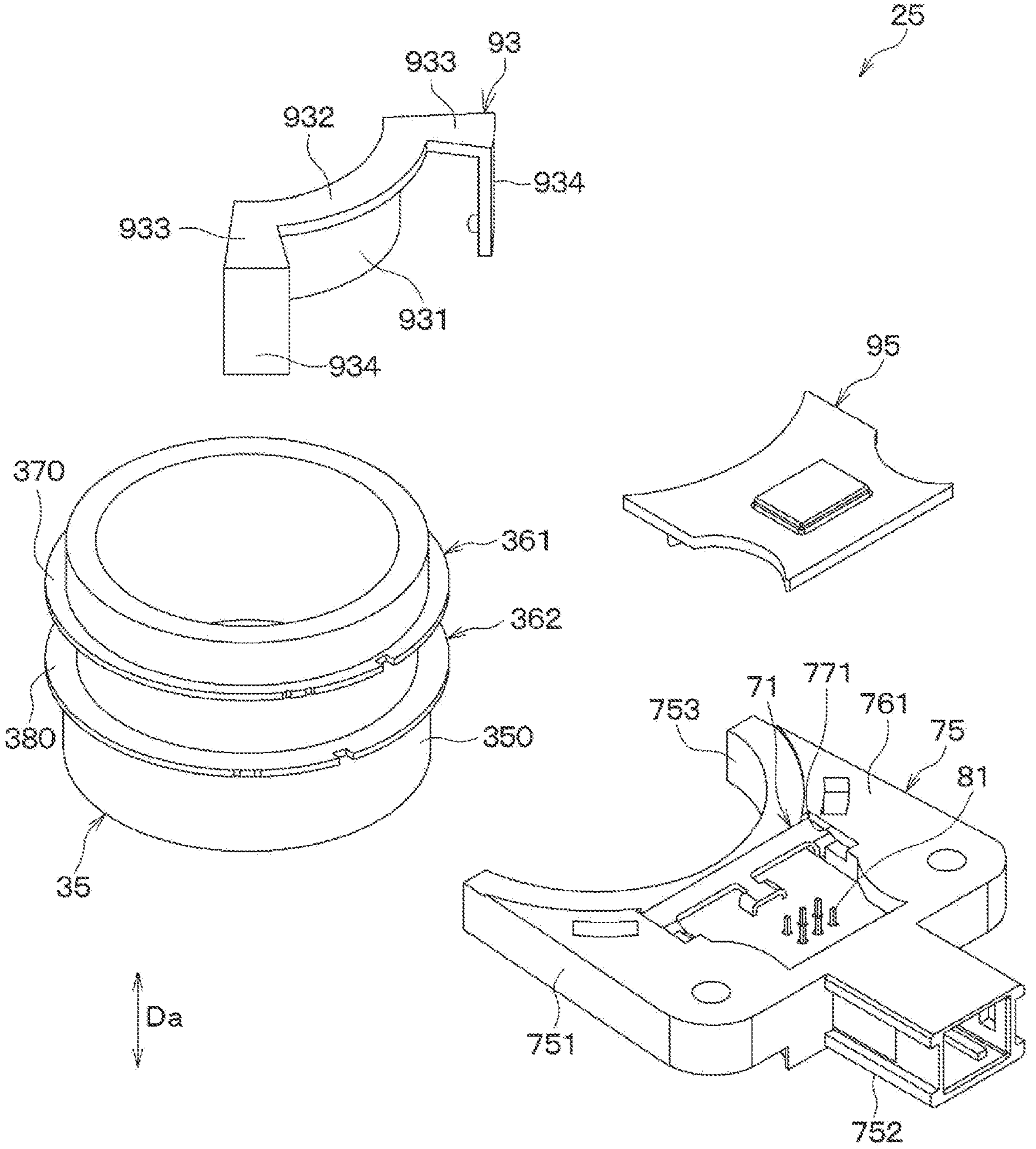
FIG. 66 is an exploded perspective view of the torque detection device.
Figure 67:
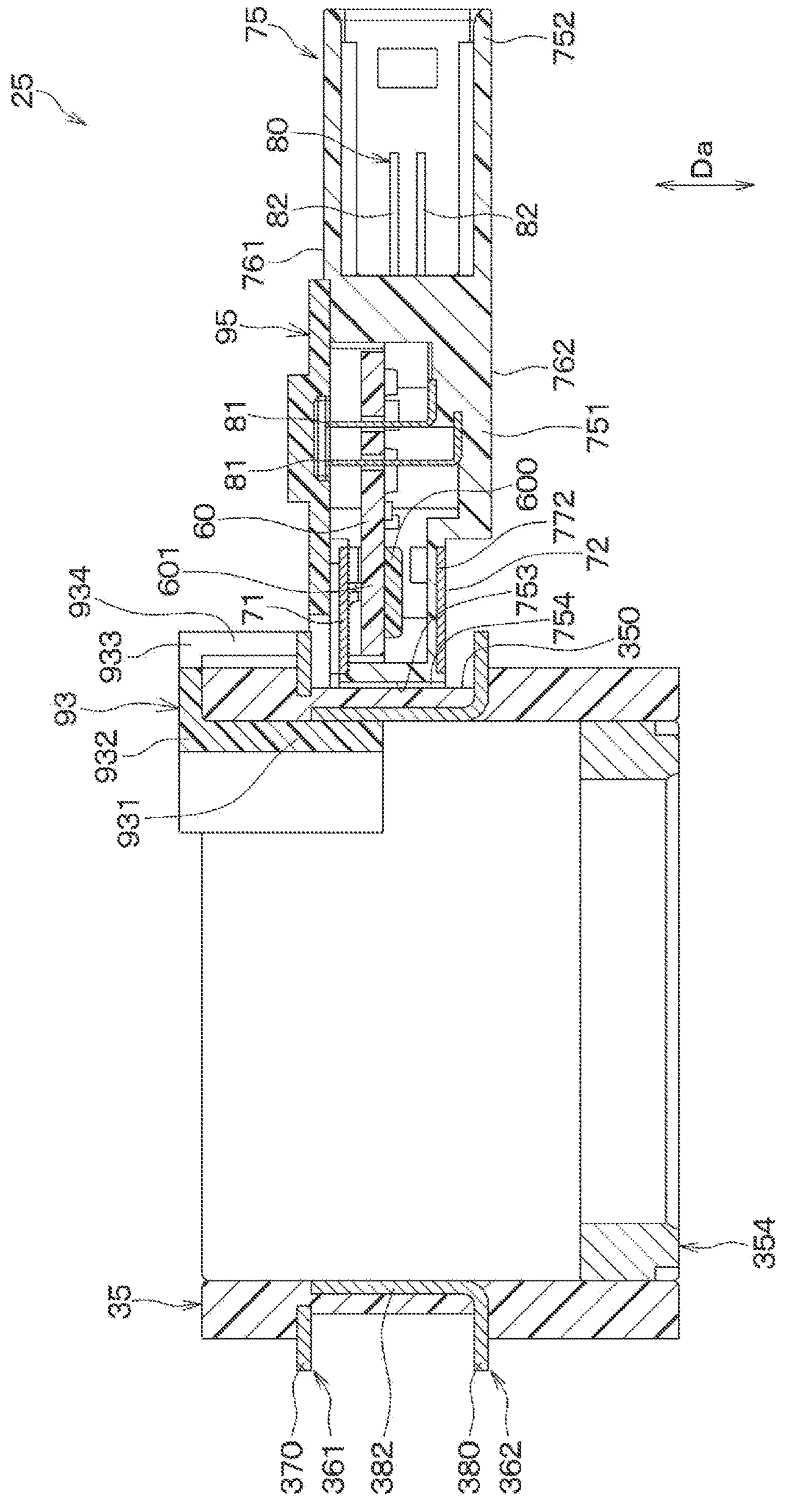
FIG. 67 is a cross-sectional view taken along line LXVII-LXVII in FIG. 65.
Figure 68:
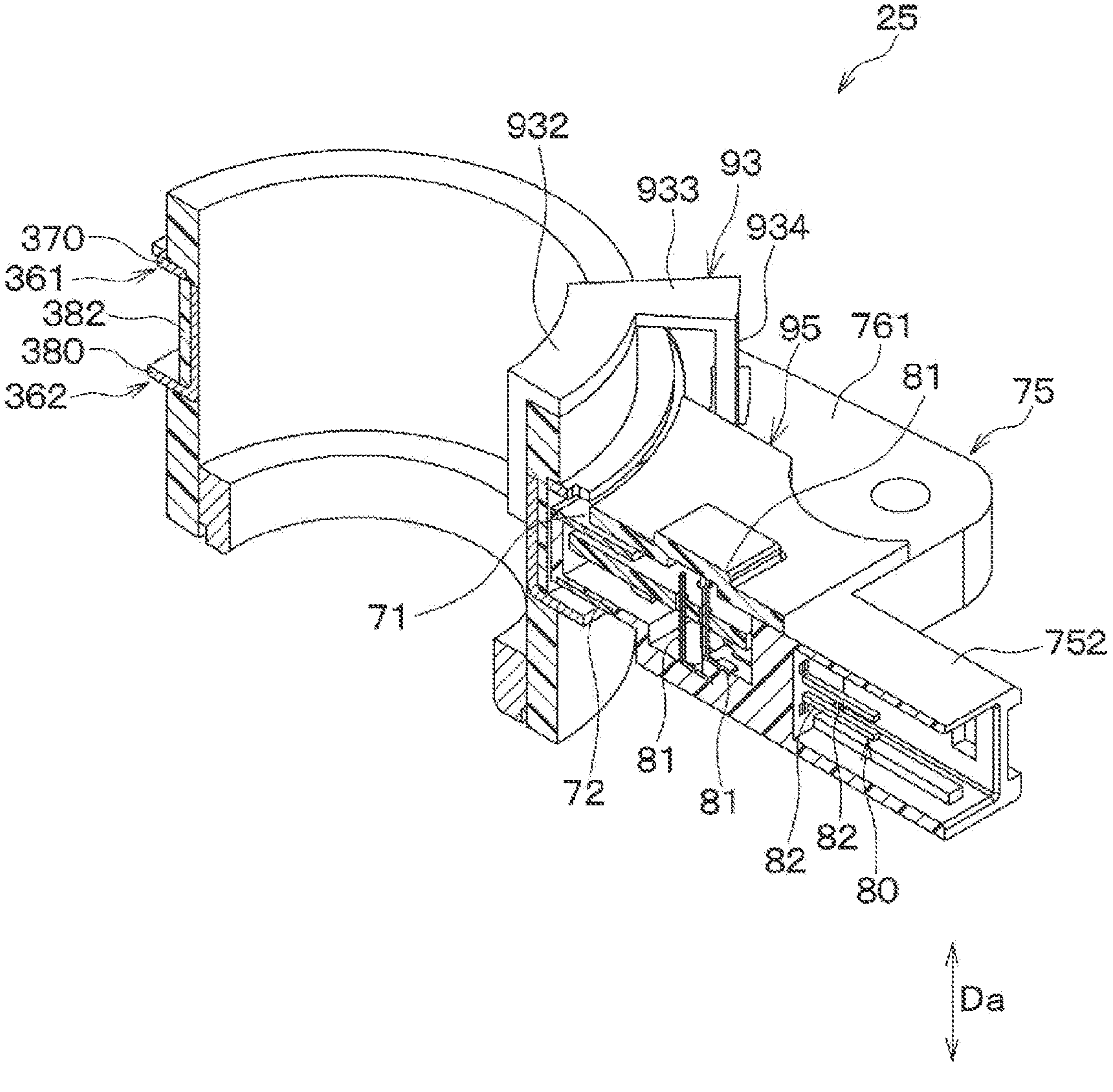
FIG. 68 is a perspective cross-sectional view of the torque detection device.

In a case where the steering torque is generated in an opposite direction, which is opposite to the direction of the steering torque in the case of FIG. 8, as shown in FIG. 9, an overlapping area between the S-pole of the magnet 30 and the first-yoke claw 372 in the direction perpendicular to the axial direction Da is increased. Furthermore, an overlapping area between the N-pole of the magnet 30 and the second-yoke claw 382 in the direction perpendicular to the axial direction Da is increased. At this time, the number of magnetic field lines, which extend from the N-pole of the magnet 30 to the second-yoke claw 382, is increased, and the number of magnetic field lines, which extend from the first-yoke claw 372 to the S-pole of the magnet 30, is increased. Therefore, the magnetic flux density is generated between the first yoke 361 and the second yoke 362.

Therefore, at this time, the number of magnetic field lines, which extend from the N-pole of the magnet 30 and pass through the magnetic detector 600 via the second-yoke ring 380 and the second magnetic guide member 72, is increased. Furthermore, the magnetic field lines, which have passed through the magnetic detector 600, pass through the S-pole of the magnet 30 via the first magnetic guide member 71 and the first-yoke ring 370.

Thus, the magnetic detector 600 detects the strength of the magnetic field directed toward the other side among the two opposite sides in the axial direction Da. Thereby, the magnetic detector 600 detects the steering torque. Furthermore, the magnetic detector 600 outputs the signal, which corresponds to the detected strength of the magnetic field, to the motor control device 18 through the corresponding terminal 80. The motor control device 18 calculates the steering torque based on the signal outputted from the magnetic detector 600.

As described above, the torque sensor 25 detects the steering torque. Next, simplification of a manufacturing process of the torque sensor 25 will be described.

The torque sensor 25 includes the magnet 30, the rotor 35, the first yoke 361, the second yoke 362, the magnetic detector 600, the sensor case 75 and the cover 85. The magnet 30 is configured to generate the magnetic field and is configured to be rotated together with the steering wheel 5. The rotor 35 is shaped in a ring form and is configured to be rotated together with the steering wheel 5 about the axis that extends in the axial direction Da. The first yoke 361 has the first-yoke ring 370 and the first-yoke claws 372. The first-yoke ring 370 is shaped in the ring form and is configured to be rotated together with the rotor 35. The first-yoke claws 372 project from the first-yoke ring 370 in the axial direction Da and are thereby opposed to the magnet 30 in the radial direction. The first-yoke claws 372 are configured to be rotated together with the first-yoke ring 370 and thereby change the magnetic field generated by the magnet 30. The second yoke 362 has the second-yoke ring 380 and the second-yoke claws 382. The second-yoke ring 380 is shaped in the ring form and is configured to be rotated together with the rotor 35. The second-yoke claws 382 project from the second-yoke ring 380 in the axial direction Da and are thereby opposed to the magnet 30 in the radial direction. The second-yoke claws 382 are configured to be rotated together with the second-yoke ring 380 and thereby change the magnetic field generated by the magnet 30. The magnetic detector 600 is configured to detect the strength of the magnetic field that changes in response to the rotation of the first-yoke claws 372 and the second-yoke claws 382. This strength of the magnetic field corresponds to the steering torque. The sensor case 75 receives the magnetic detector 600. The cover 85 has the sensor cover portion 851 and the rotor cover portion 852. The sensor cover portion 851 is joined to the first base surface 761. The rotor cover portion 852 is joined to the sensor cover portion 851 and receives the rotor 35 inserted in the rotor cover portion 852 in the axial direction Da. Furthermore, the rotor cover portion 852 limits movement of the rotor 35 relative to the sensor case 75 in the radial direction. The steering wheel 5 serves as a detection subject (detection subject device). The steering torque serves as the torque of the detection subject. The first yoke 361 and the second yoke 362 each serve as a yoke. The first-yoke ring 370 and the second-yoke ring 380 each serve as a ring. The first-yoke claws 372 serve as a plurality of claws, and the second-yoke claws 382 also serve as a plurality of claws. The radial direction serves as a direction perpendicular to the axial direction Da.

The rotor 35 is inserted into the rotor cover portion 852 in the axial direction Da, and the rotor cover portion 852 is joined to the sensor cover portion 851. Therefore, movement of the rotor 35 relative to the sensor case 75 in the radial direction is limited. Thus, the torque sensor 25 is assembled by inserting the components in the axial direction Da only, which simplifies the manufacturing process in comparison to the case where the torque sensor is assembled by inserting the components in the two directions, i.e., the axial direction Da and the radial direction.

Furthermore, in the first embodiment, the following advantages are achieved. [0135] [1-1] Since the rotor cover portion 852 is opposed to the first-yoke ring 370 in the axial direction Da, movement of the first-yoke ring 370 relative to the sensor case 75 in the axial direction Da is limited.

Therefore, since the movement of the first-yoke ring 370 in the axial direction Da is limited, it is possible to limit variations in the distance in the axial direction Da between:

the first-yoke ring 370; and the first magnetic guide member 71 that is opposed to the first-yoke ring 370 in the axial direction Da. This limits variations in the strength of the magnetic field that passes through the magnetic detector 600 from the first-yoke ring 370 via the first magnetic guide member 71. As a result, variations in the sensitivity of the magnetic detector 600 are limited.

[1-2] The torque sensor 25 includes the circuit board 60. The magnetic detector 600 is installed on the circuit board 60 while the circuit board 60 is received in the sensor case 75. Furthermore, the circuit board 60 has the connecting portion 601. The connecting portion 601 is coupled to the magnetic detector 600 and is exposed from the sensor case 75. The sensor cover portion 851 covers the connecting portion 601.

Therefore, the magnetic detector 600 and the other components, which are installed on the circuit board 60, are protected from foreign objects, and thereby the dustproof and waterproof performance of the torque sensor 25 is improved.

[1-3] The first distance L1 is smaller than the second distance L2. Here, the first distance L1 corresponds to the distance, which is measured from the part of the connecting portion 601 where the first-yoke ring 370 and the cover 85 overlap each other in the axial direction Da to the part of the first-yoke ring 370 where the cover 85 and the connecting portion 601 overlap each other in the axial direction Da. Furthermore, the second distance L2 corresponds to the distance, which is measured from the part of the connecting portion 601 where the first-yoke ring 370 and the cover 85 overlap each other in the axial direction Da to the part of the cover 85 where the first-yoke ring 370 and the connecting portion 601 overlap each other in the axial direction Da.

Here, in a comparative case where the sensor cover portion 851 is placed between the first-yoke ring 370 and the connecting portion 601, a distance between the first-yoke ring 370 and the connecting portion 601 is increased by the amount that corresponds to the size of the sensor cover portion 851. In contrast, in the torque sensor 25, since the first distance L1 is smaller than the second distance L2, the first-yoke ring 370 is positioned between the sensor cover portion 851 and the connecting portion 601. Therefore, since the sensor cover portion 851 is not positioned between the first-yoke ring 370 and the connecting portion 601, the distance between the first-yoke ring 370 and the connecting portion 601 can be reduced by the amount that corresponds to the size of the sensor cover portion 851. This limits the attenuation of the magnetic field passing through the magnetic detector 600 from the first-yoke ring 370, and thereby the sensitivity of the magnetic detector 600 is improved.

Second Embodiment

In the second embodiment, as shown in FIGS. 10 to 13, the configurations of the sensor case 75 and the cover 85 are different from those of the first embodiment. The rest of the present embodiment is the same as that of the first embodiment. In FIGS. 10 to 13, the first-yoke claws 372 and the second-yoke claws 382 are partially omitted to avoid complication.

The sensor case 75 has a plurality of cover retainer pins 758. Each of the cover retainer pins 758 projects from the first base surface 761 in the axial direction Da.

The sensor cover portion 851 of the cover 85 has a plurality of pin receiving holes 854. A portion of each of the cover retainer pins 758 is inserted into a corresponding one of the pin receiving holes 854. This makes it difficult for the cover 85 to come off the sensor case 75. In addition, the sensor cover portion 851 and the cover retainer pins 758 are coupled together by, for example, heat-caulking, so that it makes more difficult for the cover 85 to come off the sensor case 75 than in a case where the sensor cover portion 851 and the cover retainer pins 758 are not coupled together by, for example, the heat-caulking. Alternatively, the sensor cover portion 851 may have the cover retainer pins 758, and the pin receiving holes 854 may be formed at the first base surface 761 of the sensor case 75.

The second embodiment is configured in the above-described manner. Even in the second embodiment, the advantages, which are similar to those of the first embodiment, are achieved.

Third Embodiment

In the third embodiment, as shown in FIGS. 14 to 18, the configurations of the sensor case 75, the circuit board 60 and the cover 85 are different from those of the first embodiment. Furthermore, the configuration of the rotor 35 is different from that of the first embodiment. Furthermore, the torque sensor 25 includes a first follower rotor 31, a second follower rotor 32, a first angle-detection magnetic guide member 711, a first angle-detection magnet 51, a second angle-detection magnetic guide member 722, a second angle-detection magnet 52, a first magnetic angle detector 611 and a second magnetic angle detector 622. The rest of the present embodiment is the same as that of the first embodiment. In FIGS. 14 to 18, the first-yoke claws 372 and the second-yoke claws 382 are partially omitted to avoid complication.

The sensor case 75 is shaped in an arcuate form. Therefore, the circuit board 60, which is configured to be received in the sensor case 75, is shaped in an arcuate form. The sensor case 75 has the cover retainer pins 758 described above.

The sensor cover portion 851 is shaped in an arcuate form. The sensor cover portion 851 of the cover 85 has the pin receiving holes 854 described above.

The rotor 35 includes a gear arrangement 355. The gear arrangement 355 includes a circular ring 356 and a plurality of rotor gear teeth 357. The circular ring 356 is shaped in a circular ring form. The rotor gear teeth 357 project from the circular ring 356 in the axial direction Da.

The first follower rotor 31 is made of, for example, resin. The first follower rotor 31 is received in the first receiving portion 751 of the sensor case 75. Furthermore, the first follower rotor 31 is covered by the first receiving portion 751 and the sensor cover portion 851. An axis of the first follower rotor 31 is parallel to the axis of the rotor 35. The first follower rotor 31 includes a first cylindrical tubular portion 313 and a plurality of first follower gear teeth 314.

The first cylindrical tubular portion 313 is shaped in a cylindrical tubular form. Each of the first follower gear teeth 314 outwardly projects from the first cylindrical tubular portion 313 in the radial direction. Furthermore, a portion of each of the first follower gear teeth 314 is configured to be placed between corresponding adjacent two of the rotor gear teeth 357. Therefore, the first follower rotor 31 is meshed with the rotor 35. The number of the first follower gear teeth 314, which is the number of the teeth of the first follower rotor 31, is different from the number of the rotor gear teeth 357, which is the number of the teeth of the rotor 35.

Like the first follower rotor 31, the second follower rotor 32 is made of, for example, resin. The second follower rotor 32 is received in the first receiving portion 751 of the sensor case 75. Furthermore, the second follower rotor 32 is covered by the first receiving portion 751 and the sensor cover portion 851. Furthermore, an axis of the second follower rotor 32 is parallel to the axis of the rotor 35 and the axis of the first follower rotor 31. The second follower rotor 32 includes a second cylindrical tubular portion 323 and a plurality of second follower gear teeth 324.

The second cylindrical tubular portion 323 is shaped in a cylindrical tubular form. Each of the second follower gear teeth 324 outwardly projects from the second cylindrical tubular portion 323 in the radial direction. Furthermore, a portion of each of the second follower gear teeth 324 is configured to be placed between corresponding adjacent two of the rotor gear teeth 357. Therefore, the second follower rotor 32 is meshed with the rotor 35. The number of the second follower gear teeth 324, which is the number of the teeth of the second follower rotor 32, is different from the number of the rotor gear teeth 357, which is the number of the teeth of the rotor 35.

The first angle-detection magnetic guide member 711 is installed to the first cylindrical tubular portion 313. The first angle-detection magnetic guide member 711 is configured to guide a magnetic field, which is generated by the first angle-detection magnet 51 described later, to the first magnetic angle detector 611 described later.

The first angle-detection magnet 51 is inserted into the first cylindrical tubular portion 313. Therefore, when the first follower rotor 31 is rotated, the first angle-detection magnet 51 is rotated together with the first follower rotor 31. Furthermore, the first angle-detection magnet 51 is opposed to the first angle-detection magnetic guide member 711 in the axial direction Da and also a direction perpendicular to the axial direction Da. Also, in an initial state where the steering wheel 5 is not rotated, one side of the first angle-detection magnet 51 in a first direction D1 is magnetized to, for example, an N-pole. Furthermore, in the initial state where the steering wheel 5 is not rotated, the other side of the first angle-detection magnet 51 in the first direction D1 is magnetized to, for example, an S-pole. Here, the first direction D1 is a direction along a straight line that connects between the axis of the rotor 35 and the axis of the first follower rotor 31 and is perpendicular to the axial direction Da.

The second angle-detection magnetic guide member 722 is installed to the second cylindrical tubular portion 323. Furthermore, the second angle-detection magnetic guide member 722 is configured to guide a magnetic field, which is generated by the second angle-detection magnet 52 described later, to the second magnetic angle detector 622 described later.

The second angle-detection magnet 52 is inserted into the second cylindrical tubular portion 323. Therefore, when the second follower rotor 32 is rotated, the second angle-detection magnet 52 is rotated together with the second follower rotor 32. Furthermore, the second angle-detection magnet 52 is opposed to the second angle-detection magnetic guide member 722 in the axial direction Da and also the direction perpendicular to the axial direction Da. Also, in the initial state where the steering wheel 5 is not rotated, one side of the second angle-detection magnet 52 in a second direction D2 is magnetized to, for example, an N-pole. Furthermore, in the initial state where the steering wheel 5 is not rotated, the other side of the second angle-detection magnet 52 in the second direction D2 is magnetized to, for example, an S-pole. Here, the second direction D2 is a direction along a straight line that connects between the axis of the rotor 35 and the axis of the second follower rotor 32 and is perpendicular to the axial direction Da.

The first magnetic angle detector 611 is installed to the circuit board 60. Furthermore, the first magnetic angle detector 611 is opposed to the first angle-detection magnetic guide member 711 in the axial direction Da. Therefore, the magnetic field lines, which extend from the N-pole of the first angle-detection magnet 51, pass through the first magnetic angle detector 611 via the first angle-detection magnetic guide member 711. Furthermore, the first magnetic angle detector 611 includes a first element and a second element (not shown). The first element and the second element are, for example, Hall elements or MR elements. Furthermore, the first element of the first magnetic angle detector 611 detects the strength of the magnetic field in one direction among the magnetic fields, which pass through the first magnetic angle detector 611. The second element of the first magnetic angle detector 611 detects the strength of the magnetic field in a direction perpendicular to the direction of the magnetic field detected by the first element of the first magnetic angle detector 611. Furthermore, the first magnetic angle detector 611 outputs signals, which respectively correspond to these detected strengths of the magnetic fields, to the motor control device 18 through the corresponding terminals 80.

The second magnetic angle detector 622 is installed to the circuit board 60. Furthermore, the second magnetic angle detector 622 is opposed to the second angle-detection magnetic guide member 722 in the axial direction Da. Therefore, the magnetic field lines, which extend from the N-pole of the second angle-detection magnet 52, pass through the second magnetic angle detector 622 via the second angle-detection magnetic guide member 722. Furthermore, the second magnetic angle detector 622 includes a first element and a second element (not shown). The first element and the second element are, for example, Hall elements or MR elements. Furthermore, the first element of the second magnetic angle detector 622 detects the strength of the magnetic field in one direction among the magnetic fields, which pass through the second magnetic angle detector 622. The second element of the second magnetic angle detector 622 detects the strength of the magnetic field in a direction perpendicular to the direction of the magnetic field detected by the first element of the second magnetic angle detector 622. Furthermore, the second magnetic angle detector 622 outputs signals, which respectively correspond to these detected strengths of the magnetic fields, to the motor control device 18 through the corresponding terminals 80.

The third embodiment is configured in the above-described manner. The torque sensor 25 detects the steering angle of the steering wheel 5 in addition to the steering torque. Next, the detection of the steering angle with the torque sensor 25 will be described.

When the steering wheel 5 is rotated, the steering torque is generated. Thereby, the first steering shaft 11, which is coupled to the steering wheel 5, is rotated. Furthermore, the torsion bar 13, which is fixed to the first steering shaft 11 by the shaft pin 14, is rotated. Also, the second steering shaft 12, which is fixed to the torsion bar 13 by the shaft pin 14, is rotated. Furthermore, the second steering shaft 12 is coupled to the fixation collar 354 of the rotor 35. Therefore, the rotor 35 is rotated. Thus, the first follower rotor 31 and the second follower rotor 32, which are meshed with the rotor 35, are rotated.

At this time, the first angle-detection magnet 51, which is installed to the first follower rotor 31, is rotated. Therefore, the magnetic field lines, which extend from the N-pole of the first angle-detection magnet 51 and pass through the first angle-detection magnetic guide member 711, the first magnetic angle detector 611, the first angle-detection magnetic guide member 711 and the S-pole of the first angle-detection magnet 51, periodically change. Thus, the strength of the magnetic field in the one direction applied to the first magnetic angle detector 611 periodically changes.

Here, as described above, in the initial state where the steering wheel 5 is not rotated, the one side of the first angle-detection magnet 51 in the first direction D1 is magnetized to the N-pole. Furthermore, in the initial state where the steering wheel 5 is not rotated, the other side of the first angle-detection magnet 51 in the first direction D1 is magnetized to the S-pole. Therefore, in the initial state where the steering wheel 5 is not rotated, the strength of the magnetic field in the first direction D1 applied to the first magnetic angle detector 611 becomes a predetermined value.

Thus, when the steering angle changes, an output waveform of the first element of the first magnetic angle detector 611, which detects the strength of the magnetic field in the first direction D1, becomes a cosine waveform. Therefore, at this time, the first element of the first magnetic angle detector 611 outputs the signal, which forms the cosine waveform corresponding to the rotational angle of the first follower rotor 31 and the steering angle, to the motor control device 18. Furthermore, when the steering angle changes, an output waveform of the second element of the first magnetic angle detector 611, which detects the strength of the magnetic field in the direction perpendicular to the first direction D1, becomes a sine waveform. Therefore, at this time, the second element of the first magnetic angle detector 611 outputs the signal, which forms the sine waveform corresponding to the rotational angle of the first follower rotor 31 and the steering angle, to the motor control device 18.

Furthermore, the second angle-detection magnet 52, which is installed to the second follower rotor 32, is rotated. Therefore, the magnetic field lines, which extend from the N-pole of the second angle-detection magnet 52 and pass through the second angle-detection magnetic guide member 722, the second magnetic angle detector 622, the second angle-detection magnetic guide member 722 and the S-pole of the second angle-detection magnet 52, periodically change. Thus, the strength of the magnetic field in the second direction D2 applied to the second magnetic angle detector 622 periodically changes.

Here, as described above, in the initial state where the steering wheel 5 is not rotated, the one side of the second angle-detection magnet 52 in the second direction D2 is magnetized to the N-pole. Furthermore, in the initial state where the steering wheel 5 is not rotated, the other side of the second angle-detection magnet 52 in the second direction D2 is magnetized to the S-pole. Therefore, in the initial state where the steering wheel 5 is not rotated, the strength of the magnetic field in the second direction D2 applied to the second magnetic angle detector 622 becomes a predetermined value.

Thus, when the steering angle changes, an output waveform of the first element of the second magnetic angle detector 622, which detects the strength of the magnetic field in the second direction D2, becomes a cosine waveform. Therefore, at this time, the first element of the second magnetic angle detector 622 outputs the signal, which forms the cosine waveform corresponding to the rotational angle of the second follower rotor 32 and the steering angle, to the motor control device 18. Furthermore, when the steering angle changes, an output waveform of the second element of the second magnetic angle detector 622, which detects the strength of the magnetic field in the direction perpendicular to the second direction D2, becomes a sine waveform. Therefore, at this time, the second element of the second magnetic angle detector 622 outputs the signal, which forms the sine waveform corresponding to the rotational angle of the second follower rotor 32 and the steering angle, to the motor control device 18.

The motor control device 18 calculates a value, which relates to the steering angle, based on the signals outputted from the first and second elements of the first magnetic angle detector 611 and the signals outputted from the first and second elements of the second magnetic angle detector 622.

For example, the motor control device 18 divides a value of the signal, which is outputted from the second element of the first magnetic angle detector 611 and forms the sine waveform, by a value of the signal, which is outputted from the first element of the first magnetic angle detector 611 and forms the cosine waveform. Thereby, the motor control device 18 calculates a value of a tangent, which corresponds to the rotational angle of the first follower rotor 31, thereby calculating the rotational angle of the first follower rotor 31. For example, the motor control device 18 divides a value of the signal, which is outputted from the second element of the second magnetic angle detector 622 and forms the sine waveform, by a value of the signal, which is outputted from the first element of the second magnetic angle detector 622 and forms the cosine waveform. Thereby, the motor control device 18 calculates a value of a tangent, which corresponds to the rotational angle of the second follower rotor 32, thereby calculating the rotational angle of the second follower rotor 32.

Here, the number of the second follower gear teeth 324, which is the number of the teeth of the second follower rotor 32, is different from the number of the first follower gear teeth 314, which is the number of the teeth of the first follower rotor 31. Therefore, periods of the output waveforms of the first and second elements of the first magnetic angle detector 611 are different from the periods of the output waveforms of the first and second elements of the second magnetic angle detector 622. Furthermore, the outputs of the first and second elements of the first magnetic angle detector 611 and the outputs of the first and second elements of the second magnetic angle detector 622 respectively correspond to the steering angle. Therefore, a difference between the rotational angle of the first follower rotor 31 and the rotational angle of the second follower rotor 32 corresponds to the steering angle.

Thus, the motor control device 18 calculates the difference between the rotational angle of the first follower rotor 31 and the rotational angle of the second follower rotor 32 and calculates the steering angle based on this calculated difference.

The torque sensor 25 detects the steering angle in the above-described manner. Even in the third embodiment, the advantages, which are similar to those of the first embodiment, are achieved. Furthermore, in the third embodiment, the following advantage is also achieved.

[2] The torque sensor 25 includes the first follower rotor 31, the second follower rotor 32, the first angle-detection magnet 51, the second angle-detection magnet 52, the first magnetic angle detector 611 and the second magnetic angle detector 622. The first follower rotor 31 and the second follower rotor 32 are configured to rotate together with the rotor 35. The first angle-detection magnet 51 is configured to generate the magnetic field and is configured to be rotated together with the first follower rotor 31. The second angle-detection magnet 52 is configured to generate the magnetic field and is configured to be rotated together with the second follower rotor 32. The first magnetic angle detector 611 is configured to detect the strength of the magnetic field that changes in response to the rotation of the first follower rotor 31 and corresponds to the steering angle. The second magnetic angle detector 622 is configured to detect the strength of the magnetic field that changes in response to the rotation of the second follower rotor 32 and corresponds to the steering angle. The first angle-detection magnet 51 and the second angle-detection magnet 52 each serve as an angle-detection magnet. The first magnetic angle detector 611 and the second magnetic angle detector 622 each serve as an angle detector. The steering angle serves as a rotational angle of the detection subject.

Therefore, the torque sensor 25 can detect the steering angle in addition to the steering torque. Thus, the torque sensor 25 functions as a torque angle sensor.

Fourth Embodiment

In the fourth embodiment, as shown in FIGS. 19 to 22, the torque sensor 25 includes a first cover 85 and a second cover 86. The rest of the present embodiment is the same as that of the first embodiment. In FIGS. 19 to 22, the first-yoke claws 372 and the second-yoke claws 382 are partially omitted to avoid complication.

The first cover 85 corresponds to the cover 85 described above. The second cover 86 is made of, for example, resin. Furthermore, the second cover 86 includes a second sensor cover portion 861 and a second rotor cover portion 862.

The second sensor cover portion 861 is joined to a portion of the second base surface 762 by, for example, welding or bonding. The second sensor cover portion 861 covers the second magnetic guide member 72 and the magnetic detector 600 which are exposed to the outside.

The second rotor cover portion 862 is joined to the second sensor cover portion 861. Also, the second rotor cover portion 862 is shaped in a circular ring form and has a second cover hole 863. The second cover hole 863 is shaped in a circular form. Thus, a portion of the rotor 35 is inserted into the second cover hole 863 in the axial direction Da.

The torque sensor 25 is configured in the above-described manner. Even in the fourth embodiment, the advantages, which are similar to those of the first embodiment, are achieved.

Fifth Embodiment

In the fifth embodiment, as shown in FIGS. 23 to 26, the configurations of the sensor case 75 and the cover 85 are different from those of the fourth embodiment. The rest of the present embodiment is the same as that of the fourth embodiment. In FIGS. 23 to 26, the first-yoke claws 372 and the second-yoke claws 382 are partially omitted to avoid complication.

The sensor case 75 has a plurality of first-side pins 791 and a plurality of second-side pins 792. Each of the first-side pins 791 projects from the first base surface 761 in the axial direction Da. Each of the second-side pins 792 projects from the second base surface 762 in the axial direction Da.

The sensor cover portion 851 of the cover 85 has a plurality of first-side pin receiving holes 854. The first-side pin receiving holes 854 correspond to the pin receiving holes 854 described above. A portion of each of the first-side pins 791 is inserted into a corresponding one of the first-side pin receiving holes 854. This makes it difficult for the cover 85 to come off the sensor case 75. In addition, the sensor cover portion 851 and the first-side pins 791 are coupled together by, for example, heat-caulking, so that it makes more difficult for the cover 85 to come off the sensor case 75 than in the case where the sensor cover portion 851 and the first-side pins 791 are not coupled together by, for example, the heat-caulking. Alternatively, the sensor cover portion 851 may have the first-side pins 791, and the first-side pin receiving holes 854 may be formed at the first base surface 761 of the sensor case 75.

Furthermore, the second sensor cover portion 861 of the second cover 86 has a plurality of second-side pin receiving holes 855. A portion of each of the second-side pins 792 is inserted into a corresponding one of the second-side pin receiving holes 855. This makes it difficult for the second cover 86 to come off the sensor case 75. In addition, the second sensor cover portion 861 and the second-side pins 792 are coupled together by, for example, heat-caulking, so that it makes more difficult for the second cover 86 to come off the sensor case 75 than in the case where the second sensor cover portion 861 and the second-side pins 792 are not coupled together by, for example, the heat-caulking. Alternatively, the second sensor cover portion 861 may have the second-side pins 792, and the second-side pin receiving holes 855 may be formed at the second base surface 762 of the sensor case 75.

The fifth embodiment is configured in the above-described manner. Even in the fifth embodiment, the advantages, which are similar to those of the fourth embodiment, are achieved.

Sixth Embodiment

In the sixth embodiment, as shown in FIGS. 27 to 30, the configuration of the sensor case 75 is different from that of the first embodiment. The torque sensor 25 includes two magnetic detectors 600 and a holder member 90 but does not include the first magnetic guide member 71, the second magnetic guide member 72 and the cover 85. The rest of the present embodiment is the same as that of the first embodiment. In FIGS. 27 to 30, the first-yoke claws 372 and the second-yoke claws 382 are partially omitted to avoid complication.

The sensor case 75 has a case peripheral surface (case outer peripheral surface) 781 and two guide surfaces 782. The case peripheral surface 781 is joined to the first base surface 761 and extends in the axial direction Da from a boundary between the case peripheral surface 781 and the first base surface 761. Each of the guide surfaces 782 is joined to an opposite side of the case peripheral surface 781 which is opposite to the first base surface 761, and each of the guide surfaces 782 extends in the radial direction from a boundary between the guide surface 782 and the case peripheral surface 781.

Furthermore, the torque sensor 25 includes the two magnetic detectors 600. Therefore, if one of the magnetic detectors 600 fails, the torque sensor 25 can detect the steering torque by using the other one of the magnetic detectors 600.

The holder member 90 is shaped in a U-shape form. Furthermore, the holder member 90 has a curved portion 900 and two straight portions 910.

The curved portion 900 is shaped in an arcuate form. Furthermore, the curved portion 900 is opposed to the rotor peripheral surface 350 in the radial direction. A space is formed between the curved portion 900 and the rotor peripheral surface 350. The curved portion 900 is placed between the first-yoke ring 370 and the second-yoke ring 380 in the axial direction Da. Therefore, the curved portion 900 is opposed to the first-yoke ring 370 and the second-yoke ring 380 in the axial direction Da. Thus, movement of each of the first-yoke ring 370 and the second-yoke ring 380 in the axial direction Da is limited.

The straight portions 910 are joined to the curved portion 900 and extend from the curved portion 900 in the radial direction. Furthermore, each of the straight portions 910 is joined to the case peripheral surface 781 and the corresponding guide surface 782 by, for example, welding or bonding. Therefore, the rotor 35 is surrounded by the holder member 90 and the sensor case 75 in the radial direction. Thus, movement of the rotor 35 in the radial direction is limited.

The torque sensor 25 is configured in the above-described manner. Next, even in the sixth embodiment, the simplification of the manufacturing process of the torque sensor 25 will be described.

[3-1] The torque sensor 25 includes the magnet 30, the rotor 35, the first yoke 361, the second yoke 362, the magnetic detectors 600, the sensor case 75 and the holder member 90. The magnet 30 is configured to generate the magnetic field and is configured to be rotated together with the steering wheel 5. The rotor 35 is shaped in the ring form and is configured to be rotated together with the steering wheel 5 about an axis that extends in the axial direction Da. The first yoke 361 has the first-yoke ring 370 and the first-yoke claws 372. The first-yoke ring 370 is shaped in the ring form and is configured to be rotated together with the rotor 35. The first-yoke claws 372 project from the first-yoke ring 370 in the axial direction Da and are thereby opposed to the magnet 30 in the radial direction. The first-yoke claws 372 are configured to be rotated together with the first-yoke ring 370 and thereby change the magnetic field generated by the magnet 30. The second yoke 362 has the second-yoke ring 380 and the second-yoke claws 382. The second-yoke ring 380 is shaped in the ring form and is configured to be rotated together with the rotor 35. The second-yoke claws 382 project from the second-yoke ring 380 in the axial direction Da and are thereby opposed to the magnet 30 in the radial direction. The second-yoke claws 382 are configured to be rotated together with the second-yoke ring 380 and thereby change the magnetic field generated by the magnet 30. Each of the magnetic detectors 600 is configured to detect the strength of the magnetic field that changes in response to the rotation of the first-yoke claws 372 and the second-yoke claws 382. This strength of the magnetic field corresponds to the steering torque. The sensor case 75 receives the magnetic detectors 600. The holder member 90 surrounds the sensor case 75 and the rotor 35 in the radial direction, so that the holder member 90 limits movement of the rotor 35 relative to the sensor case 75 in the radial direction.

In the torque sensor 25, for example, by moving the holder member 90 only in the radial direction, the holder member 90 surrounds the rotor 35 in cooperation with the sensor case 75. Therefore, movement of the rotor 35 relative to the sensor case 75 in the radial direction is limited. Thus, since the torque sensor 25 is assembled by moving the components only in the one direction, the manufacturing process is simplified in comparison to the case where the torque sensor is assembled by inserting the components in the two directions, i.e., the axial direction Da and the radial direction.

Furthermore, in the sixth embodiment, the following advantage is achieved.

[3-2] Since the holder member 90 is opposed to the first-yoke ring 370 in the axial direction Da, movement of the first-yoke ring 370 relative to the sensor case 75 in the axial direction Da is limited.

Therefore, since the movement of the first-yoke ring 370 in the axial direction Da is limited, it is possible to limit variations in the distance in the axial direction Da between: the first-yoke ring 370; and the first magnetic guide member 71 that is opposed to the first-yoke ring 370 in the axial direction Da. This limits variations in the strength of the magnetic field that passes through the magnetic detector 600 from the first-yoke ring 370 via the first magnetic guide member 71. As a result, variations in the sensitivity of the magnetic detector 600 are limited.

Seventh Embodiment

In the seventh embodiment, as shown in FIGS. 31 to 34, the torque sensor 25 further includes a sensor cover 95. The rest of the present embodiment is the same as that of the sixth embodiment. In FIGS. 31 to 34, the first-yoke claws 372 and the second-yoke claws 382 are partially omitted to avoid complication.

The sensor cover 95 covers an exposed portion of the circuit board 60, which is exposed from the sensor case 75, in cooperation with the first receiving portion 751 of the sensor case 75. Therefore, the magnetic detector 600 and the other components, which are installed on the circuit board 60, are protected from the foreign objects, and thereby the dustproof and waterproof performance of the torque sensor 25 is improved.

The seventh embodiment is configured in the above-described manner. Even in the seventh embodiment, the advantages, which are similar to those of the sixth embodiment, are achieved.

Eighth Embodiment

In the eighth embodiment, as shown in FIGS. 35 to 39, the configurations of the sensor case 75, the circuit board 60, the sensor cover 95 and the holder member 90 are different from those of the seventh embodiment. Furthermore, the configuration of the rotor 35 is different from that of the first embodiment. In addition, the torque sensor 25 includes the first follower rotor 31, the second follower rotor 32, the first angle-detection magnetic guide member 711, the first angle-detection magnet 51, the second angle-detection magnetic guide member 722, the second angle-detection magnet 52, the first magnetic angle detector 611 and the second magnetic angle detector 622. The rest of the present embodiment is the same as that of the sixth embodiment. In FIGS. 35 to 39, the first-yoke claws 372 and the second-yoke claws 382 are partially omitted to avoid complication.

The sensor case 75 is shaped in an arcuate form. Therefore, the circuit board 60, which is configured to be received in the sensor case 75, is shaped in an arcuate form. The sensor case 75 has the cover retainer pins 758 described above. The sensor cover 95 has the pin receiving holes 854 described above.

The holder member 90 has the curved portion 900 and the straight portions 910. The curved portion 900 is shaped in an arcuate form. The curved portion 900 is placed between the first-yoke ring 370 and the second-yoke ring 380 in the axial direction Da. Furthermore, a space is formed between the curved portion 900 and each of the first-yoke ring 370 and the second-yoke ring 380. Furthermore, the curved portion 900 is opposed to the rotor peripheral surface 350 in the radial direction. A space is formed between the curved portion 900 and the rotor peripheral surface 350.

The straight portions 910 are joined to the curved portion 900 and extend from the curved portion 900 in the radial direction. Furthermore, each of the straight portions 910 is joined to the case peripheral surface 781 by, for example, welding or bonding. Therefore, the rotor 35 is surrounded by the holder member 90 and the sensor case 75 in the radial direction.

The rotor 35 is formed in the same way as in the third embodiment. The first follower rotor 31, the second follower rotor 32, the first angle-detection magnetic guide member 711 and the first angle-detection magnet 51 are formed in the same manner as in the third embodiment but are covered by the first receiving portion 751 and the sensor cover 95 unlike the third embodiment. The second angle-detection magnetic guide member 722, the second angle-detection magnet 52, the first magnetic angle detector 611 and the second magnetic angle detector 622 are formed in the same manner as in the third embodiment but are covered by the first receiving portion 751 and the sensor cover 95 unlike the third embodiment.

The eighth embodiment is configured in the above-described manner. Even in the eighth embodiment, the advantages, which are similar to those of the seventh embodiment, are achieved. Furthermore, in the eighth embodiment, the steering angle can be detected in addition to the steering torque.

Ninth Embodiment

In the ninth embodiment, as shown in FIGS. 40 to 43, the configuration of the rotor 35 is different from that of the first embodiment. Furthermore, the configuration of the sensor case 75 is different. Also, the torque sensor 25 does not include the first magnetic guide member 71, the second magnetic guide member 72, the fixation collar 354 and the cover 85. Furthermore, the torque sensor 25 includes two magnetic detectors 600. Additionally, the torque sensor 25 includes a first fixation member 921 and a second fixation member 922. The rest of the present embodiment is the same as that of the first embodiment.

The rotor 35 includes a tubular portion 351 and a yoke holding portion 352. The tubular portion 351 is shaped in a cylindrical tubular form. The yoke holding portion 352 has a plurality of first-yoke recesses 391 and a plurality of second-yoke recesses 392. Each of the first-yoke recesses 391 has a shape that corresponds to a corresponding one of the first-yoke claws 372. Therefore, the first-yoke claws 372 are respectively inserted into the first-yoke recesses 391, and thereby the yoke holding portion 352 holds the first yoke 361. Each of the second-yoke recesses 392 has a shape that corresponds to a corresponding one of the second-yoke claws 382. Therefore, the second-yoke claws 382 are respectively inserted into the second-yoke recesses 392, and thereby the yoke holding portion 352 holds the second yoke 362.

The sensor case 75 has a limiting portion 755 in addition to the first receiving portion 751 and the second receiving portion 752.

The limiting portion 755 is joined to the first receiving portion 751. Also, the limiting portion 755 is shaped in a circular ring form and has a rotor receiving hole 756. A part of the yoke holding portion 352 is inserted into the rotor receiving hole 756 in the axial direction Da. Therefore, movement of the rotor 35 in the radial direction is limited. Furthermore, the limiting portion 755 is positioned between the first-yoke ring 370 and the second-yoke ring 380 in the axial direction Da and is opposed to the first-yoke ring 370 and the second-yoke ring 380 in the axial direction Da. Thus, movement of each of the first-yoke ring 370 and the second-yoke ring 380 in the axial direction Da is limited.

The first fixation member 921 is shaped in a circular ring form. Furthermore, the first fixation member 921 clamps the first-yoke ring 370 between the first fixation member 921 and the yoke holding portion 352 in the axial direction Da. Therefore, removal of the first yoke 361 from the yoke holding portion 352 is limited.

The second fixation member 922 is shaped in a circular ring form. Furthermore, the second fixation member 922 clamps the second-yoke ring 380 between the second fixation member 922 and the yoke holding portion 352 in the axial direction Da. Therefore, removal of the second yoke 362 from the yoke holding portion 352 is limited.

The torque sensor 25 is configured in the above-described manner. Next, even in the ninth embodiment, the simplification of the manufacturing process of the torque sensor 25 will be described.

[4-1] The torque sensor 25 includes the magnet 30, the rotor 35, the first yoke 361, the second yoke 362, the magnetic detectors 600 and the sensor case 75. The magnet 30 is configured to generate the magnetic field and is configured to be rotated together with the steering wheel 5. The rotor 35 is shaped in the ring form and is configured to be rotated together with the steering wheel 5 about the axis that extends in the axial direction Da. The first yoke 361 has the first-yoke ring 370 and the first-yoke claws 372. The first-yoke ring 370 is shaped in the ring form and is configured to be rotated together with the rotor 35. The first-yoke claws 372 project from the first-yoke ring 370 in the axial direction Da and are thereby opposed to the magnet 30 in the radial direction. The first-yoke claws 372 are configured to be rotated together with the first-yoke ring 370 and thereby change the magnetic field generated by the magnet 30. The second yoke 362 has the second-yoke ring 380 and the second-yoke claws 382. The second-yoke ring 380 is shaped in the ring form and is configured to be rotated together with the rotor 35. The second-yoke claws 382 project from the second-yoke ring 380 in the axial direction Da and are thereby opposed to the magnet 30 in the radial direction. The second-yoke claws 382 are configured to be rotated together with the second-yoke ring 380 and thereby change the magnetic field generated by the magnet 30. Each of the magnetic detectors 600 is configured to detect the strength of the magnetic field that changes in response to the rotation of the first-yoke claws 372 and the second-yoke claws 382. This strength of the magnetic field corresponds to the steering torque. The sensor case 75 includes the limiting portion 755 and the first receiving portion 751. The limiting portion 755 is shaped in the ring form. Furthermore, the rotor 35 is inserted into the limiting portion 755 in the axial direction Da. The first receiving portion 751 is joined to the limiting portion 755 and receives the magnetic detectors 600. Furthermore, the limiting portion 755 limits movement of the rotor 35 relative to the sensor case 75 in the radial direction.

The rotor 35 is inserted into the limiting portion 755 in the axial direction Da, and the limiting portion 755 is joined to the first receiving portion 751. Therefore, movement of the rotor 35 relative to the sensor case 75 in the radial direction is limited. Thus, the torque sensor 25 is assembled by inserting the components in the axial direction Da only, which simplifies the manufacturing process in comparison to the case where the torque sensor is assembled by inserting the components in the two directions, i.e., the axial direction Da and the radial direction.

Furthermore, in the ninth embodiment, the following advantage is achieved.

[4-2] The limiting portion 755 is opposed to the first-yoke ring 370 in the axial direction Da and thereby limits the movement of the first-yoke ring 370 relative to the sensor case 75 in the axial direction Da.

Therefore, since the movement of the first-yoke ring 370 in the axial direction Da is limited, it is possible to limit variations in the distance in the axial direction Da between: the first-yoke ring 370; and the first magnetic guide member 71 that is opposed to the first-yoke ring 370 in the axial direction Da. This limits variations in the strength of the magnetic field that passes through the magnetic detector 600 from the first-yoke ring 370 via the first magnetic guide member 71. As a result, variations in the sensitivity of the magnetic detector 600 are limited.

Tenth Embodiment

In the tenth embodiment, as shown in FIGS. 44 to 47, the torque sensor 25 further includes the first magnetic guide member 71, the second magnetic guide member 72 and the sensor cover 95. The rest of the present embodiment is the same as that of the ninth embodiment.

The first magnetic guide member 71 and the second magnetic guide member 72 are formed in the same way as in the first embodiment described above.

The sensor cover 95 covers an exposed portion of the circuit board 60, which is exposed from the sensor case 75, in cooperation with the first receiving portion 751 of the sensor case 75. Therefore, the magnetic detector 600 and the other components, which are installed on the circuit board 60, are protected from the foreign objects, and thereby the dustproof and waterproof performance of the torque sensor 25 is improved.

The tenth embodiment is configured in the above-described manner. Even in the tenth embodiment, the advantages, which are similar to those of the ninth embodiment, are achieved.

Eleventh Embodiment

In the eleventh embodiment, as shown in FIGS. 48 to 52, the configurations of the sensor case 75, the circuit board 60 and the sensor cover 95 are different from those of the tenth embodiment. Furthermore, the configuration of the rotor 35 is different from that of the first embodiment. Furthermore, the torque sensor 25 includes the first follower rotor 31, the second follower rotor 32, the first angle-detection magnetic guide member 711, the first angle-detection magnet 51, the second angle-detection magnetic guide member 722, the second angle-detection magnet 52, the first magnetic angle detector 611 and the second magnetic angle detector 622. Furthermore, the torque sensor 25 does not include the second fixation member 922. The rest of the present embodiment is the same as that of the ninth embodiment.

The sensor case 75 is shaped in an arcuate form. Therefore, the circuit board 60, which is configured to be received in the sensor case 75, is shaped in an arcuate form. The sensor case 75 has the cover retainer pins 758 described above. The sensor cover 95 has the pin receiving holes 854 described above.

The circular ring 356 of the gear arrangement 355 of the rotor 35 is shaped in the circular ring form. Furthermore, the circular ring 356 clamps the second-yoke ring 380 between the circular ring 356 and the yoke holding portion 352 in the axial direction Da. Therefore, removal of the second yoke 362 from the yoke holding portion 352 is limited. The rest of the present embodiment is the same as that of the third embodiment. The rotor 35 is formed in the same way as in the third embodiment. The first follower rotor 31, the second follower rotor 32, the first angle-detection magnetic guide member 711 and the first angle-detection magnet 51 are formed in the same manner as in the third embodiment but are covered by the first receiving portion 751 and the sensor cover 95 unlike the third embodiment. The second angle-detection magnetic guide member 722, the second angle-detection magnet 52, the first magnetic angle detector 611 and the second magnetic angle detector 622 are formed in the same manner as in the third embodiment but are covered by the first receiving portion 751 and the sensor cover 95 unlike the third embodiment.

The eleventh embodiment is configured in the above-described manner. Even in the eleventh embodiment, the advantages, which are similar to those of the tenth embodiment, are achieved. Furthermore, in the eleventh embodiment, the steering angle can be detected in addition to the steering torque.

Twelfth Embodiment

In the twelfth embodiment, as shown in FIGS. 53 to 56, the configuration of the distal end surface 753 of the first receiving portion 751 of the sensor case 75 is different from that of the first embodiment. Furthermore, the torque sensor 25 does not include the cover 85. The rest of the present embodiment is the same as that of the first embodiment. In FIGS. 53 to 56, the first-yoke claws 372 and the second-yoke claws 382 are partially omitted to avoid complication.

The distal end surface 753 is shaped in an arcuate form that corresponds to the shape of the rotor peripheral surface 350. The distal end surface 753 contacts the rotor peripheral surface 350, so that movement of the rotor 35 relative to the sensor case 75 in the radial direction is limited.

The twelfth embodiment is configured in the above-described manner. Even in the twelfth embodiment, the advantages, which are similar to those of the tenth embodiment, are achieved except the advantages discussed in the above sections [1-1] to [1-3].

Thirteenth Embodiment

In the thirteenth embodiment, as shown in FIGS. 57 to 60, the torque sensor 25 further includes the first magnetic guide member 71, the second magnetic guide member 72 and the sensor cover 95. The rest of the present embodiment is the same as that of the twelfth embodiment. In FIGS. 57 to 60, the first-yoke claws 372 and the second-yoke claws 382 are partially omitted to avoid complication.

The first magnetic guide member 71 and the second magnetic guide member 72 are formed in the same way as in the first embodiment described above.

The sensor cover 95 covers an exposed portion of the circuit board 60, which is exposed from the sensor case 75, in cooperation with the first receiving portion 751 of the sensor case 75. Therefore, the magnetic detector 600 and the other components, which are installed on the circuit board 60, are protected from the foreign objects, and thereby the dustproof and waterproof performance of the torque sensor 25 is improved.

The thirteenth embodiment is configured in the above-described manner. Even in the thirteenth embodiment, the advantages, which are similar to those of the twelfth embodiment, are achieved.

Fourteenth Embodiment

In the fourteenth embodiment, as shown in FIGS. 61 to 64, the torque sensor 25 further includes a temporary fixing member 93. The rest of the present embodiment is the same as that of the first embodiment. In FIGS. 61 to 64, the first-yoke claws 372 and the second-yoke claws 382 are partially omitted to avoid complication.

The temporary fixing member 93 has a first plate portion 931, a second plate portion 932, two third plate portions 933 and two fourth plate portions 934.

The first plate portion 931 is shaped in a plate form that extends in the axial direction Da. The first plate portion 931 is configured to contact the inner peripheral surface of the rotor 35. The second plate portion 932 is joined to the first plate portion 931. Furthermore, the second plate portion 932 is shaped in a plate form that extends in the circumferential direction. The second plate portion 932 is configured to contact a surface of the rotor 35 that faces in the axial direction Da. Each of the third plate portions 933 is joined to an end of the second plate portion 932 that is opposite to the first plate portion 931. Furthermore, each of the third plate portions 933 radially outwardly extends from the second plate portion 932. Each of the fourth plate portions 934 is joined to an end of the corresponding third plate portion 933 that is opposite to the second plate portion 932. Furthermore, each of the fourth plate portions 934 extends from the corresponding one of the third plate portions 933 in the axial direction Da. Also, each of the fourth plate portions 934 is configured to contact the first base surface 761. Therefore, a relative position between the sensor case 75 and the rotor 35 is fixed by the first plate portion 931, the second plate portion 932 and the fourth plate portions 934. Thus, the temporary fixing member 93 limits movement of the rotor 35 relative to the sensor case 75 in the radial direction and the axial direction Da. The cover 85 may be installed to the rotor 35 and the sensor case 75 in the state where the relative position between the sensor case 75 and the rotor 35 is fixed by the temporary fixing member 93. Furthermore, the temporary fixing member 93 may be removed from the rotor 35 and the sensor case 75 after the installation of the cover 85. In this way, the installation of the cover 85 to the rotor 35 and the sensor case 75 is eased.

The fourteenth embodiment is configured in the above-described manner. Even in the fourteenth embodiment, the advantages, which are similar to those of the first embodiment, are achieved except the advantages discussed in the above sections [1-1] to [1-3].

Fifteenth Embodiment

In the fifteenth embodiment, as shown in FIGS. 65 to 68, the torque sensor 25 further includes the first magnetic guide member 71, the second magnetic guide member 72 and the sensor cover 95. The rest of the present embodiment is the same as that of the fourteenth embodiment. In FIGS. 65 to 68, the first-yoke claws 372 and the second-yoke claws 382 are partially omitted to avoid complication.

The first magnetic guide member 71 and the second magnetic guide member 72 are formed in the same way as in the first embodiment described above.

The sensor cover 95 cooperates with the first receiving portion 751 of the sensor case 75 to cover an exposed portion of the circuit board 60, which is exposed from the sensor case 75, and the first magnetic guide member 71. Therefore, the magnetic detector 600 and the other components, which are installed on the circuit board 60, are protected from the foreign objects, and thereby the dustproof and waterproof performance of the torque sensor 25 is improved.

The fifteenth embodiment is configured in the above-described manner. Even in the fifteenth embodiment, the advantages, which are similar to those of the fourteenth embodiment, are achieved.

Other Embodiments

The present disclosure is not limited to the embodiments described above, and the embodiments described above may be appropriately modified. Needless to say, in each of the embodiments described above, the elements of the embodiment are not necessarily essential except when it is clearly indicated that they are essential and when they are clearly considered to be essential in principle.

In the embodiments described above, the rotor 35 is shaped in the cylindrical tubular form. However, the shape of the rotor 35 is not limited to the cylindrical tubular form. For example, the rotor 35 may be shaped in a polygonal tubular form or an elliptical tubular form.

In the embodiments described above, the first-yoke ring 370 and the second-yoke ring 380 are each shaped in the circular ring form. However, the shape of each of the first-yoke ring 370 and the second-yoke ring 380 is not limited to the circular ring form. For example, each of the first-yoke ring 370 and the second-yoke ring 380 may be shaped in a polygonal ring form.

In the embodiments described above, each of the first-yoke claws 372 and the second-yoke claws 382 is shaped in the tapered form. However, the shape of each of the first-yoke claws 372 and the second-yoke claws 382 is not limited to the tapered form. For example, each of the first-yoke claws 372 and the second-yoke claws 382 may be shaped in an oblong rectangular shape.

In the embodiments described above, the fixation collar 354 is coupled to the second steering shaft 12, and the magnet 30 is coupled to the first steering shaft 11. However, the present disclosure is not limited to the above configuration, i.e., the fixation collar 354 is coupled to the second steering shaft 12, and the magnet 30 is coupled to the first steering shaft 11. For example, the fixation collar 354 may be coupled to the first steering shaft 11, and the magnet 30 may be coupled to the second steering shaft 12.

In the embodiments described above, the torque sensor 25 includes the first magnetic guide member 71 and the second magnetic guide member 72. In contrast, the torque sensor 25 is not limited to the torque sensor having the first magnetic guide member 71 and the second magnetic guide member 72, and the torque sensor 25 may not have the first magnetic guide member 71 and the second magnetic guide member 72.

In the embodiments described above, the first magnetic guide member 71 is opposed to the first-yoke ring 370 in the axial direction Da. In contrast, the first magnetic guide member 71 is not limited to be opposed to the first-yoke ring 370 in the axial direction Da, but may be opposed to the first-yoke ring 370 in the radial direction. In this case, in the torque sensor 25, movement of the rotor 35 in the radial direction is limited, and thereby movement of the first-yoke ring 370 is limited. Thus, variations in the radial distance between the first-yoke ring 370 and the first magnetic guide member 71 are limited. This limits variations in the strength of the magnetic field that passes through the magnetic detector 600 from the first-yoke ring 370 via the first magnetic guide member 71. As a result, variations in the sensitivity of the magnetic detector 600 are limited. Similarly, the second magnetic guide member 72 is opposed to the second-yoke ring 380 in the axial direction Da. In contrast, the second magnetic guide member 72 is not limited to be opposed to the second-yoke ring 380 in the axial direction Da, but may be opposed to the second-yoke ring 380 in the radial direction.

In the embodiments described above, the torque sensor 25 includes the one or two magnetic detectors 600. However, the number of the magnetic detector(s) 600 is not limited to the one or two and may be three or more.

In the embodiments described above, the motor control device 18 calculates the steering angle based on the signals outputted from the first magnetic angle detector 611 and the second magnetic angle detector 622. However, the motor control device 18 is not limited to the motor control device, which calculates the steering angle based on the signals outputted from the first magnetic angle detector 611 and the second magnetic angle detector 622. The motor control device 18 may calculate the steering angle by using only the signal outputted from the first magnetic angle detector 611. Also, the motor control device 18 may calculate the steering angle by using only the signal outputted from the second magnetic angle detector 622. Furthermore, an arithmetic unit (arithmetic circuitry) mounted on the circuit board 60 may calculate the steering angle instead of the motor control device 18.

The embodiments described above may be freely combined one another as appropriate.

What is claimed is:

1. A torque detection device configured to detect a torque generated at a detection subject, comprising:
   - a magnet that is configured to generate a magnetic field and is configured to be rotated together with the detection subject;
   - a rotor that is shaped in a ring form and is configured to be rotated about an axis, which extends in an axial direction, together with the detection subject;
   - a yoke that has:
     - a ring which is shaped in a ring form and is configured to be rotated together with the rotor; and
     - a plurality of claws which project from the ring in the axial direction and are thereby opposed to the magnet in a direction perpendicular to the axial direction, wherein the plurality of claws are configured to be rotated together with the ring and thereby change the magnetic field generated by the magnet;
   - a magnetic detector that is configured to detect a strength of the magnetic field which corresponds to the torque and changes in response to rotation of the plurality of claws;
   - a sensor case that receives the magnetic detector; and
   - a cover that has:
     - a sensor cover portion that is coupled to a surface of the sensor case which faces in the axial direction; and
     - a rotor cover portion that is joined to the sensor cover portion and receives the rotor which is inserted into the rotor cover portion in the axial direction, wherein:
   - the rotor cover portion limits movement of the rotor relative to the sensor case in the direction perpendicular to the axial direction.

2. The torque detection device according to claim 1, wherein the rotor cover portion is opposed to the ring in the axial direction and thereby limits movement of the ring relative to the sensor case in the axial direction.

3. The torque detection device according to claim 1, comprising a circuit board to which the magnetic detector is installed while the circuit board is received in the sensor case, wherein:
   - the circuit board has a connecting portion;
   - the connecting portion is coupled to the magnetic detector and is exposed from the sensor case; and
   - the sensor cover portion covers the connecting portion.

4. The torque detection device according to claim 3, wherein a distance, which is measured from a part of the connecting portion where the ring and the cover overlap each other in the axial direction to a part of the ring where the cover and the connecting portion overlap each other in the axial direction, is smaller than a distance, which is measured from the part of the connecting portion where the ring and the cover overlap each other in the axial direction to a part of the cover where the ring and the connecting portion overlap each other in the axial direction.

5. The torque detection device according to claim 1, comprising a guide member that is configured to guide the magnetic field, which changes in response to the rotation of the plurality of claws, to the magnetic detector.

6. The torque detection device according to claim 1, comprising:
   - a follower rotor that is configured to be rotated together with the rotor;
   - an angle-detection magnet that is configured to generate a magnetic field and is configured to be rotated together with the follower rotor; and
   - an angle detector that is configured to detect a strength of the magnetic field while the strength of the magnetic field corresponds to a rotational angle of the detection subject and changes in response to rotation of the follower rotor.

* * * * *